(12) United States Patent
Barnes et al.

(10) Patent No.: US 11,297,871 B2
(45) Date of Patent: *Apr. 12, 2022

(54) METHODS OF REDUCING VISCERAL FAT AND RELATED COMPOSITIONS

(71) Applicant: 20Lighter, LLC, Cheyenne, WY (US)

(72) Inventors: Jessica Barnes, Cheyenne, WY (US); Gerald Dembrowski, Cheyenne, WY (US)

(73) Assignee: 20Lighter, LLC, Cheyenne, WY (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/825,974

(22) Filed: Mar. 20, 2020

(65) Prior Publication Data

US 2020/0214332 A1 Jul. 9, 2020

Related U.S. Application Data

(63) Continuation of application No. 15/679,043, filed on Aug. 16, 2017, now Pat. No. 10,638,786.

(51) Int. Cl.
  *A23L 33/00* (2016.01)
  *A23L 33/10* (2016.01)
  *G09B 19/00* (2006.01)

(52) U.S. Cl.
  CPC ............. *A23L 33/30* (2016.08); *A23L 33/10* (2016.08); *A23V 2002/00* (2013.01); *G09B 19/00* (2013.01); *G09B 19/0092* (2013.01)

(58) Field of Classification Search
  None
  See application file for complete search history.

(56) References Cited

U.S. PATENT DOCUMENTS

| 1,773,079 | A | 8/1930 | Birdseye |
| 2015/0154883 | A1 | 6/2015 | Klassen |
| 2019/0159505 | A1* | 5/2019 | Lundin ............... A23L 33/30 |

OTHER PUBLICATIONS

Clasey J. et al, "Body composition by DEXA in older adults: accuracy and influence of scan mode.," Med. Sci. Sports Exerc., 1997, pp. 560-567, 29(4).

(Continued)

*Primary Examiner* — James B Hull
(74) *Attorney, Agent, or Firm* — Siepmann IP, PLLC

(57) ABSTRACT

Methods and compositions are provided directed to decreasing visceral fat in subjects. Visceral fat is directly linked to cardiovascular and metabolic disease risk. The methods describe a calorie restricted diet of specific percentages of food elements to be consumed within a specific time period each day. Calorie restriction and nutrient percentages take into consideration average daily normal activity of subjects as well as baseline health metrics including estimated amount of visceral fat. Remarkable results are obtained since visceral fat is targeted for reduction, thereby markedly reducing the risk of cardiovascular and metabolic disease. Unlike previous conventional weight loss programs, the methods are applicable to the general population including subjects of all ages, genders, and those with past histories of disease, comorbidities, prescription medications, weight fluctuations, and the like, and since the methods do not require surgery, hospitalization, liquid-only diets, prescription medication, or purchase of pre-package meal replacements and the like.

20 Claims, 60 Drawing Sheets

(56) References Cited

OTHER PUBLICATIONS

Figure 1:
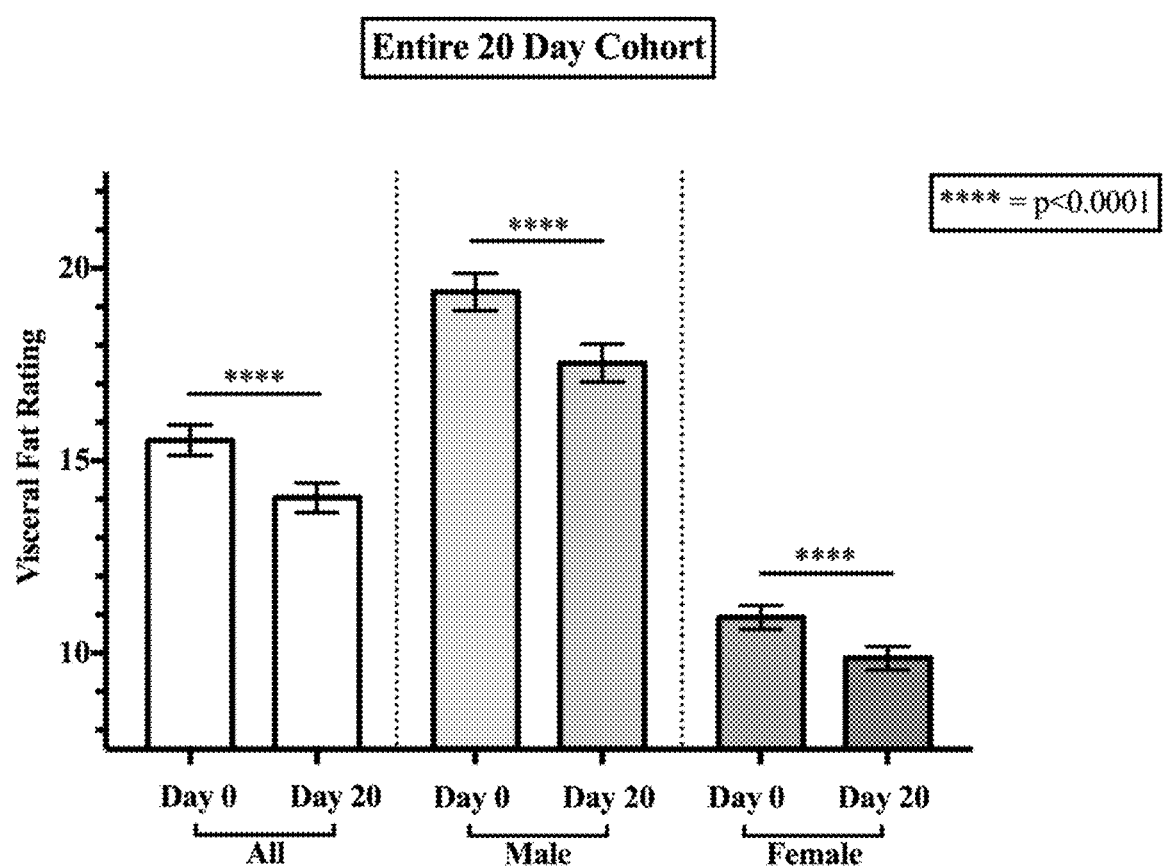

Fields D. et al, "Body-composition assessment via air-displacement plethysmography in adults and children: a review.," Am. J Clin. Nutrit., 2002, pp. 453-467, 75.

Abstract Only, Pasquali R. et al, "Treatment of obese patients with obstructive sleep apnea syndrome (OSAS): effect of weight loss and interference of otorhinolaryngoiatric pathology.," Int. J. Obes., 1990, pp. 207-217, 14.

Abstract Only, Kim DM. et al, "Sibutramine improves fat distribution and insulin resistance, and increases serum adiponectin levels in Korean obese nondiabetic premenopausal women.," Diabetes Res Clin Pract, 2004, pp. S139-S144, 66.

Gray DS. et al, "Magnetic-resonance imaging used for determining fat distribution in obesity and diabetes.," Am. J. Clin. Nutr., 1991, pp. 623-627, 54.

Colles S. et al, "Preoperative weight loss with a very-low-energy diet: quantitation of changes in liver and abdominal fat by serial imaging.," Am. J. Clin. Nutr., 2006, pp. 4-11, 84:3.

Zamboni M. et al, "Effect of Regain of Body Weight on Regional Body Fat Distribution: Comparison Between Pre- and Postmenopausal Obese Women.," Obes. Res., 1996, pp. 555-560, 4.

Abstract Only, Zamboni M. et al, "Effect of weight loss on regional body fat distribution in premenopausal women.," Am. J. Clin. Nutr., 1993, pp. 29-34, 58.

Depergola G. et al, "Divergent Effects of Short-Term, Very-Low-Calorie Diet on Insulin-Like Growth Factor-I and Insulin-Like Growth Factor Binding Protein-3 Serum Concentrations in Premenopausal Women with Obesity.," Obes. Res., 1998, pp. 408-415, 6(6).

Leenen R. et al, "Visceral fat accumulation in relation to sex hormones in obese men and women undergoing weight loss therapy.," J. Clin. Endocrinol. Metab., 1994, pp. 1515-1520, 78.

Conway JM. et al, "Visceral adipose tissue differences in black and white women.," Am. J. Clin. Nutr., 1995, pp. 765-771, 61.

Laaksonen DE et al, "Relationships between changes in abdominal fat distribution and insulin sensitivity during a very low calorie diet in abdominally obese men and women.," Nutr. Metab. Cardiovasc. Dis., 2003, pp. 349-356, 13.

Ross R. et al, "Reduction in obesity and related comorbid conditions after diet-induced weight loss or exercise-induced weight loss in men. A randomized, controlled trial.," Ann. Intern. Med., 2000, pp. 92-103, 133.

Purnell J. et al, "Effect of Weight Loss with Reduction of Intra-Abdominal Fat on Lipid Metabolism in Older Men.," J. Clin. Endocrinol. Metab., 2000, pp. 977-982, 85.

Okura T. et al, "Effects of Exercise Intensity on Physical Fitness and Risk Factors for Coronary Heart Disease.," Obes. Res., 2003, pp. 1131-1139, 11.

Weinsier R. et al, "Body fat distribution in white and black women: different patterns of intraabdominal and subcutaneous abdominal adipose tissue utilization with weight loss.," Am. J. Clin. Nutr., 2001, pp. 631-636, 74.

Gower B. et al, "Effects of weight loss on changes in insulin sensitivity and lipid concentrations in premenopausal African American and white women.," Am. J. Clin. Nutr., 2002, pp. 923-927, 76.

Rice B. et al, "Effects of aerobic or resistance exercise and/or diet on glucose tolerance and plasma insulin levels in obese men.," Diabetes Care, 1999, pp. 684-691, 22.

Tchernof A. et al, "Weight loss reduces C-reactive protein levels in obese postmenopausal women.," Circulation, 2002, pp. 564-569, 105.

Tchernof A. et al, "Impaired capacity to lose visceral adipose tissue during weight reduction in obese postmenopausal women with the Trp64Arg beta3-adrenoceptor gene variant.," Diabetes, 2000, pp. 1709-1713, 49.

Alverez GE. et al, "Weight loss increases cardiovagal baroreflex function in obese young and older men.," Am. J. Physiol. Endocrinol. Metab., 2005, pp. E665-E669, 289.

Tiikainnen M. et al, "Effects of identical weight loss on body composition and features of insulin resistance in obese women with high and low liver fat content.," Diabetes, 2003, pp. 701-707, 52.

Tiikainnen M. et al, "Effects of equal weight loss with orlistat and placebo on body fat and serum fatty acid composition and insulin resistance in obese women.," Am. J. Clin. Nutr., 2004, pp. 22-30, 79.

Van Rossum EF. et al, "Leptin responses to weight loss in postmenopausal women: relationship to sex-hormone binding globulin and visceral obesity.," Obes. Res., 2000, pp. 29-35, 8.

Nicklas BJ. et al, "Lifestyle intervention of hypocaloric dieting and walking reduces abdominal obesity and improves coronary heart disease risk factors in obese, postmenopausal, African-American and Caucasian women.," J. Gerontol. A Biol. Sci. Med. Sci., 2003, pp. 181-189, 58.

Janssen I. et al, "Effects of sex on the change in visceral, subcutaneous adipose tissue and skeletal muscle in response to weight loss.," Int. J. Obes. Relat. Metab. Disord., 1999, pp. 1035-1046, 23.

Thong F. et al, "Plasma leptin in moderately obese men: independent effects of weight loss and aerobic exercise.," Am. J. Physiol. Endocrinol. Metab., 2000, pp. E307-E313, 279.

78. Goodpaster B. et al., "Effects of Weight Loss on Regional Fat Distribution and Insulin Sensitivity in Obesity.", Diabetes, 1999, pp. 839-847, 48.

Kockx M. et al, "Relationship between Visceral Fat and PAI-1 in Overweight Men and Women before and after Weight Loss.," Thromb Haemost., 1999, pp. 1490-1496, 82.

Van Der Kooy K. et al, "Waist-hip ratio is a poor predictor of changes in visceral fat.," Am. J. Clin. Nutr., 1993, pp. 327-333, 57.

Giannopoulou I et al, "Exercise is Required for Visceral Fat Loss in Postmenopausal Women with Type 2 Diabetes.," J. Clin. Endocrin. Metab., 2005, pp. 1511-1518, 90(3).

Hiatt et al., U.S. News & World Report, Sep. 30, 2011, "Greek Yogurt Vs. Regular Yogurt: Which is More Healthful?" health.usnews.com/health-news/diet-fitness/diet/articles/2011/09/30/greek-yogurt-vs-regular-yogurt-which-is-more-healthful.

Full article not present, D'Agostino, Ralph B., "Transformation to normality of the null distribution of g1.," Biometrika, 1970, pp. 679-681, 57(3).

Kim TK., "T test as a parametric statistic.," Korean J. Anesthesiol., 2015, pp. 540-546, 68(6).

Ghasemi A. et al., "Normality Tests for Statistical Analysis: A Guide for Non-Statisticians.," Int. J. Endocrinol. Metab., 2012, pp. 468-489, 10(2).

Wilcoxon F., "Individual comparisons by ranking methods.," Biometrics Bulletin, 1945, pp. 80-83, 1(6).

Okauchi Y. et al., "Abosolute Value of Bioelectrical Impedance Analysis-Measured Visceral Fat Area with Obesity-Related Cardiovascular Risk Factors in Japanese Workers.," J. Atheroscler. Thromb., 2010, pp. 1237-1245, 17.

Abstract Only, Hiuge-Shimizu et al., "Absolute value of visceral fat area measured on computed tomography scans and obesity-related cardiovascular risk factors in large-scale Japanese general population (the VACATION-J study).," Ann. Med., 2012, p. 82-92, 44.

Fox C. et al., "Abdominal visceral and subcutaneous adipose tissue compartments: association with metabolic risk factors in the Framingham Heart Study.," Circulation, 2007, pp. 39-48, 116.

Okauchi Y. et al., "Reduction of Visceral Fat is Associated With Decrease in the Number of Metabolic Risk Factors in Japanese Men.," Diabetes Care, 2007, pp. 2392-2394, 30.

93. Fox C. et al., "Abdominal visceral and subcutaneous adipose tissue compartments: association with metabolic risk factors in the Framingham Heart Study.," Circulation, 2007, pp. 39-48, 116.

Abstract Only—Hiuge-Shimizu et al., "Absolute value of visceral fat area measured on computed tomography scans and obesity-related cardiovascular risk factors in large-scale Japanese general population (the VACATION-J study).," Ann. Med., 2012, pp. 82-92, 44.

Flegal K. et al, "Trends in Obesity Among Adults in the United States, 2005 to 2014.," J. of the American Med. Assoc., 2016, pp. 2284-2291, 315(21).

Jensen MD. et al, "Expert Panel Report: Guidelines (2013) for the Management.," Obesity, 2014, pp. S41-S410, 22(S2).

(56) References Cited

OTHER PUBLICATIONS

National Heart, Lung, and Blood Institute's (NHLBI), "Clinical guidelines on the identification, evaluation, and treatment of overweight and obesity in adults: The evidence report.," Obesity Res., 1998, pp. 51S-209S, 6.
US Food and Drug Administration, "Guidance for industry developing products for weight management.," Washington, D.C.: US Food and Drug Administration, 2007, pp. 1-16.
Isoldi K. et al, "Pharmacologic Treatment of Obesity.," Endotext, 2000, MDText.com www.ncbi.nlm.nih.gov/books/NBK279038/.
De Groot LJ. et al, "Pharmacologic Treatment of Obesity.," Endotext, 2000, MDText.com www.ncbi.nlm.nih.gov/books/NBK279038/.
Despres JP. et al, "Review: Regional Distribution of Body Fat, Plasma Lipoproteins, and Cardiovascular Disease.," American Heart Association Journals, 1990, pp. 497-511, 10, American Heart Association Arteriosclerosis, Thrombosis, and Vascular Biology.
Gomez-Arbelaez D et al, "Body composition changes after very low-calorie ketogenic diet in obesity evaluated by three standardized methods.," J. Clin. Endocrinol. Metab., 2017, pp. 488-498, 102(2).
Claessens M. et al, "The effect of a low-fat, high-protein or high-carbohydrate ad libitum diet on weight loss maintenance and metabolic risk factors.," Int'l. J. Obesity, 2009, pp. 296-304, 33.
Gu Y. et al, "Beneficial Effects of an 8-Week, Very Low Carbohydrate Diet Intervention on Obese Subjects.," Evidence-Based Compl. Alt. Med., 2013, pp. 1-8, 2013.
Hemminsson E. et al, "Weight loss and dropout during a commercial weight-loss program including a very-low-calorie diet, a low-calorie diet, or restricted normal food: observational cohort study.," Am. J. Clin. Nutr., 2012, pp. 953-961, 96.
Hookey A. et al, "Outcomes of an 8-week very low calorie diet undertaken by obese adults with type 2 diabetes.," Diabesity in Pract., 2014, pp. 70-77, 3.
Rolland C. et al, "Weight loss for individuals with type 2 diabetes following a very-low-calorie diet in a community-based setting with trained facilitators for 12 weeks.," Clin. Obesity, 2013, pp. 150-158, 3(5).
Snel M. et al., "Long-Term Beneficial Effect of a 16-Week Very Low Calorie Diet on Pericardial Fat in Obese Type 2 Diabetes Mellitus Patients.," Obesity, 2012, pp. 1572-1576, 20(8).
Volek JS. et al, "Comparison of energy-restricted very low-carbohydrate and low-fat diets on weight loss and body composition in overweight men and women.," Nutrition & Metabolism (Lond.), 2004, pp. 1-13, 1:13.
Cleveland E. et al, "A short-duration restrictive diet reduces visceral adiposity in the morbidly obese surgical patient.," Am. J. Surg., 2016, pp. 927-930, 212(5).
Wu F. et al, "Differential Effects of Bariatric Surgery Versus Exercise on Excessive Visceral Fat Deposits.," Medicine, 2016, pp. 1-8, 95, e2616.
Depergola G. et al, "Divergent Effects of Short-Term, Very-Low-Calorie Diet on Insulin-Like Growth Factor-I and Insulin-Like Growth Factor Binding Protein-3 Serum Concentralions in Premenopausal Women with Obesity.," Obesity Res., 1998, pp. 408-415, 6(6).
Doucet E. et al, "Reduction of visceral adipose tissue during weight loss.," Eur. J. Clin. Nutr., 2002, pp. 297-304, 56(4).
Kelley D. et al, "Effects of Moderate Weight Loss and Orlistat on Insulin Resistance, Regional Adiposity, and Fatty Acids in Type 2 Diabetes.," Diabetes Care, 2004, pp. 33-40, 27.
Despres JP. et al, "Body Fat Distribution and Risk of Cardiovascular Disease.," Circulation, 2012, pp. 1301-1313, 126.
Goran M. et al, "Relation between visceral fat and disease risk in children and adolescents.," Am. J. Clin. Nutr., 1999, pp. 149S-156S, 70S.
Wade M., "The Risks of Belly Fat—and How to Beat Them.," webmd.com, 2015, https://www.webmd.com/diet/obesity/features/the-risks-of-belly-fat#1.
World Health Organization (WHO) "Depression and Other Common Mental Disorders: Global Health Estimates.," World Health Organization, 2017, pp. 1-24, Geneva.
Leubner D. et al, "Reviewing the Effectiveness of Music Interventions in Treating Depression.," Front. Psychol., 2017, pp. 1-21, 1109, 8.
Berk M. et al, "So depression is an inflammatory disease, but where does the inflammation come from?," BMC Med., 2013, pp. 1-16, 11:200.
Moubarac J. et al, "Consumption of ultra-processed foods and likely impact on human health.," Canada Public Health Nutrition, 2012, pp. 2240-2248, 16(12).
Monteiro C. et al, "A new classification of foods based on the extent and purpose of their processing.," Cad. Saúde Pública, 2010, pp. 2039-2049, 26(11), Rio de Janeiro Brazil.
Monteiro C. et al, "Increasing consumption of ultra-processed foods and likely impact on human health.," Brazil Public Health Nutrition, 2010, pp. 5-13, 14(1).
Bibiloni M. et al, "Prevalence of Overweight and Obesity in Adolescents: A Systematic Review.," ISRN Obes., 2013, pp. 1-14, 2013:392747, Hindawi Publishing Corporation, Spain.
Gonzalez N. et al, "Regulation of visceral and epicardial adipose tissue for preventing cardiovascular injuries associated to obesity and diabetes.," Cardiovasc. Diabetol., 2017, pp. 1-11, 16:44.
Smith U., "Abdominal obesity: a marker of ectopic fat accumulation.," J. Clin. Invest., 2015, pp. 1790-1792, 125(5).
Linder K. et al, "Differentially expressed genes in visceral or subcutaneous adipose tissue of obese men and women.," Lipid Res., 2004, pp. 148-154, 45.
Matsuzawa Y. et al, "The Concept of Metabolic Syndrome: Contribution of Visceral Fat Accumulation and It's Molecular Mechanisms.," J Atheroscler. Thromb., 2011, pp. 629-639, 18(8).
Funahashi T. et al, "Role of Adipocytokines on the Pathogenesis of Atherosclerosis in Visceral Obesity.," Intern. Med., 1999, pp. 202-206, 38.
Farb M. et al, "Visceral adiposopathy: a vascular perspective.," Horm. Mol. Biol. Clin. Investig., 2015, pp. 125-136, 21(2).
Gómez-Hernández A. et al, "Differential Role of Adipose Tissues in Obesity and Related Metabolic and Vascular Complications.," Int. J. Endocrinol., 2016, pp. 1-15, 2016, 1216783.
Britton K. et al, "Ectopic Fat Depots and Cardiovascular Disease.," Circulation, 2011, pp. e837-e841, 124.
Walsh J. et al, "Obesity, Type 2 Diabetes and Bone in Adults.," Calcif. Tissue Int., 2017, pp. 528-535, 100(5).
Park B. et al, "Visceral adipose tissue area is an independent risk factor for hepatic steatosis.," J. Gastroenterol. Hepatol., 2008, pp. 900-907, 23.
Heinrich G. et al, "Reduced Hepatic Carcinoembryonic Antigen-Related Cell Adhesion Molecule 1 Level in Obesity.," Front. Endocrinol. (Lausanne), 2017, pp. 1-5, 8:8.
Graffy P. et al, "Quantification of hepatic and visceral fat by CT and MR imaging: relevance to the obesity epidemic, metabolic syndrome and NAFLD.," Br. J Radiol., 2016, pp. 1-10, 89:20151024.
WHO, "What is overweight and obesity—Childhood.," www.who.int/dietphysicalactivity/childhood_what/en/.
Bano R. et al, "Body Mass Index, Percent Body Fat and Visceral Fat in Relation to Dietary Fat and Fiber Intake among University Females.," Curr. Res. Nutrition Food Sci., 2015, pp. 256-262, 3(3).
WHO, "Waist Circumference and Waist-Hip Ratio: Report of a WHO Expert Consultation.," from Dec. 8-11, 2008 (Geneva) ISBN 9789241501491, 2011, chapter 2, pp. 39.
WHO, "Waist Circumference and Waist-Hip Ratio: Report of a WHO Expert Consultation.," from Dec. 8-11, 2008 (Geneva) ISBN 9789241501491, 2011, chapter 2, pp. 5-6.
Wagner D. R., "Ultrasound as a Tool to Assess Body Fat.," J. Obes., 2013, pp. 1-9, 2013:280713.
Sung RYT. et al, "Measurement of body fat using leg to leg bioimpedance.," Arch. Dis. Child., 2001, pp. 263-267, 85.

* cited by examiner

FIGURE 31

| Lunch | Serving average per day | Practically speaking |
|---|---|---|
| Meat | 1.5 portion | 4.5oz |
| Veggie | 1.5-2 portions | 1.5-2C |
| Fruit | 1 portion | 1C or medium sized |
| Dinner | | |
| Meat | 1.5 portion | 4.5oz |
| Veggie | 1.5 portion | 1.5C |
| Fruit | 1 portion | 1C or medium sized |
| | | 650-725 calories |

| | % of day's total calories | Preferred average of a week |
|---|---|---|
| Meat | ~50-60% | 55-60% |
| Veggie | ~15-20% | 15-20% |
| Fruit | ~20-30% | 25-30% |

FIGURE 32A

| Day 1 | | |
|---|---|---|
| Lunch | Item(s) | Calories |
| Meat | 4.5oz Chicken breast | 209 |
| Veggie | 2C Broccoli | 62 |
| Fruit | 1C Blueberries | 83 |
| Dinner | Item(s) | Calories |
| Meat | 6oz Shrimp | 198 |
| Veggie | 1C Artichokes | 60 |
| Fruit | 1 Apricot | 75 |
| | | 687 |
| Food | % of total calories | |
| Meat | | 59 |
| Veggie | | 18 |
| Fruit | | 23 |
| | | 100 |

| Day 2 | | |
|---|---|---|
| Lunch | Item(s) | Calories |
| Meat | 3oz Bison burger | 165 |
| Veggie | Salad w 1.5C mixed onion, bell pepper, mushroom, 1C tomato | 78 |
| Fruit | 1 Nectarine | 62 |
| Dinner | Item(s) | Calories |
| Meat | 6oz Chicken | 278 |
| Veggie | 1.5C Green beans | 51 |
| Fruit | 1 Orange | 87 |
| | | 721 |
| Food | % of total calories | |
| Meat | | 61 |
| Veggie | | 18 |
| Fruit | | 21 |
| | | 100 |

FIGURE 32B

| Day 3 | | |
|---|---|---|
| Lunch | Item(s) | Calories |
| Meat | 6oz Haddock | 190 |
| Veggie | 1.5C Asparagus | 41 |
| Fruit | 1 Apple | 95 |
| Dinner | Item(s) | Calories |
| Meat | 4.5oz Beef | 268.5 |
| Veggie | Salad w 1.5C mixed onion, bell pepper, mushroom | 46 |
| Fruit | 1C Cherries | 74 |
| | | 715 |
| Food | % of total calories | |
| Meat | 64 | |
| Veggie | 12 | |
| Fruit | 24 | |
| | 100 | |

| Day 4 | | |
|---|---|---|
| Lunch | Item(s) | Calories |
| Meat | 6oz Turkey breast | 290 |
| Veggie | 2C Cauliflower, Broccoli | 56 |
| Fruit | 1C Blueberries | 83 |
| Dinner | Item(s) | Calories |
| Meat | 3oz Flounder | 100 |
| Veggie | 1.5C Brussels Sprouts | 57 |
| Fruit | 1C Raspberries, 0.5 Lemon | 75 |
| | | 661 |
| Food | % of total calories | |
| Meat | 59 | |
| Veggie | 17 | |
| Fruit | 24 | |
| | 100 | |

FIGURE 32C

| Day 5 | | |
|---|---|---|
| Lunch | Item(s) | Calories |
| Meat | 6oz Lobster | 154 |
| Veggie | Salad w 1.5C mixed onion, bell pepper, mushroom | 46 |
| Fruit | 1C Cherries | 74 |
| Dinner | Item(s) | Calories |
| Meat | 4.5oz Beef | 268.5 |
| Veggie | 1.5C Green beans | 51 |
| Fruit | 2 Plums | 100 |
| | | 694 |
| Food | % of total calories | |
| Meat | | 61 |
| Veggie | | 14 |
| Fruit | | 25 |
| | | 100 |

| Day 6 | | |
|---|---|---|
| Lunch | Item(s) | Calories |
| Meat | 4.5oz Cod | 133.5 |
| Veggie | Salad w 1.5C mixed onion, bell pepper, mushroom, 1C Tomato | 78 |
| Fruit | 1C Blackberries, 1 Lemon | 84 |
| Dinner | Item(s) | Calories |
| Meat | 4.5oz Turkey breast | 217.5 |
| Veggie | 2C Zucchini, onion, mushrooms | 81 |
| Fruit | 1 Pear | 96 |
| | | 690 |
| Food | % of total calories | |
| Meat | | 51 |
| Veggie | | 23 |
| Fruit | | 26 |
| | | 100 |

FIGURE 32D

| | Day 7 | |
|---|---|---|
| Lunch | Item(s) | Calories |
| Meat | 4.5oz Chicken | 208.5 |
| Veggie | 1.5C Cauliflower, Broccoli | 42 |
| Fruit | 1 Orange | 87 |
| Dinner | Item(s) | Calories |
| Meat | 3oz Bison | 165 |
| Veggie | Salad w 1C mixed onion, bell pepper, mushroom, 1C Tomato | 62 |
| Fruit | 2C Strawberries | 100 |
| | | 665 |
| Food | % of total calories | |
| Meat | 56 | |
| Veggie | 16 | |
| Fruit | 28 | |
| | 100 | |

FIGURE 33

| Lunch | Serving average per day | Practically speaking |
|---|---|---|
| Meat | 1.5 portion | 4.5oz |
| Veggie | 1.5-2 portions | 1.5-2C |
| Fruit | 1 portion | 1C or medium sized |
| Dinner | | |
| Meat | 1.5 portion | 4.5oz |
| Veggie | 1.5 portion | 1.5C |
| Fruit | 1.5 portion | 1.5C or large sized |
| | | 650-725 calories |

| | % of day's total calories | Preferred average of a week |
|---|---|---|
| Meat | ~50-60% | 55-60% |
| Veggie | ~15-25% | 15-20% |
| Fruit | ~20-30% | 25-30% |

| Lunch | Serving average per day | Practically speaking |
|---|---|---|
| Meat | 1.5 portion | 4.5oz |
| Veggie | 1-2 portions | 1-2C |
| Fruit | 1 portion | 1C or medium sized |
| Dinner | | |
| Meat | 2 portion | 6oz |
| Veggie | 1-2 portion | 1-2C |
| Fruit | 1 portion | 1C or medium sized |
| | | 725-800 calories |

| | % of day's total calories | Preferred average of a week |
|---|---|---|
| Meat | ~50-60% | 55-60% |
| Veggie | ~15-25% | 20-25% |
| Fruit | ~25-30% | 25-30% |

FIGURE 34A

| Day 1 | | |
|---|---|---|
| Lunch | Item(s) | Calories |
| Meat | 4.5oz Chicken breast | 209 |
| Veggie | 2C Broccoli | 62 |
| Fruit | 1C Blueberries | 83 |
| Dinner | Item(s) | Calories |
| Meat | 6oz Shrimp | 198 |
| Veggie | 1C Artichokes | 60 |
| Fruit | 1 Apricot | 75 |
| | | 687 |
| Food | % of total calories | |
| Meat | | 59 |
| Veggie | | 18 |
| Fruit | | 23 |
| | | 100 |

| Day 2 | | |
|---|---|---|
| Lunch | Item(s) | Calories |
| Meat | 3oz Bison burger | 165 |
| Veggie | Salad w 1.5C mixed onion, bell pepper, mushroom, 1C tomato | 78 |
| Fruit | 1 Nectarine | 62 |
| Dinner | Item(s) | Calories |
| Meat | 6oz Chicken | 278 |
| Veggie | 1.5C Green beans | 51 |
| Fruit | 1 Orange | 87 |
| | | 721 |
| Food | % of total calories | |
| Meat | | 61 |
| Veggie | | 18 |
| Fruit | | 21 |
| | | 100 |

FIGURE 34B

| Day 3 (Day of physical exertion) | | |
|---|---|---|
| Lunch | Item(s) | Calories |
| Meat | 6oz Haddock | 190 |
| Veggie | 1.5C Asparagus | 41 |
| Fruit | 1 Apple | 95 |
| Dinner | Item(s) | Calories |
| Meat | 4.5oz Beef | 268.5 |
| Veggie | Salad w 1.5C mixed onion, bell pepper, mushroom, 1C Tomato | 78 |
| Fruit | 1.5C Cherries | 111 |
| | | 784 |
| Food | % of total calories | |
| Meat | 59 | |
| Veggie | 15 | |
| Fruit | 26 | |
| | 100 | |

| Day 4 (Day after physical exertion) | | |
|---|---|---|
| Lunch | Item(s) | Calories |
| Meat | 6oz Turkey breast | 290 |
| Veggie | 2C Cauliflower, Broccoli | 56 |
| Fruit | 1.5C Raspberries | 96 |
| Dinner | Item(s) | Calories |
| Meat | 4.5oz Flounder | 150 |
| Veggie | 1.5C Brussels Sprouts | 57 |
| Fruit | 1C Blueberries, 0.5 Lemon | 94 |
| | | 743 |
| Food | % of total calories | |
| Meat | 59 | |
| Veggie | 15 | |
| Fruit | 26 | |
| | 100 | |

FIGURE 34C

| Day 5 | | |
|---|---|---|
| Lunch | Item(s) | Calories |
| Meat | 6oz Lobster | 154 |
| Veggie | Salad w 1.5C mixed onion, bell pepper, mushroom | 46 |
| Fruit | 1C Cherries | 74 |
| Dinner | Item(s) | Calories |
| Meat | 4.5oz Beef | 268.5 |
| Veggie | 1.5C Green beans | 51 |
| Fruit | 2 Plums | 100 |
| | | 694 |
| Food | % of total calories | |
| Meat | | 61 |
| Veggie | | 14 |
| Fruit | | 25 |
| | | 100 |

| Day 6 | | |
|---|---|---|
| Lunch | Item(s) | Calories |
| Meat | 4.5oz Cod | 133.5 |
| Veggie | Salad w 1.5C mixed onion, bell pepper, mushroom, 1C Tomato | 78 |
| Fruit | 1C Blackberries, 1 Lemon | 84 |
| Dinner | Item(s) | Calories |
| Meat | 4.5oz Turkey breast | 217.5 |
| Veggie | 2C Zucchini, onion, mushrooms | 81 |
| Fruit | 1 Pear | 96 |
| | | 690 |
| Food | % of total calories | |
| Meat | | 51 |
| Veggie | | 23 |
| Fruit | | 26 |
| | | 100 |

FIGURE 34D

|  | Day 7 | |
|---|---|---|
| Lunch | Item(s) | Calories |
| Meat | 4.5oz Chicken | 208.5 |
| Veggie | 1.5C Cauliflower, Broccoli | 42 |
| Fruit | 1 Orange | 87 |
| Dinner | Item(s) | Calories |
| Meat | 3oz Bison | 165 |
| Veggie | Salad w 1C mixed onion, bell pepper, mushroom, 1C Tomato | 62 |
| Fruit | 2C Strawberries | 100 |
|  |  | 665 |
| Food | % of total calories | |
| Meat | 56 | |
| Veggie | 16 | |
| Fruit | 28 | |
|  | 100 | |

FIGURE 35

|  | Serving average per day | Practically speaking |
|---|---|---|
| Lunch | | |
| Meat | 1.5 portion | 4.5oz |
| Veggie | 1.5-2 portions | 1.5-2C |
| Fruit | 1 portion | 1C or medium sized |
| Dinner | | |
| Meat | 2 portion | 6oz |
| Veggie | 1.5-2 portions | 1.5-2C |
| Fruit | 1.5 portion | 1.5C or large sized |
| | | 750-850 calories |

|  | % of day's total calories | Preferred average of a week |
|---|---|---|
| Meat | ~55-60% | 55-60% |
| Veggie | ~15-20% | 15-20% |
| Fruit | ~20-30% | 20-25% |

FIGURE 36A

| Day 1 | | |
|---|---|---|
| Lunch | Item(s) | Calories |
| Meat | 4.5oz Chicken breast | 209 |
| Veggie | 2C Broccoli | 62 |
| Fruit | 1C Blueberries | 83 |
| Dinner | Item(s) | Calories |
| Meat | 6oz Shrimp | 198 |
| Veggie | 1.5C Artichokes | 90 |
| Fruit | 1.5 Apricot | 112.5 |
| | | 754 |
| Food | % of total calories | |
| Meat | 54 | |
| Veggie | 20 | |
| Fruit | 26 | |
| | 100 | |

| Day 2 | | |
|---|---|---|
| Lunch | Item(s) | Calories |
| Meat | 4.5oz Bison burger | 247.5 |
| Veggie | Salad w 1.5C mixed onion, bell pepper, mushroom, 1C tomato | 78 |
| Fruit | 1.5C Strawberries | 75 |
| Dinner | Item(s) | Calories |
| Meat | 6oz Chicken | 278 |
| Veggie | 2C Green beans | 68 |
| Fruit | 1 Orange | 87 |
| | | 834 |
| Food | % of total calories | |
| Meat | 63 | |
| Veggie | 18 | |
| Fruit | 19 | |
| | 100 | |

FIGURE 36B

| Day 3 | | |
|---|---|---|
| Lunch | Item(s) | Calories |
| Meat | 6oz Haddock | 190 |
| Veggie | 1.5C Asparagus | 41 |
| Fruit | 1 Apple, 0.5 Lemon | 106 |
| Dinner | Item(s) | Calories |
| Meat | 4.5oz Beef | 268.5 |
| Veggie | Salad w 1.5C mixed onion, bell pepper, mushroom, 1C Tomato | 78 |
| Fruit | 1C Cherries | 74 |
| | | 758 |
| Food | % of total calories | |
| Meat | | 61 |
| Veggie | | 16 |
| Fruit | | 24 |
| | | 100 |

| Day 4 | | |
|---|---|---|
| Lunch | Item(s) | Calories |
| Meat | 6oz Turkey breast | 290 |
| Veggie | 2C Cauliflower, Broccoli | 56 |
| Fruit | 1C Blueberries | 83 |
| Dinner | Item(s) | Calories |
| Meat | 6oz Flounder | 200 |
| Veggie | 1.5C Brussels Sprouts | 57 |
| Fruit | 1C Raspberries, 0.5 Lemon | 75 |
| | | 761 |
| Food | % of total calories | |
| Meat | | 64 |
| Veggie | | 15 |
| Fruit | | 21 |
| | | 100 |

FIGURE 36C

| Day 5 | | |
|---|---|---|
| Lunch | Item(s) | Calories |
| Meat | 6oz Scallops | 148 |
| Veggie | Salad w 1.5C mixed onion, bell pepper, mushroom, 1C Tomato | 78 |
| Fruit | 1.5C Cherries, 0.5 Lemon | 122 |
| Dinner | Item(s) | Calories |
| Meat | 4.5oz Beef | 268.5 |
| Veggie | 1.5C Green beans | 51 |
| Fruit | 2 Plums | 100 |
| | | 768 |
| Food | % of total calories | |
| Meat | | 54 |
| Veggie | | 17 |
| Fruit | | 29 |
| | | 100 |

| Day 6 | | |
|---|---|---|
| Lunch | Item(s) | Calories |
| Meat | 4.5oz Cod | 133.5 |
| Veggie | Salad w 1.5C mixed onion, bell pepper, mushroom, 1C Tomato | 78 |
| Fruit | 1C Blackberries, 1 Lemon | 84 |
| Dinner | Item(s) | Calories |
| Meat | 6oz Turkey breast | 290 |
| Veggie | 2C Zucchini, onion, mushrooms | 81 |
| Fruit | 1 Pear | 96 |
| | | 763 |
| Food | % of total calories | |
| Meat | | 51 |
| Veggie | | 23 |
| Fruit | | 26 |
| | | 100 |

FIGURE 36D

|  | Day 7 | |
|---|---|---|
| Lunch | Item(s) | Calories |
| Meat | 4.5oz Chicken | 208.5 |
| Veggie | 1.5C Cauliflower, Broccoli | 42 |
| Fruit | 1 Orange | 87 |
| Dinner | Item(s) | Calories |
| Meat | 6oz Bison | 330 |
| Veggie | Salad w 1C mixed onion, bell pepper, mushroom, 1C Tomato | 62 |
| Fruit | 2C Strawberries | 100 |
| | | 830 |
| Food | % of total calories | |
| Meat | 65 | |
| Veggie | 12 | |
| Fruit | 23 | |
| | 100 | |

FIGURE 37

| Lunch | Serving average per day | Practically speaking |
|---|---|---|
| Meat | 1-1.5 portion | 3-4.5oz |
| Veggie | 1-2 portions | 1-2C |
| Fruit | 1 portion | 1C or medium sized |
| Dinner | | |
| Meat | 1 portion | 3oz |
| Veggie | 1-2 portion | 1-2C |
| Fruit | 1 portion | 1C or medium sized |
| | | 500-550 calories |

| | % of day's total calories | Preferred average of a week |
|---|---|---|
| Meat | ~45-60% | 50-55% |
| Veggie | ~15-25% | 20-25% |
| Fruit | ~25-30% | 25-30% |

FIGURE 38A

| Day 1 | | |
|---|---|---|
| Lunch | Item(s) | Calories |
| Meat | 3oz Chicken breast | 139 |
| Veggie | 1.5C Broccoli | 47 |
| Fruit | 1C Blackberries | 62 |
| Dinner | Item(s) | Calories |
| Meat | 3oz Shrimp | 99 |
| Veggie | 1.5C Artichokes | 90 |
| Fruit | 1 Peach | 71 |
| | | 508 |
| Food | % of total calories | |
| Meat | 47 | |
| Veggie | 27 | |
| Fruit | 26 | |
| | 100 | |

| Day 2 | | |
|---|---|---|
| Lunch | Item(s) | Calories |
| Meat | 3oz Bison burger | 165 |
| Veggie | Salad w 1.5C mixed onion, bell pepper, mushroom | 46 |
| Fruit | 1.5C Tomato in salad | 48 |
| Dinner | Item(s) | Calories |
| Meat | 3oz Chicken | 139 |
| Veggie | 1C Green beans | 34 |
| Fruit | 1 Orange | 87 |
| | | 519 |
| Food | % of total calories | |
| Meat | 59 | |
| Veggie | 15 | |
| Fruit | 26 | |
| | 100 | |

FIGURE 38B

| Day 3 | | |
|---|---|---|
| Lunch | Item(s) | Calories |
| Meat | 3oz Haddock | 95 |
| Veggie | 1.5C Asparagus | 41 |
| Fruit | 1 Apple | 95 |
| Dinner | Item(s) | Calories |
| Meat | 3oz Beef | 179 |
| Veggie | Salad w 1.5C mixed onion, bell pepper, mushroom | 46 |
| Fruit | 1C Cherries | 74 |
| | | 530 |
| Food | % of total calories | |
| Meat | | 52 |
| Veggie | | 16 |
| Fruit | | 32 |
| | | 100 |

| Day 4 | | |
|---|---|---|
| Lunch | Item(s) | Calories |
| Meat | 3oz Turkey breast | 145 |
| Veggie | 1.5C Cauliflower, Broccoli | 42 |
| Fruit | 1C Blueberries | 83 |
| Dinner | Item(s) | Calories |
| Meat | 3oz Flounder | 100 |
| Veggie | 1.5C Brussels Sprouts | 57 |
| Fruit | 1C Raspberries, 0.5 Lemon | 75 |
| | | 502 |
| Food | % of total calories | |
| Meat | | 49 |
| Veggie | | 20 |
| Fruit | | 31 |
| | | 100 |

FIGURE 38C

| Day 5 | | |
|---|---|---|
| Lunch | Item(s) | Calories |
| Meat | 4.5oz Lobster | 115 |
| Veggie | Salad w 1.5C mixed onion, bell pepper, mushroom | 46 |
| Fruit | 1C Cherries | 74 |
| Dinner | Item(s) | Calories |
| Meat | 3oz Beef | 179 |
| Veggie | 1.5C Green beans | 51 |
| Fruit | 1 Plum | 50 |
| | | 515 |
| Food | % of total calories | |
| Meat | 57 | |
| Veggie | 19 | |
| Fruit | 24 | |
| | 100 | |

| Day 6 | | |
|---|---|---|
| Lunch | Item(s) | Calories |
| Meat | 3oz Cod | 89 |
| Veggie | Salad w 1.5C mixed onion, bell pepper, mushroom, 1C Tomato | 78 |
| Fruit | 1C Blackberries, 0.5 Lemon | 72 |
| Dinner | Item(s) | Calories |
| Meat | 3oz Turkey breast | 145 |
| Veggie | 1.5C Zucchini, onion, mushrooms | 41 |
| Fruit | 1 Pear | 96 |
| | | 521 |
| Food | % of total calories | |
| Meat | 45 | |
| Veggie | 23 | |
| Fruit | 32 | |
| | 100 | |

FIGURE 38D

| Day 7 | | |
|---|---|---|
| Lunch | Item(s) | Calories |
| Meat | 3oz Chicken | 139 |
| Veggie | 1.5C Cauliflower, Broccoli | 42 |
| Fruit | 1 Orange | 87 |
| Dinner | Item(s) | Calories |
| Meat | 3oz Bison | 165 |
| Veggie | Salad w 1C mixed onion, bell pepper, mushroom, 1C Tomato | 62 |
| Fruit | 1C Strawberries | 50 |
| | | 545 |
| Food | % of total calories | |
| Meat | 56 | |
| Veggie | 19 | |
| Fruit | 25 | |
| | 100 | |

FIGURE 39

| Lunch | Serving average per day | Practically speaking |
|---|---|---|
| Meat | 1 portion | 3-4.5oz |
| Veggie | 1-2 portions | 1-2C |
| Fruit | 1 portion | 1C or medium sized |
| Dinner | | |
| Meat | 1 portion | 3oz |
| Veggie | 1-2 portion | 1-2C |
| Fruit | 1 portion | 1C or medium sized |
| | | 500-550 calories |

| | % of day's total calories | Preferred average of a week |
|---|---|---|
| Meat | ~45-60% | 50-55% |
| Veggie | ~15-25% | 20-25% |
| Fruit | ~25-30% | 25-30% |

| Lunch | Serving average per day | Practically speaking |
|---|---|---|
| Meat | 1 portion | 3oz |
| Veggie | 1-2 portions | 1-2C |
| Fruit | 1 portion | 1C or medium sized |
| Dinner | | |
| Meat | 2 portion | 6oz |
| Veggie | 1-2 portion | 1-2C |
| Fruit | 1 portion | 1C or medium sized |
| | | 550-650 calories |

| | % of day's total calories | Preferred average of a week |
|---|---|---|
| Meat | ~50-60% | 55-60% |
| Veggie | ~15-25% | 20-25% |
| Fruit | ~25-30% | 25-30% |

FIGURE 40A

| Day 1 | | |
|---|---|---|
| Lunch | Item(s) | Calories |
| Meat | 3oz Chicken breast | 139 |
| Veggie | 1.5C Broccoli | 47 |
| Fruit | 1C Blackberries | 62 |
| Dinner | Item(s) | Calories |
| Meat | 3oz Shrimp | 99 |
| Veggie | 1.5C Artichokes | 90 |
| Fruit | 1 Peach | 71 |
| | | 508 |
| Food | % of total calories | |
| Meat | | 47 |
| Veggie | | 27 |
| Fruit | | 26 |
| | | 100 |

| Day 2 | | |
|---|---|---|
| Lunch | Item(s) | Calories |
| Meat | 3oz Bison burger | 165 |
| Veggie | Salad w 1.5C mixed onion, bell pepper, mushroom | 46 |
| Fruit | 1.5C Tomato in salad | 48 |
| Dinner | Item(s) | Calories |
| Meat | 3oz Chicken | 139 |
| Veggie | 1C Green beans | 34 |
| Fruit | 1 Orange | 87 |
| | | 519 |
| Food | % of total calories | |
| Meat | | 59 |
| Veggie | | 15 |
| Fruit | | 26 |
| | | 100 |

FIGURE 40B

| Day 3 (Day of physical exertion) |||
|---|---|---|
| Lunch | Item(s) | Calories |
| Meat | 6oz Haddock | 190 |
| Veggie | 1.5C Asparagus | 41 |
| Fruit | 1 Apple | 95 |
| Dinner | Item(s) | Calories |
| Meat | 3oz Beef | 179 |
| Veggie | Salad w 1.5C mixed onion, bell pepper, mushroom | 46 |
| Fruit | 1C Cherries | 74 |
| | | 625 |
| Food | % of total calories | |
| Meat | | 59 |
| Veggie | | 14 |
| Fruit | | 27 |
| | | 100 |

| Day 4 (Day after physical exertion) |||
|---|---|---|
| Lunch | Item(s) | Calories |
| Meat | 6oz Turkey breast | 290 |
| Veggie | 1.5C Cauliflower, Broccoli | 42 |
| Fruit | 1C Blueberries | 83 |
| Dinner | Item(s) | Calories |
| Meat | 3oz Flounder | 100 |
| Veggie | 1.5C Brussels Sprouts | 57 |
| Fruit | 1C Raspberries, 0.5 Lemon | 75 |
| | | 647 |
| Food | % of total calories | |
| Meat | | 60 |
| Veggie | | 15 |
| Fruit | | 24 |
| | | 100 |

FIGURE 40C

| Day 5 | | |
|---|---|---|
| Lunch | Item(s) | Calories |
| Meat | 4.5oz Lobster | 115 |
| Veggie | Salad w 1.5C mixed onion, bell pepper, mushroom | 46 |
| Fruit | 1C Cherries | 74 |
| Dinner | Item(s) | Calories |
| Meat | 3oz Beef | 179 |
| Veggie | 1.5C Green beans | 51 |
| Fruit | 1 Plum | 50 |
| | | 515 |
| Food | % of total calories | |
| Meat | | 57 |
| Veggie | | 19 |
| Fruit | | 24 |
| | | 100 |

| Day 6 | | |
|---|---|---|
| Lunch | Item(s) | Calories |
| Meat | 3oz Cod | 89 |
| Veggie | Salad w 1.5C mixed onion, bell pepper, mushroom, 1C Tomato | 78 |
| Fruit | 1C Blackberries, 0.5 Lemon | 72 |
| Dinner | Item(s) | Calories |
| Meat | 3oz Turkey breast | 145 |
| Veggie | 1.5C Zucchini, onion, mushrooms | 41 |
| Fruit | 1 Pear | 96 |
| | | 521 |
| Food | % of total calories | |
| Meat | | 45 |
| Veggie | | 23 |
| Fruit | | 32 |
| | | 100 |

FIGURE 40D

| Day 7 | | |
|---|---|---|
| Lunch | Item(s) | Calories |
| Meat | 3oz Chicken | 139 |
| Veggie | 1.5C Cauliflower, Broccoli | 42 |
| Fruit | 1 Orange | 87 |
| Dinner | Item(s) | Calories |
| Meat | 3oz Bison | 165 |
| Veggie | Salad w 1C mixed onion, bell pepper, mushroom, 1C Tomato | 62 |
| Fruit | 1C Strawberries | 50 |
| | | 545 |
| Food | % of total calories | |
| Meat | 56 | |
| Veggie | 19 | |
| Fruit | 25 | |
| | 100 | |

FIGURE 41

| Lunch | Serving average per day | Practically speaking |
|---|---|---|
| Meat | 1.5 portion | 4.5oz |
| Veggie | 1.5-2 portions | 1.5-2C |
| Fruit | 1 portion | 1C or medium sized |
| Dinner | | |
| Meat | 1.5 portion | 4.5oz |
| Veggie | 1.5-2 portions | 1.5-2C |
| Fruit | 1.5 portion | 1.5C or large sized |
| | | 650-750 calories |

| | % of day's total calories | Preferred average of a week |
|---|---|---|
| Meat | ~50-60% | 55-60% |
| Veggie | ~15-20% | 15-20% |
| Fruit | ~20-30% | 25-30% |

FIGURE 42A

| Day 1 | | |
|---|---|---|
| Lunch | Item(s) | Calories |
| Meat | 4.5oz Chicken breast | 209 |
| Veggie | 2C Broccoli | 62 |
| Fruit | 1C Blueberries | 83 |
| Dinner | Item(s) | Calories |
| Meat | 6oz Shrimp | 198 |
| Veggie | 1.5C Artichokes | 90 |
| Fruit | 1 Apricot | 75 |
| | | 717 |
| Food | % of total calories | |
| Meat | 57 | |
| Veggie | 21 | |
| Fruit | 22 | |
| | 100 | |

| Day 2 | | |
|---|---|---|
| Lunch | Item(s) | Calories |
| Meat | 3oz Bison burger | 165 |
| Veggie | Salad w 1.5C mixed onion, bell pepper, mushroom, 1C tomato | 78 |
| Fruit | 1 Nectarine | 62 |
| Dinner | Item(s) | Calories |
| Meat | 6oz Chicken | 278 |
| Veggie | 2C Green beans | 68 |
| Fruit | 1 Orange | 87 |
| | | 738 |
| Food | % of total calories | |
| Meat | 60 | |
| Veggie | 20 | |
| Fruit | 20 | |
| | 100 | |

FIGURE 42B

| Day 3 | | |
|---|---|---|
| Lunch | Item(s) | Calories |
| Meat | 6oz Haddock | 190 |
| Veggie | 1.5C Asparagus | 41 |
| Fruit | 1 Apple | 95 |
| Dinner | Item(s) | Calories |
| Meat | 4.5oz Beef | 268.5 |
| Veggie | Salad w 1.5C mixed onion, bell pepper, mushroom | 46 |
| Fruit | 1C Cherries | 74 |
| | | 715 |
| Food | % of total calories | |
| Meat | 64 | |
| Veggie | 12 | |
| Fruit | 24 | |
| | 100 | |

| Day 4 | | |
|---|---|---|
| Lunch | Item(s) | Calories |
| Meat | 6oz Turkey breast | 290 |
| Veggie | 2C Cauliflower, Broccoli | 56 |
| Fruit | 1C Blueberries | 83 |
| Dinner | Item(s) | Calories |
| Meat | 3oz Flounder | 100 |
| Veggie | 1.5C Brussels Sprouts | 57 |
| Fruit | 1C Raspberries, 0.5 Lemon | 75 |
| | | 661 |
| Food | % of total calories | |
| Meat | 59 | |
| Veggie | 17 | |
| Fruit | 24 | |
| | 100 | |

FIGURE 42C

| Day 5 | | |
|---|---|---|
| Lunch | Item(s) | Calories |
| Meat | 6oz Lobster | 154 |
| Veggie | Salad w 1.5C mixed onion, bell pepper, mushroom | 46 |
| Fruit | 1C Cherries | 74 |
| Dinner | Item(s) | Calories |
| Meat | 4.5oz Beef | 268.5 |
| Veggie | 1.5C Green beans | 51 |
| Fruit | 2 Plums | 100 |
| | | 694 |
| Food | % of total calories | |
| Meat | 61 | |
| Veggie | 14 | |
| Fruit | 25 | |
| | 100 | |

| Day 6 | | |
|---|---|---|
| Lunch | Item(s) | Calories |
| Meat | 4.5oz Cod | 133.5 |
| Veggie | Salad w 1.5C mixed onion, bell pepper, mushroom, 1C Tomato | 78 |
| Fruit | 1C Blackberries, 1 Lemon | 84 |
| Dinner | Item(s) | Calories |
| Meat | 4.5oz Turkey breast | 217.5 |
| Veggie | 2C Zucchini, onion, mushrooms | 81 |
| Fruit | 1 Pear | 96 |
| | | 690 |
| Food | % of total calories | |
| Meat | 51 | |
| Veggie | 23 | |
| Fruit | 26 | |
| | 100 | |

FIGURE 42D

| Day 7 | | |
|---|---|---|
| Lunch | Item(s) | Calories |
| Meat | 4.5oz Chicken | 208.5 |
| Veggie | 1.5C Cauliflower, Broccoli | 42 |
| Fruit | 1 Orange | 87 |
| | | |
| Dinner | Item(s) | Calories |
| Meat | 3oz Bison | 165 |
| Veggie | Salad w 1C mixed onion, bell pepper, mushroom, 1C Tomato | 62 |
| Fruit | 2C Strawberries | 100 |
| | | 665 |
| Food | % of total calories | |
| Meat | 56 | |
| Veggie | 16 | |
| Fruit | 28 | |
| | 100 | |

METHODS OF REDUCING VISCERAL FAT AND RELATED COMPOSITIONS

CROSS-REFERENCE TO RELATED APPLICATIONS

This application is a continuation of U.S. patent application Ser. No. 15/679,043, filed on Aug. 16, 2017, the entire contents of which are incorporated herein by reference.

BACKGROUND

According to the United States Center for Disease Control's (CDC) most recent data of 2016, approximately two-thirds of all adults in the United States are considered overweight with a Body Mass Index (BMI) value of over 25. Perhaps even more concerning is that approximately 38% of adults the United States are obese, having a BMI value over 30. (See, Flegal et al., *J. of the American Med. Assoc.*, 315(21):2284-2291, 2016; and Jensen et al., *Obesity*, 22(S2):S1-S410, 2014). Obese adults have a dramatically higher risk and incidence of metabolic and cardiovascular diseases (CVD). Current weight loss guidelines from organizations such as the American Heart Association, American College of Cardiology, and The Obesity Society, recommend approaches that typically produce modest weight loss, e.g., 5% to 10% of body weight over a 6-month period. (See, "NHLBI: Clinical guidelines on the identification, evaluation, and treatment of overweight and obesity in adults: The evidence report," *Obesity Res.*, 6:51S-209S, 1998; and US Food and Drug Administration, "Guidance for industry developing products for weight management," Washington, D.C.: Food and Drug Administration, 2007).

Weight loss guidelines for overweight adults often suggest a combination approach of dietary modification including calorie reduction along with exercise, and/or pharmacological intervention (See, Isoldi et al., *Endotext*, In: De Groot et al., editors, South Dartmouth (MA), MDText.com, Inc., 2000, ncbi.nlm.nih.gov/books/NBK279038/). A mere 5% change in body weight has been deemed the threshold to meet as a primary efficacy endpoint for a drug/regimen to be considered by the US Food and Drug Administration (FDA). (See, Id.). While some current interventions are modestly effective, many artisans in the field would argue that a loss of 5% of overall body weight, e.g., 12.5 pounds lost with a starting weight of 250 pounds, or severely obese adult, e.g. a weight loss of 17.5 pounds with a starting weight of 350 pounds, is not sufficient to significantly impact a person's health and risk of disease in the long-term.

While reduction of body weight is important, body weight alone is not an adequate measure of reduction in disease risk and improvement in overall health. (See, DesPres et al., *Arteriosclerosis*, 10:497-511, 1990). There remains a significant need for effective interventions that address more than just the single factor of body weight. Truly meaningful interventions need not to be complicated, can be adopted by a wide range of individuals with different comorbid and health histories, and above all are able to positively affect metabolic and cardiovascular disease risk as measured by endpoints, or surrogates, beyond just body weight.

Many previous studies evaluating dietary interventions fall into two main categories: low calorie diet of less than 850 calories per day alone, or the 850 calorie or less diet combined with various other requirements such as an imposed exercise regimen, pharmacological treatment, and/ or surgery. Other prior published studies include diets of more than 850 calories but also optionally include specific exercise regimens and/or pharmacological intervention. For example, the scientific literature includes many examples of calorie-restricted diets, low calorie diets, and very low-calorie diets (VLCDs). (See, for example, Gomez-Arbelaez et al., *J. Clin. Endocrinol. Metab.*, 102(2):488-498, 2017; Claessens et al., *Int'l. J. Obesity*, 33:296-304, 2009; Gu et al., *Evidence-Based Compl. Alt. Med.*, vol. 2013, Article ID 760804, 2013, doi:10.1155/2013/760804; Hemminsson et al., *Am. J. Clin. Nutr.*, 96:953-961, 2012; Hookey et al., *Diabesity in Pract.*, 3:70-77, 2014; Rolland et al., *Clin. Obesity*, 3(5): 150-158, 2013; Snel et al., *Obesity*, 20(8): 1572-1576, 2012; and Volek at al., *Nutrition & Metabolism (Lond.)*, 1:13, 2004, doi: 10.1186/1743-7075-1-13).

However, conventional programs typically fall short of achieving desired goals for one or more reasons. For example, conventional programs do not account for or address the hazards associated with consumption of pre-packaged or pre-prepared food items. Conventional diet regimens also typically include lengthy exclusion criteria, including many comorbidities commonly associated with obesity, or include an exercise requirement. Another type of conventional program merely provides a short duration regimen intended to precede bariatric surgery. (See, Cleveland et al., *Am. J. Surg.*, 212(5):927-930, 2016; and Wu et al., *Medicine*, 95:e2616, 2016). Others require inconvenient and costly in-patient hospitalization (DePergola et al., *Obesity Res.*, 6(6):408-415, 1998), pharmacologic intervention as an adjunct treatment (Doucet et al., *Eur. J. Clin. Nutr.*, 56(4):297-304, 2002; Kelley et al., *Diabetes Care*, 27:33-40, 2004), and/or inconvenient and difficult to enforce group meeting requirements (Hookey et al., *Diabesity in Pract.*, 3:70-77, 2014; and Rolland et al., *Clin. Obesity*, 3(5): 150-158, 2013).

Most conventional weight loss programs employ an endpoint of weight reduction or change in BMI. These programs experience only modest success. A new approach is needed to combat the epidemic of obesity in the United States. The new approach provided herein employs functional measures or surrogates of cardiovascular and metabolic disease risk instead of simple weight loss end points. In the disclosed methods and compositions, caloric restriction is employed in a very specific manner that yields a reduction in the level and accumulation of visceral adipose tissue (visceral fat). Visceral fat (VF) is a well-characterized direct marker of cardiovascular and metabolic disease risk in both young and old humans. (See, DesPres et al., *Circulation*, 126:1301-1313, 2012; Goran et al., *Am. J. Clin. Nutr.*, 70S:149S-156S, 1999; and Wade, Marcia, "The Risks of Belly Fat—and How to Beat Them," accessed from webmd.com/obesity/features/the-risks-of-belly-fat#1, 2015). The methods and compositions provided herein are directed to interventions that are motivated by a different goal, i.e. the primary outcome measure is a reduction in VF, which is directly linked to cardiovascular and metabolic disease risk. Unlike conventional weight loss programs, by employing this measure as an end point, astonishing results are obtained in which not only is weight reduced, but subjects experience a marked reduction in risk for cardiovascular and metabolic disease.

What is needed is a generally applicable method of reducing VF in the general population to increase the quality of life and provide clinically significant reductions in the risk of diseases associated with VF. To this end, the disclosed methods and compositions herein are aimed at decreasing this risk factor that is directly linked to cardiovascular and metabolic diseases. The methods disclosed herein employ not simply a reduced calorie diet, but also imposes specific restrictions on the portion size of food categories than can be consumed on a daily basis, as well as the compositions of any consumed foods. These parameters, including duration, calorie level, and/or food portion selection, are fully adjustable to take into account subject-specific variables, such as age, gender, baseline characteristics, relative level of physical activity, or to include adjunctive items to support and sustain safe VF reduction.

SUMMARY

Provided are methods and compositions aimed at decreasing VF in a subject. The described methods include various specific steps and regimens including the following. First determining an initial (baseline) amount of VF in a subject, then prescribing and/or administering to the subject a calorie-restricted diet of approximately 500 to 850 calories per day. The effects of the calorie-restricted diet are measured by determining a second amount of VF in the subject and comparing this with the baseline measurement.

This process is typically continued until VF in the subject is decreased by at least about 6.5% to 56% based on the difference between the first amount of VF (baseline) and the second amount of VF.

The subject can be any animal, such as a human being, but is not necessarily restricted to only human beings. The human can be of any age, but generally the methods and compositions provided herein can be most effective for humans of between 12 and 90 years of age.

The disclosed methods and compositions can be administered for any length of time necessary, but generally intended results can be achieved at between 19 and 60 days of the described regimen.

The amount of VF in the subject can be determined by any known means of determining VF. Various commercial products are available for this purpose. For example, VF can be determined by employing one or more of the following types of methodologies: bioelectric impedance measuring devices, body mass index (BMI), measurement of neck, thigh, waist, and/or hip circumference, hip to waist ratio measurements, neck to thigh ratio measurements, waist to thigh ratio measurements, sagittal abdominal diameter measurement, ultrasound detection of VF, dual image/dual energy x-ray absorptiometry methods, air displacement plethysmography, and computed tomography. In particular embodiments, the VF present in the subject is determined by a class 2 bioelectric impedance device, such as, for instance, one or more of the known commercially available class 2 bioelectric impedance devices, including, for example instruments manufactured by Tanita®, Omron®, InBody®, Seca®, and/or Boditrax®.

Generally, subjects employing the described methods and compositions can be healthy human beings with no known comorbidities or diagnosed medical conditions. For instance, the subject can be one that is not pregnant, is not breastfeeding, is not currently receiving cancer therapy, is not currently receiving immunosuppressants following organ transplant, is not a practicing vegetarian, has not been diagnosed with bipolar disorder, schizophrenia, or advanced Alzheimer's disease. On the other hand, the disclosed methods and compositions can also be effectively employed to reduce VF in subjects with various comorbidities, including, but not limited to, type 2 diabetes, hypertension, dyslipidemia or triglyceridemia, hypocholesterolemia, cardiovascular conditions and diseases, depression, weight loss or gain six months prior to performing the method, surgery (including weight loss surgery), hypothyroidism, and/or abnormal glucose tolerance (such as pre-diabetes).

In one embodiment of the disclosed methods, subjects are restricted to ingesting of food only within a prescribed constant daily time period of 10 hours. For instance, in one embodiment, the subject is restricted to ingesting food only between 4 to 6 hours after waking and 3 to 5 hours before sleep.

The subject can be any subject, such as one that has low levels of VF, high levels of VF, or any value between. In some embodiments, the number of calories to which the subject is restricted can be altered depending on the amount of starting (baseline) VF in the subject. Further, subjects can be categorized into those that are sedentary or active, e.g., those that are sedentary, acutely active, chronically active, etc. Thus, in one embodiment, subjects with low VF who are sedentary can be prescribed a calorie-restricted diet of between 650 and 725 calories per day. Subjects with low VF that are acutely active can be prescribed a calorie-restricted diet of between 650 and 800 calories per day. Subjects with low VF that are chronically active can be prescribed a calorie-restricted diet of between 750 and 850 calories per day.

In other embodiments of the disclosed methods and compositions, subjects who are determined to have a high level of VF and are sedentary can be prescribed a calorie-restricted diet of between 500 and 550 calories per day. In other embodiments, the subjects who are determined to have a high level of VF and are acutely active can be prescribed a calorie-restricted diet of between 500 and 650 calories per day. In other embodiments, the subjects who are determined to have a high level of VF and are chronically active can be prescribed a calorie-restricted diet of between 650 and 750 calories per day.

In such embodiments of the disclosed methods, sedentary subjects are those that have on average an increased heart rate above resting level for less than about 45 minutes per day. Acutely active subjects can be those that have, on average, an increased heart rate above resting level for about 45 minutes or more, one to two times per week. Further, a chronically active subject is one that has, on average, an increased heart rate above resting level for about 45 minutes or more, three times or more per week.

In some embodiments, the methods and compositions described herein can be tailored to the gender of the subject, i.e., the calorie-restricted diet limits can be adjusted depending on whether the subject is male or female.

Furthermore, various methodologies can be employed to determine whether a subject is one who has high VF or low VF. For example, when the subject is male and the amount of VF in the subject is determined by hip to waist ratio, then low VF can be, for example, a score of less than 0.85, and high VF can be, for example, a score greater than or equal to 0.85. When the subject is female and the amount of VF in the subject is determined by hip to waist ratio, then low VF can be, for instance, a score of less than 0.90, and high VF can be, for instance, a score greater than or equal to 0.90. Further, if the subject is male and the amount of VF in the subject is determined by waist circumference, then low VF can be, as an example, a score of less than 90 cm, and high VF can be, for example, a score greater than or equal to 90 cm. In another embodiment, if the subject is female and the amount of VF in the subject is determined by waist circumference, then low VF can be, for example, a score of less than 80 cm, and high VF can be, for example, a score greater than or equal to 80 cm.

In other embodiments, if the amount of VF in the subject is determined by sagittal abdominal diameter, then low VF can in some instances be, for example, a score of less than 25 cm, and high VF can be, in other instances, a score greater than or equal to 25 cm, for example. Additionally, in some embodiments, if the amount of VF in the subject is determined by ultrasound, then low VF can be, for instance, an intra-abdominal thickness score of less than 7 cm, and high VF can be, for instance, an intra-abdominal thickness score greater than or equal to 7 cm.

As a further example of determining high or low VF of the subject, if the subject is male and the amount of VF in the subject is determined by magnetic resonance imaging (MRI), computerized tomography (CT), or dual-energy x-ray absorptiometry (DEXA), then low VF in some instances can be, for example, a score of less than 90 cm$^2$, and high VF, in other instances, can be a score greater than or equal to 90 cm$^2$, for example. Where the subject is female and the amount of VF in the subject is determined by MRI, CT, or DEXA, then low VF in such an embodiment can be a score of less than 70 cm$^2$, for instance, and high VF can be a score greater than or equal to 70 cm$^2$. In another specific embodiment, where the amount of VF in the subject is determined by a class 2 bioelectric impedance instrument, high VF and low VF can be indicated by the bioelectric impedance instrument itself, based on proprietary algorithms employed by the commercially available class 2 bioelectric impedance device used in the measurement.

In another embodiment of the disclosed methods and compositions, the subject can be between about 40 years old and about 65 years old. In such an embodiment, when the subject is between 40 and 49 years of age, the diet can be administered for instance for about 20 days and/or until the VF of the subject is decreased by about 10.7%, or about 9.8% and about 12.2% for male subjects and female subjects, respectively. In another embodiment, when the subject is between 50 and 59 years of age, the diet can be administered for instance for about 20 days and/or until the VF of the subject is decreased by about 10.3%, or about 9.3% and about 10.8% if the subject is female or male, respectively. In such an embodiment, when the subject is more than 59 years of age, the diet can be administered for instance for about 20 days and/or until the VF of the subject is decreased by about 5.0%. In another embodiment, when the subject is between 40 and 49 years of age, the diet can be administered for instance for about 40 days and/or until the VF of the subject is decreased by about 18.9%, or about 17.9% to about 19.2% when the subject is female or male, respectively. In another embodiment, when the subject is between 50 and 59 years of age, the diet can be administered for instance for about 40 days and/or until the VF of the subject is decreased by about 19.4%, or about 15.4% to about 21.1% when the subject is female or male, respectively. In another embodiment, when the subject is older than 59 years of age, the diet can be administered for instance for about 40 days and/or until the VF of the subject is decreased by about 15.5%, or about 13.8% to about 16.4% when the subject is female or male, respectively. In an alternative embodiment, when the subject is between 40 and 49 years of age, the diet is administered for about 60 days, for example, and/or until VF is decreased by about 24.7%, or from about 21.1% to about 26% when the subject is female or male, respectively. In another alternative embodiment, when the subject is between 50 and 59 years of age, the diet is administered for about 60 days, for example, and/or until VF is decreased by about 24.7%, or from about 19.8% to about 26.9% when the subject is female or male, respectively. In another embodiment, when the subject is older than 59 years of age, the diet can be administered for instance for about 60 days and/or until the VF of the subject is decreased by about 22.3%, or about 18.7% to about 24.7% when the subject is female or male, respectively.

In some instances of the methods of compositions provided herein, the subject can experience a mean reduction in visceral fat of between about 5% and about 30%, for example when the diet is administered for about 20 days to about 60 days.

The calorie-restricted diet employed by the disclosed methods and compositions is a specific diet comprised of specific components administered at specific times. For example, the calorie-restricted diet can consist of: (a) no more than about 1 gallon of non-caffeinated beverages per day, (b) two to three daily portions each of meat, vegetables, and fruit, and optionally (c) flavorants. In such embodiments, flavorants can be any one or more of spices, *Stevia*, erythritol, monkfruit extract, pink Himalayan sea salt, and any combination thereof. In such an embodiment, a "portion" of meat can be about 3 ounces of meat, a "portion" of vegetables can be about 1 cup of vegetables, and a "portion" of fruit can be about 1 cup of fruit. Further, in such embodiments, the non-caffeinated beverages can be one or more of unsweetened iced tea, club soda, coffee, seltzer water, and water, and/or any combination thereof. The water can optionally include one or more of various additives such as *Stevia*, lemon juice, lime juice, vitamin C, citric acid, monkfruit extract, erythritol, and xylitol, and combinations thereof.

In the calorie-restricted diet employed by the disclosed methods, when meat is consumed by the subjects, the meat can be fresh or flash frozen, preferably only fresh or flash frozen, optionally from organically grown and/or free-range raised animals. The meat consumed by the subjects in this calorie-restricted diet is preferably less than 7% fat and is selected from any one or more protein sources including, for example, chicken, turkey, fish, shellfish, beef, egg whites, and any combination thereof. In such embodiments, it is most preferable that the beef is obtained only from cow, bison, elk, deer, or any combination thereof. In these embodiments of the calorie-restricted diet, the beef, when consumed by the subject, should consist of beef tenderloin, beef sirloin, beef London broil, beef fillet, or any combination thereof. Further, fish and shellfish, when consumed by the subject, are most preferably one or more of cod, flounder, haddock, halibut, tilapia, sea bass, red snapper, wahoo, grouper, marlin, pollock, trout, sole, red fish, tuna, squid, octopus, mussels, lobster, shrimp, crab, scallops, oysters, clams, mussels, and any combination thereof. Additionally, in such embodiments of the administered calorie-restricted diet, the chicken, fish, and turkey do not comprise skin, fat, and does not include deli cuts. Further, no calories in the diet are added to the chicken, fish, or turkey other than flavorants.

In other embodiments of the disclosed methods and compositions, the calorie-restricted diet can include various portions of vegetables as described above. The vegetables and the fruit are most preferably those that are organically grown, are fresh or flash frozen, and are not dried, not canned, and not preserved. In such embodiments, vegetables can be one or more of artichokes, asparagus, bamboo shoots, bean sprouts, broccoli, brussels sprouts, cabbage, cauliflower, celery, cucumber, fennel, leafy greens, garlic, green beans, green peas, leeks, mushrooms, okra, onion, radishes, shallots, tomatoes, peppers, bell peppers, hot peppers, zucchini, and any combination thereof, and leafy greens can be one or more of arugula, spinach, kale, cabbage, bok choy, swiss chard, collard greens, dandelion greens, lettuce, and any combination thereof. Further, in embodiments in which portions of fruit are to be consumed by the subject, the fruit can be one or more of citrus fruit, berries, cherries, apples, apricots, peaches, pears, plum, nectarines, and any combination thereof, where the citrus fruit can be one or more of lemon, lime, grapefruit, tangerine, mandarin oranges, ugly fruit, clementine, tangelo, and any combination thereof, and wherein the berries consist of raspberries, blackberries, blueberries, strawberries, and any combination thereof.

In various embodiments of the disclosed methods and compositions, subjects that are deemed to be low in VF are prescribed a calorie-restricted diet in which 50% to 60% of caloric intake is derived from meat, 15 to 20% of daily caloric intake is derived from vegetables, and 20% to 30% of daily caloric intake is derived from fruit. In other embodiments of the disclosed methods and compositions, subjects that are deemed to be high in VF are prescribed a calorie-restricted diet in which 45% to 60% of daily caloric intake is derived from meat, 15% to 25% of daily caloric intake is derived from vegetables, and 20% to 30% of daily caloric intake is derived from fruit.

The disclosed methods and compositions encompass subjects that typically experience an increase in heart rate for about 45 minutes or more above resting levels, i.e. an "acutely active" subject. In such embodiments, subjects deemed to be low in VF as a baseline measurement can be administered about 3 to 3.5 portions of meat, about 3 to 4 portions of vegetables, and about 2 to 2.5 portions of fruit. In such embodiments, where the subject is deemed to have a high level of VF as a baseline measurement, the subject can be administered about 2 to 3 portions of meat, about 2 to 4 portions of vegetables, and about 2 portions of fruit. In additional embodiments, where the subject experiences no increase in heart rate for about 45 minutes or more above resting levels, subjects deemed to have a low VF baseline measurement can be administered about 3 portions of meat, about 3 to 3.5 portions of vegetables, and about 2 portions of fruit. In additional embodiments, where the subject experiences no increase in heart rate for about 45 minutes or more above resting levels, subjects deemed to have a high VF baseline measurement can be administered about 2 to 2.5 portions of meat, about 2 to 4 portions of vegetables, and about 2 portions of fruit.

In some specific embodiments of the calorie-restricted diet administered to the subject, no oil is added to the food, no salt is added to the food except optionally Himalayan pink salt, no synthetic or natural sugars or artificial sweeteners are added to the food, and no monosodium glutamate (MSG) is added to the food at any time during the method.

When the subject wishes to add flavorants or spices to the administered calorie-restricted diet, the spices can be dried and crushed plant material of one or more different sources, such as nutmeg, allspice, pepper, chive, oregano, cilantro, cinnamon, basil, bay leaves, cloves, coriander, cumin, fennel, garlic, ginger, juniper, mace, marjoram, mint, onion, paprika, parsley, rosemary, saffron, caraway seed, celery seed, parsley, tarragon, thyme, mustard seed, anise seed, poppy seed, lemongrass, star anise, turmeric, peppercorn, savory, achiote seed, epazote, sage, vanilla bean, and combinations thereof.

In embodiments in which the VF is determined by use of a Tanita® class 2 bioelectric impedance device, a subject with low VF is one that has a score of less than about 11, and a subject with high VF is one that has a score of greater than or equal to about 11. In embodiments in which the VF is determined by use of an Omron® class 2 bioelectric impedance device, a subject with low VF is one that has a score of less than about 10, and a subject with high VF is one that has a score of greater than or equal to about 10. In embodiments in which the VF is determined by use of an InBody® class 2 bioelectric impedance device, a subject with low VF is one that has a score of less than about 11 or about 70 $cm^2$, and a subject with high VF is one that has a score of greater than or equal to about 11 or about 70 $cm^2$. In embodiments in which the VF is determined by use of a Seca® class 2 bioelectric impedance device, a subject with low VF is one that has a score of less than about 2.0, and a subject with high VF is one that has a score of greater than or equal to about 2.0. In embodiments in which the VF is determined by use of an BodiTrax® class 2 bioelectric impedance device, a subject with low VF is one that has a score of less than about 11, and a subject with high VF is one that has a score of greater than or equal to about 11.

In one embodiment of the disclosed methods, the subject is administered a calorie-restricted diet that never, on any day, includes less than about 500 calories. In such embodiments, the subject never consumes less than 500 calories per day, on average.

In the disclosed methods and compositions, it is understood that VF means fat surrounding the subject's thoracic and abdominal organs, intra-abdominal adipose tissue, and/or organ fat. VF also includes mesenteric fat, omental fat, periaortic fat, epicardial fat, intramuscular fat, neck adipose tissue, gonadal fat, or perirenal fat. As such, the thoracic and abdominal organs are understood to include at least the stomach, liver, pancreas, kidneys, heart, lungs, and intestines. VF is not subcutaneous fat.

Thus, in one specific embodiment of the disclosed methods and compositions, the method involves first determining an initial base-line amount of VF in the subject, and then administering to the subject a calorie-restricted diet of about 500 to about 850 calories per day. After a period of about 20 to about 60 days, a second the amount of VF is determined for the subject. These steps can continue until VF is decreased by about 5% to about 56%, or between about 5% and about 29.5% based on a difference between the first base-line VF value in the subject and the later determination of the amount of VF. In such an embodiment, the subject can be, for instance, between 12 and 90 years of age. Also in such an embodiment, the daily calorie-restricted diet can include no more than 1 gallon of non-caffeinated beverages, two to three portions each of meat, vegetables, and fruit, and flavorants, where flavorants include only spices, Stevia, erythritol, monkfruit extract, pink Himalayan sea salt, and combinations thereof. In such embodiments, the portion of meat administered to the subject is about 3 ounces, the portion of vegetables is about 1 cup, and the portion of fruit is about 1 cup, and the meat is fresh or flash frozen, less than 7% fat, and is selected from the group solely consisting of chicken, turkey, fish, shellfish, beef, egg whites, and any combination thereof. In such embodiments, no oil, salt (except pink Himalayan salt), monosodium glutamate (MSG), synthetic and natural sugars, or artificial sweeteners are added to any of the food consumed by the subject during this method. However, in such embodiments, the subject never on any day consumes less than 500 calories.

BRIEF DESCRIPTION OF THE DRAWINGS/FIGURES

FIG. 1 provides the baseline and experimental values of mean VF ratings for 20-Day cohort samples, where results are grouped either as all subjects together or results of subjects separated by gender.

Figure 2:
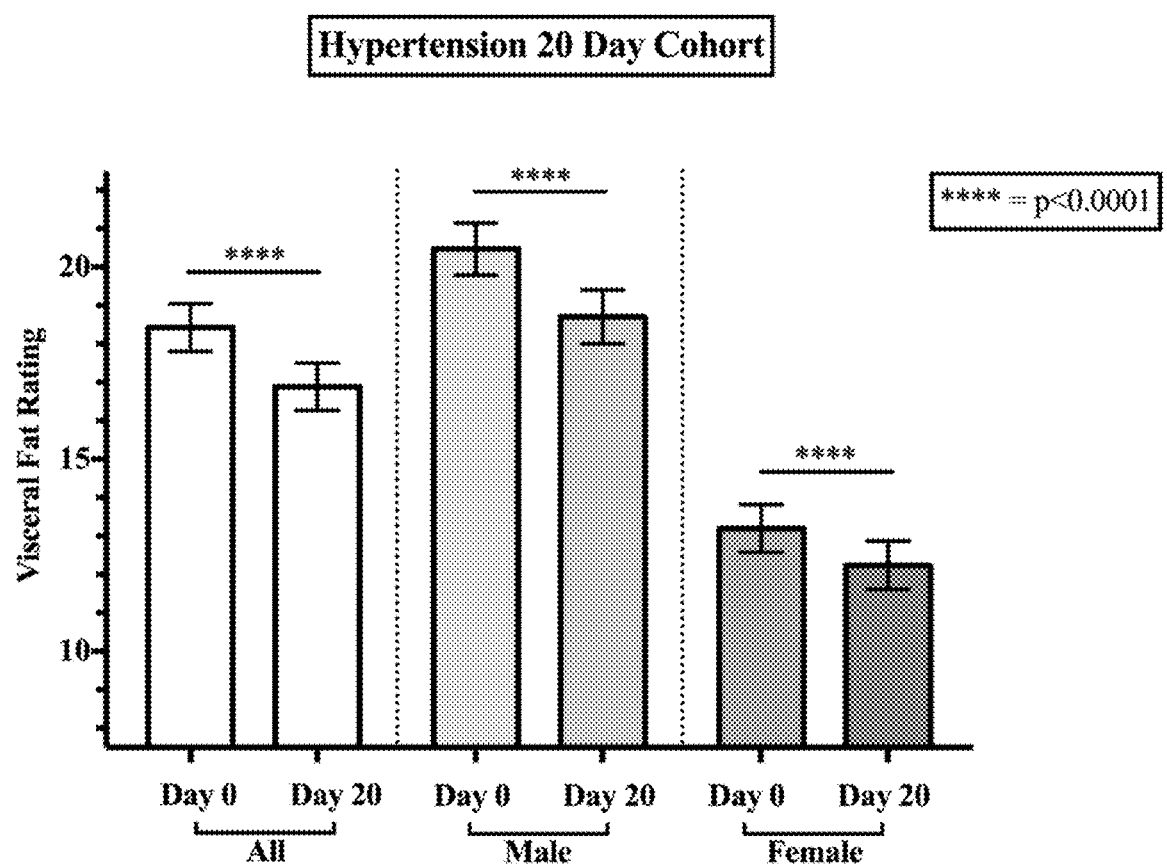

FIG. 2 provides the baseline and experimental values of mean VF ratings for 20-Day hypertension cohort subjects (subjects who were currently prescribed and taking one or more pharmaceutical drugs to treat hypertension on Day 1), where results are grouped either as all subjects together or results of subjects separated by gender.

Figure 3:
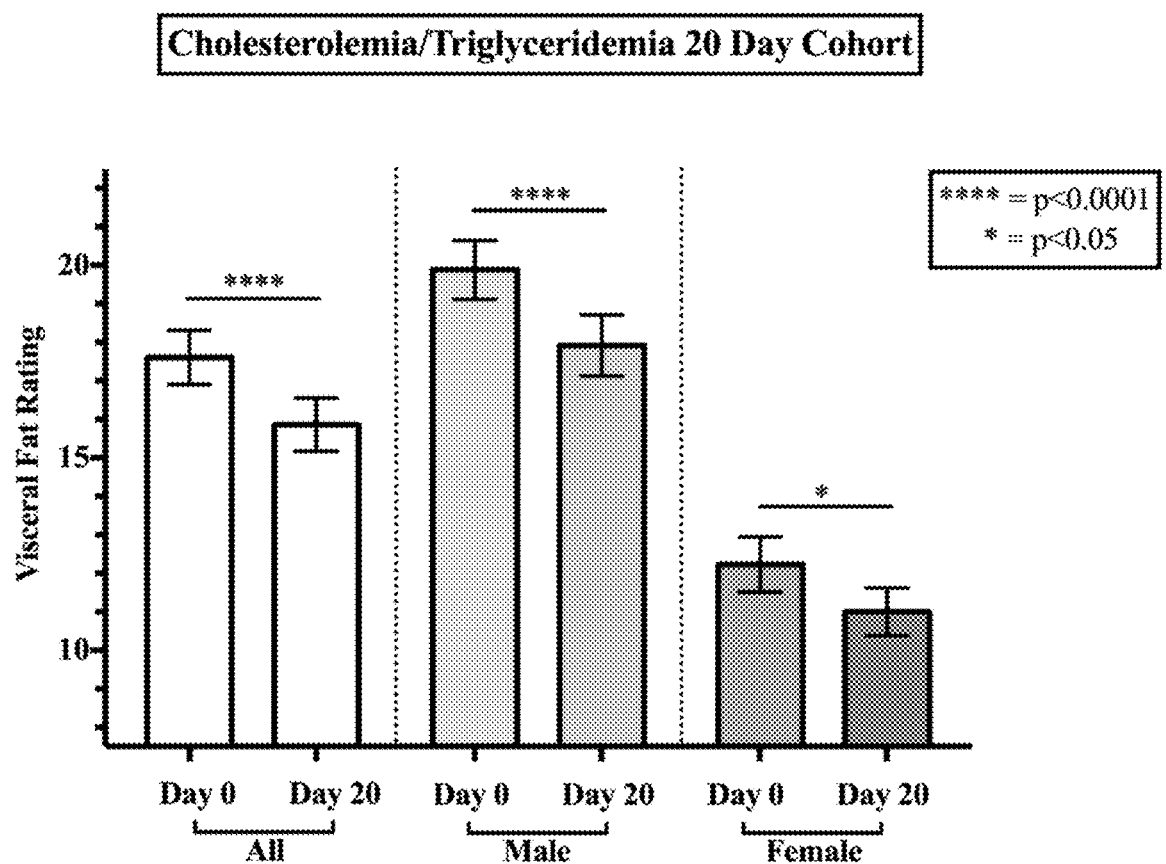

FIG. 3 provides the baseline and experimental values of mean VF ratings for 20-Day cholesterolemia/triglyceridemia cohort subjects (subjects who were currently prescribed and taking one or more pharmaceutical drugs to treat elevated lipids and/or triglycerides on Day 1), where results are grouped either as all subjects together or results of subjects separated by gender.

Figure 4:
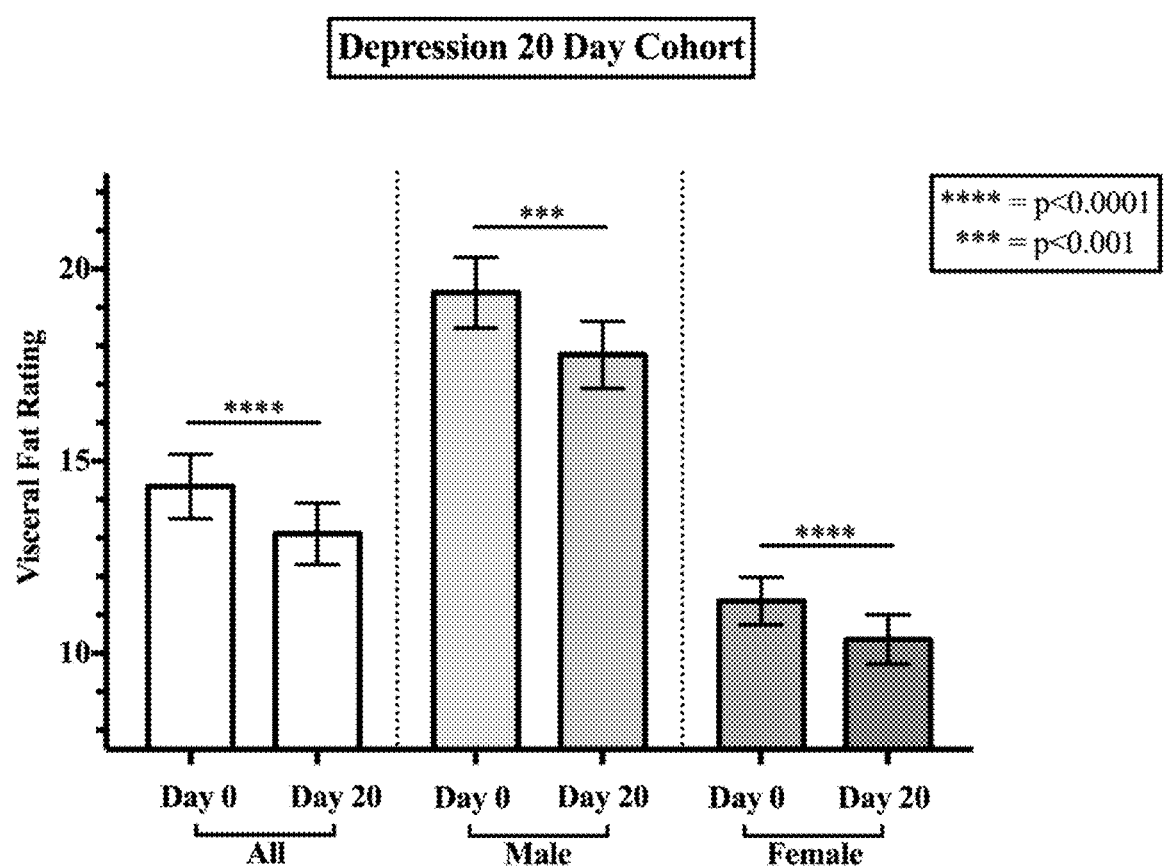

FIG. 4 provides the baseline and experimental values of mean VF ratings for 20-Day depression cohort subjects (subjects who were currently prescribed and taking one or more pharmaceutical drugs to treat depression on Day 1), where results are grouped either as all subjects together or results of subjects separated by gender.

Figure 5:
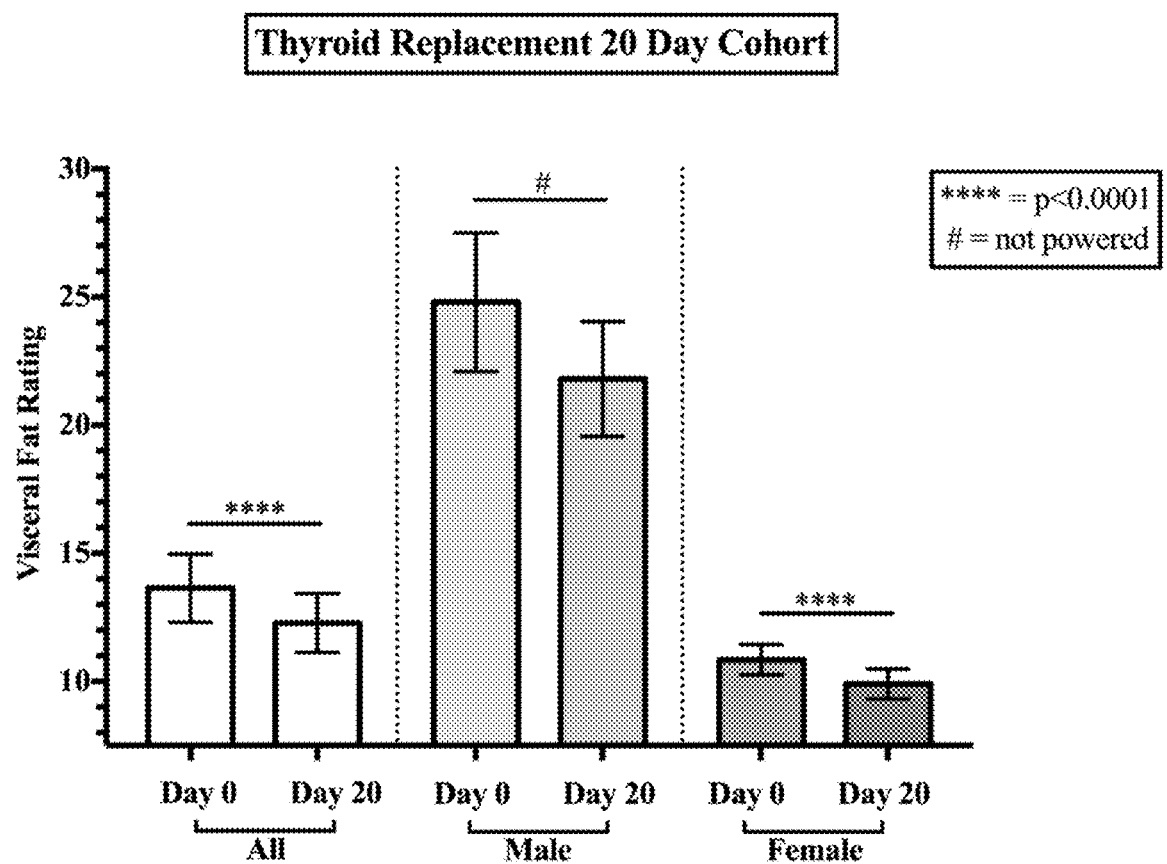

FIG. 5 provides the baseline and experimental values of mean VF ratings for 20-Day thyroid replacement cohort subjects (subjects who were currently prescribed and taking one or more pharmaceutical thyroid hormone replacement drugs on Day 1), where results are grouped either as all subjects together or results of subjects separated by gender.

Figure 6:
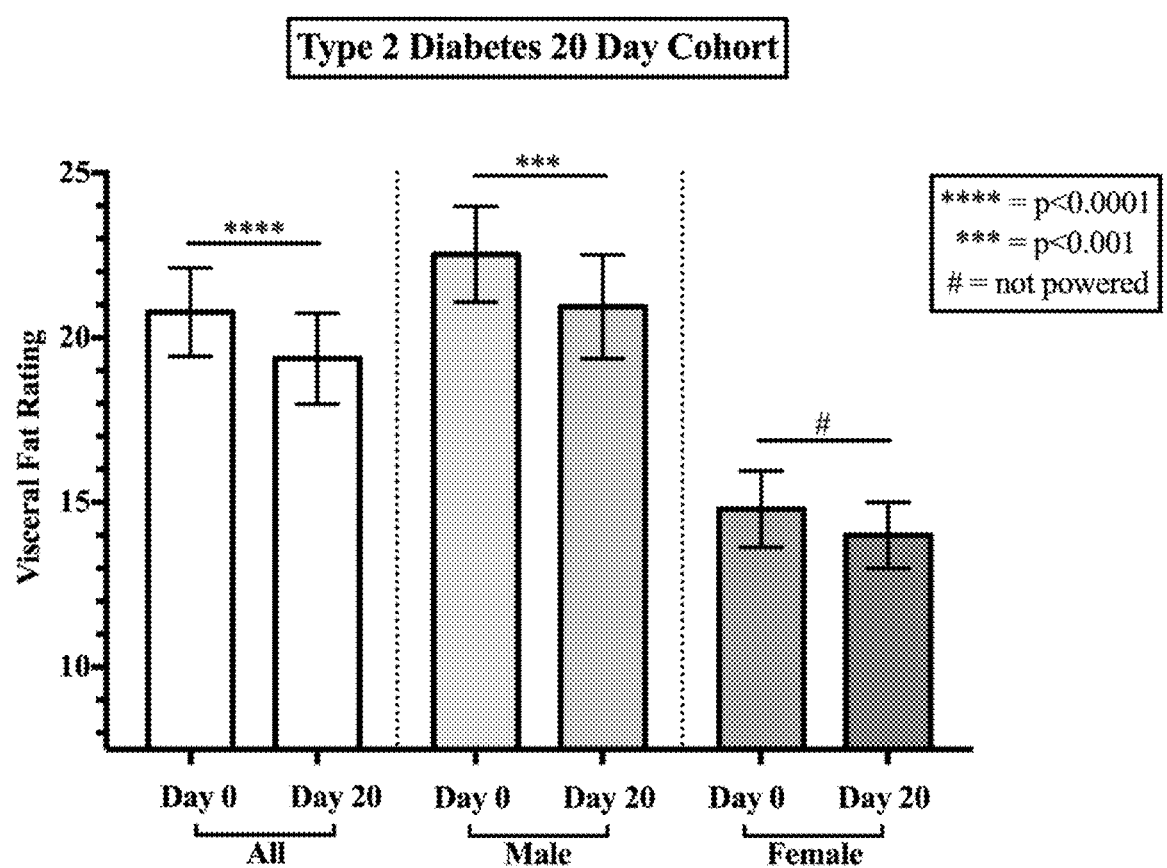

FIG. 6 provides the baseline and experimental values of mean VF ratings for 20-Day type 2 diabetes cohort subjects (subjects who were currently prescribed and taking one or more oral or injectable pharmaceutical drugs to treat Type 2 Diabetes on Day 1), where results are grouped either as all subjects together or results of subjects separated by gender.

Figure 7:
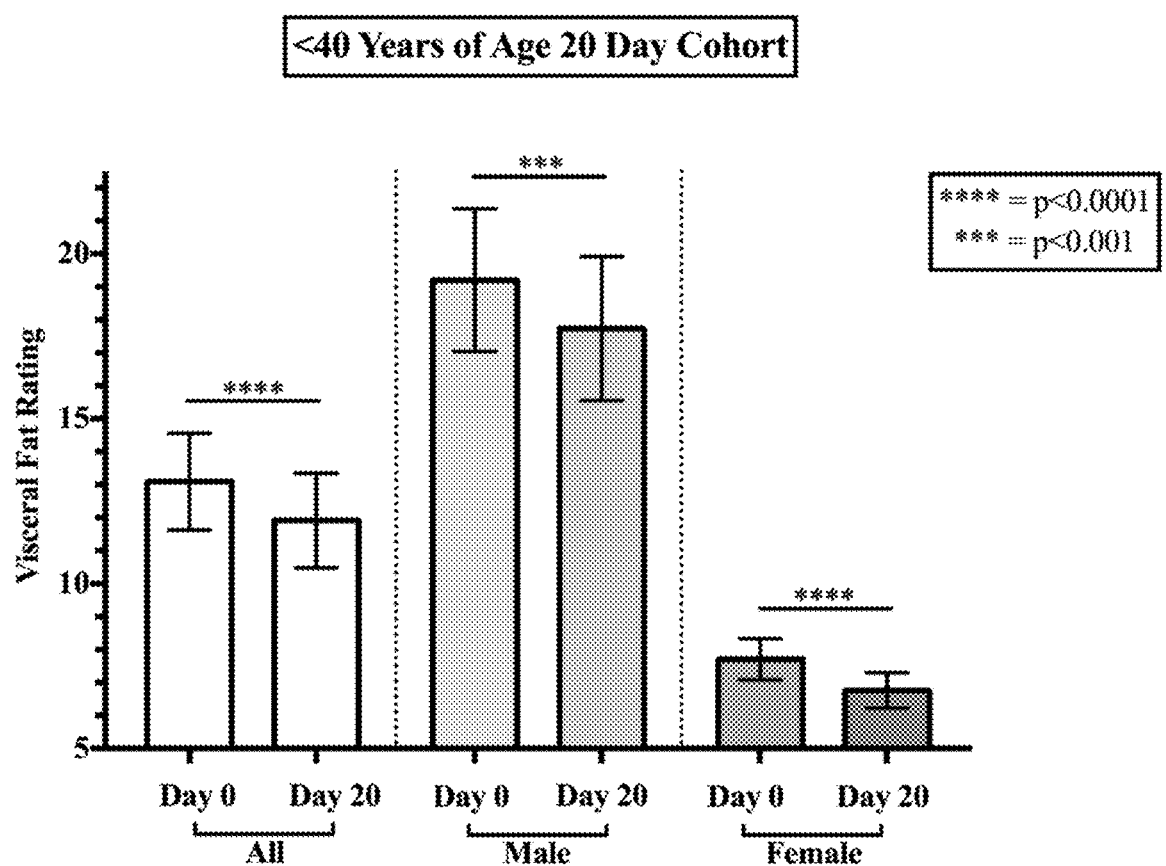

FIG. 7 provides the baseline and experimental values of mean VF ratings for all 20-Day subjects of 39 years of age or less, where results are grouped either as all subjects together or results of subjects separated by gender.

Figure 8:
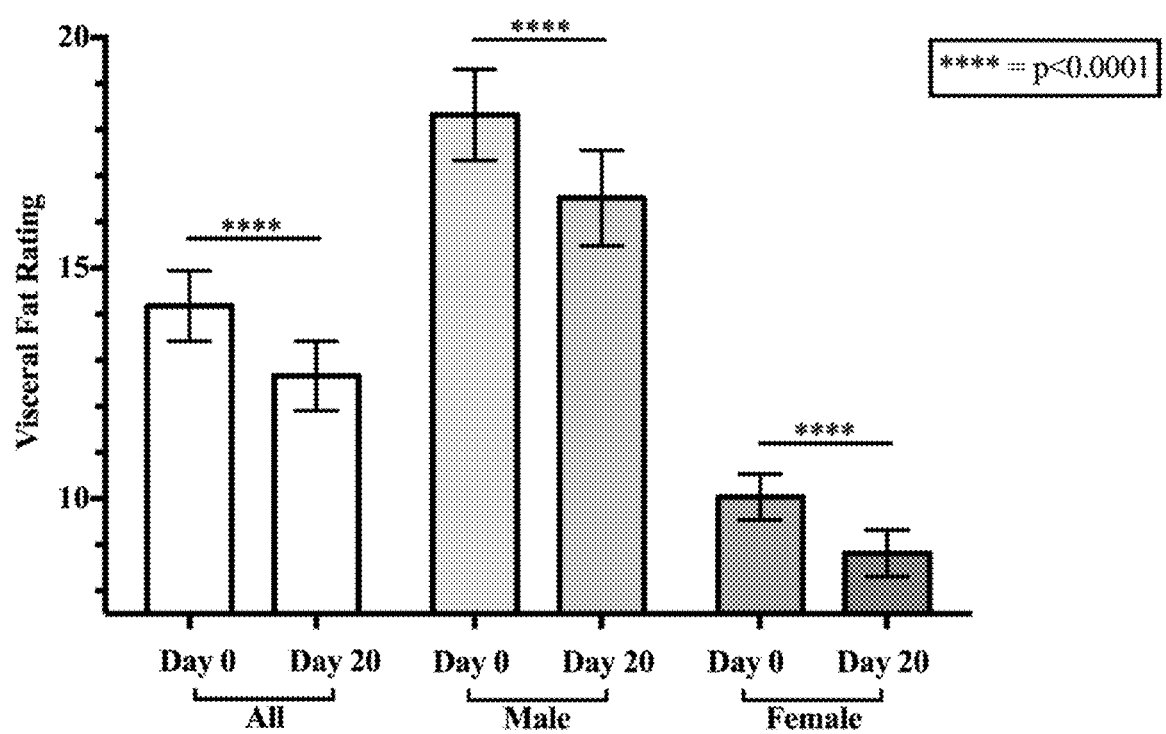

FIG. 8 provides the baseline and experimental values of mean VF ratings for all 20-Day subjects of 40 years of age to 49 years of age, where results are grouped either as all subjects together or results of subjects separated by gender.

Figure 9:
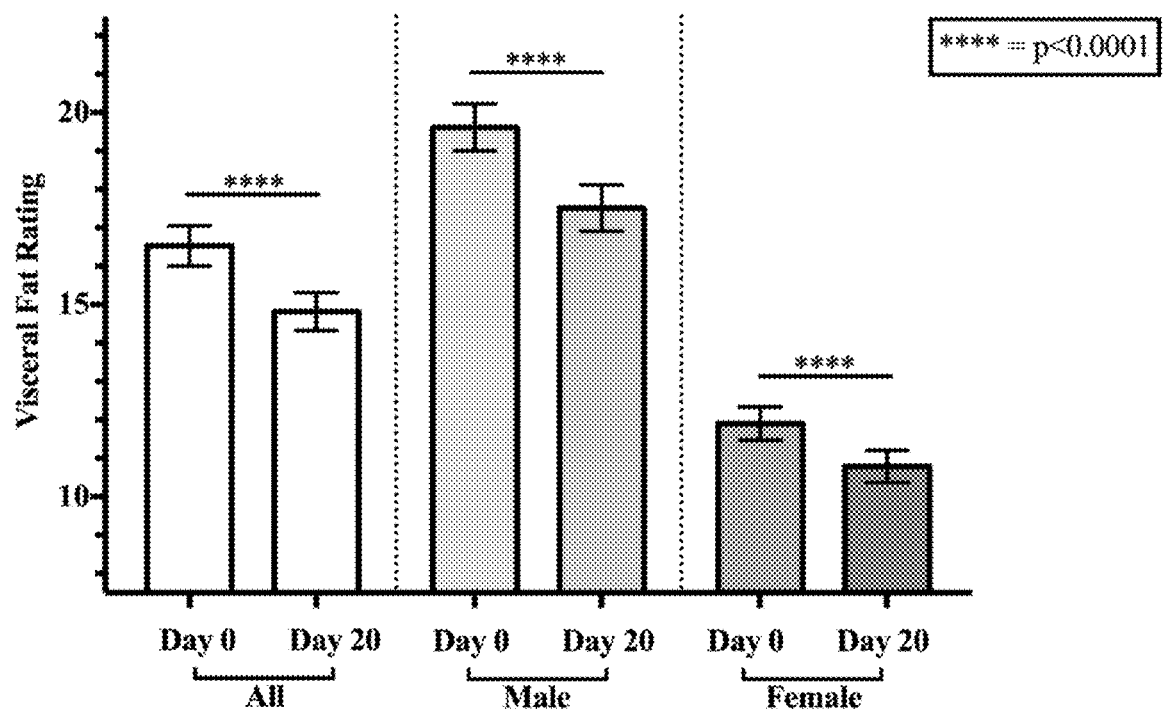

FIG. 9 provides the baseline and experimental values of mean VF ratings for all 20-Day subjects of 50 years of age to 59 years of age, where results are grouped either as all subjects together or results of subjects separated by gender.

Figure 10:
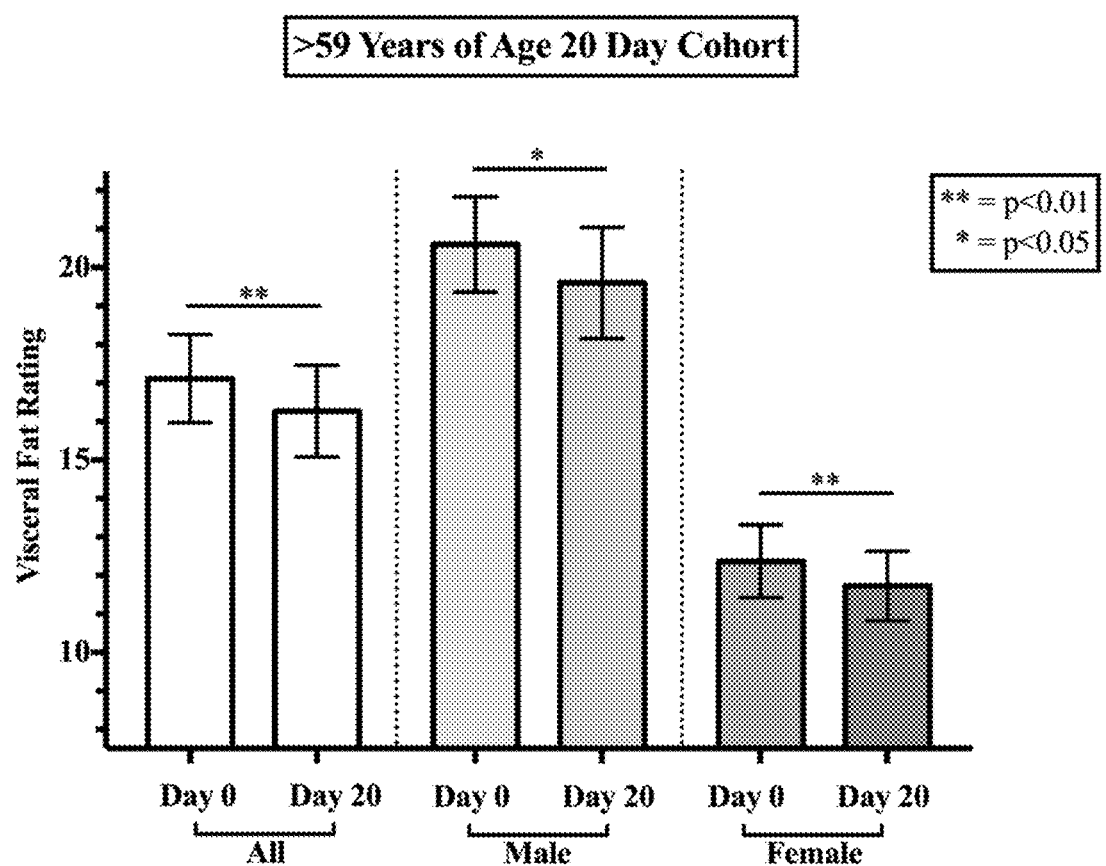

FIG. 10 provides the baseline and experimental values of mean VF ratings for all 20-Day subjects of greater than 59 years of age, where results are grouped either as all subjects together or results of subjects separated by gender.

Figure 11:
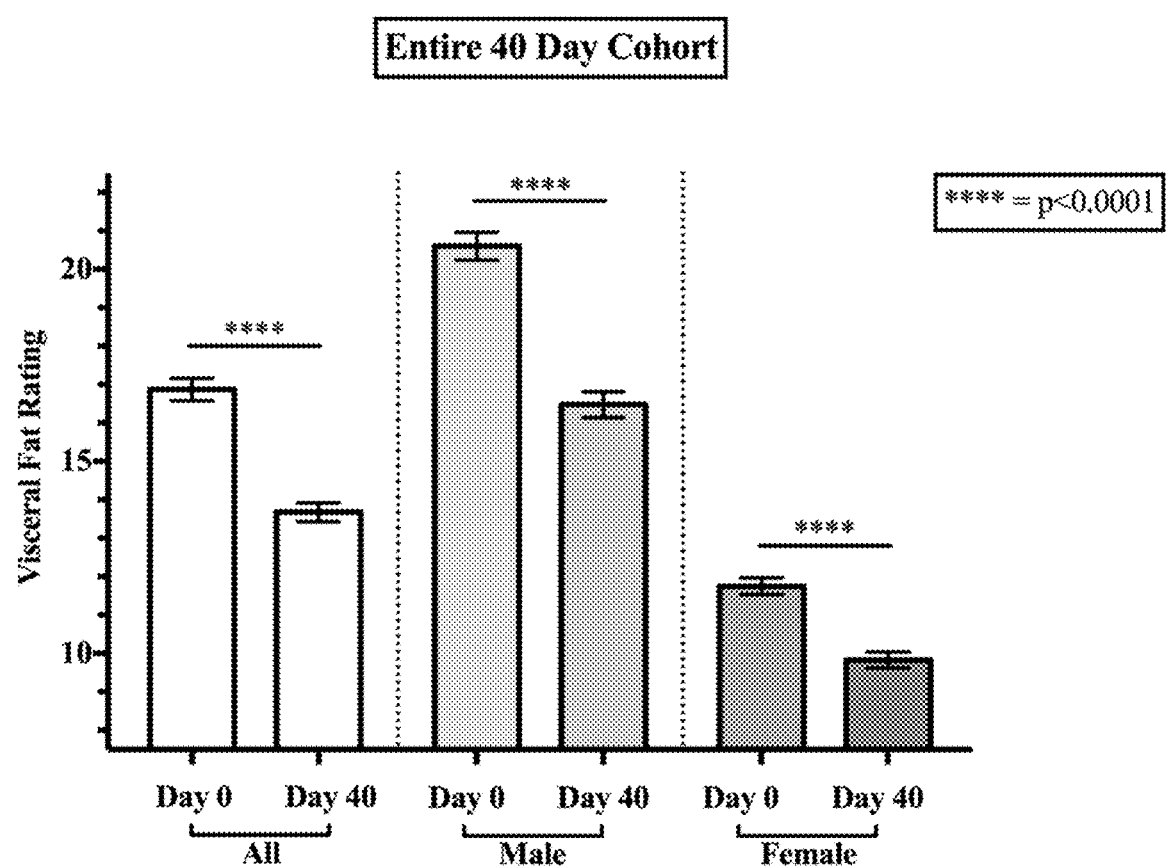

FIG. 11 provides the baseline and experimental values of mean VF ratings for 40-Day cohort samples, where results are grouped either as all subjects together or results of subjects separated by gender.

Figure 12:
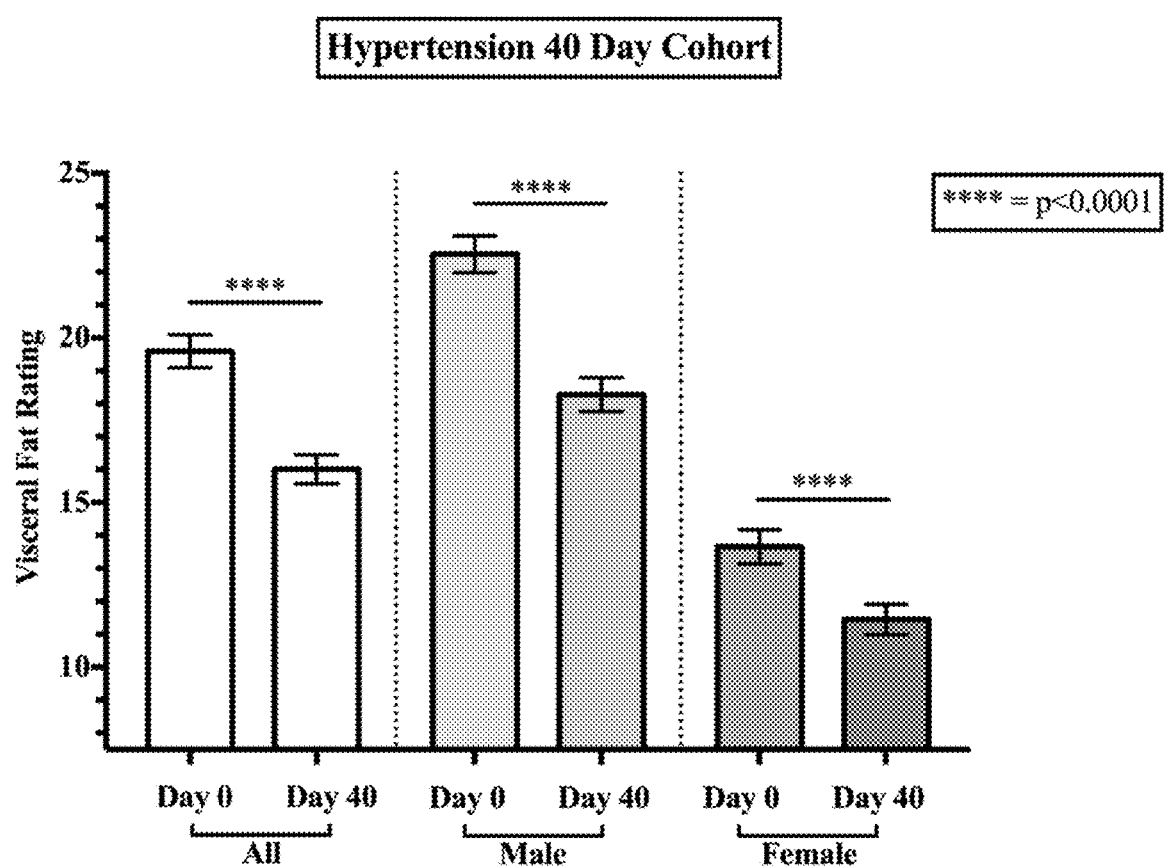

FIG. 12 provides the baseline and experimental values of mean VF ratings for 40-Day hypertension cohort subjects (subjects who were currently prescribed and taking one or more pharmaceutical drugs to treat hypertension on Day 1), where results are grouped either as all subjects together or results of subjects separated by gender.

Figure 13:
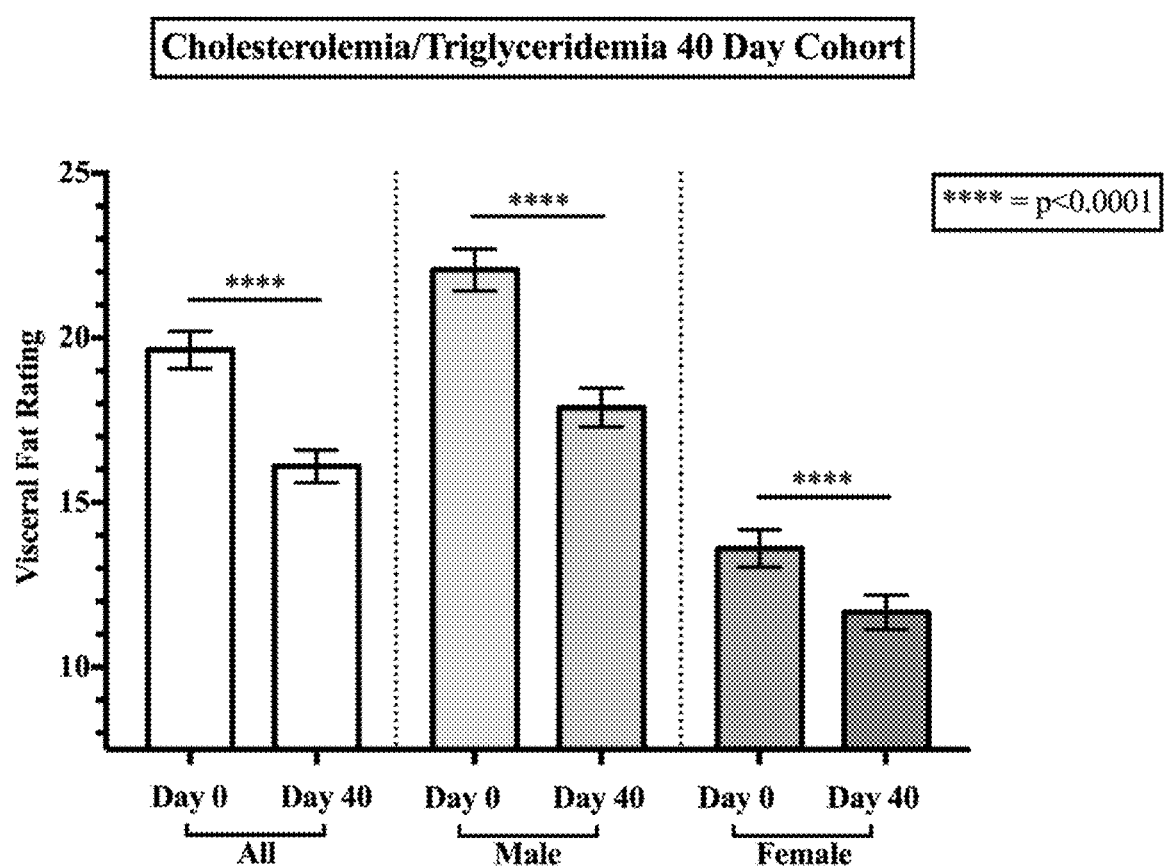

FIG. 13 provides the baseline and experimental values of mean VF ratings for 40-Day cholesterolemia/triglyceridemia cohort subjects (subjects who were currently prescribed and taking one or more pharmaceutical drugs to treat elevated lipids and/or triglycerides on Day 1), where results are grouped either as all subjects together or results of subjects separated by gender.

Figure 14:
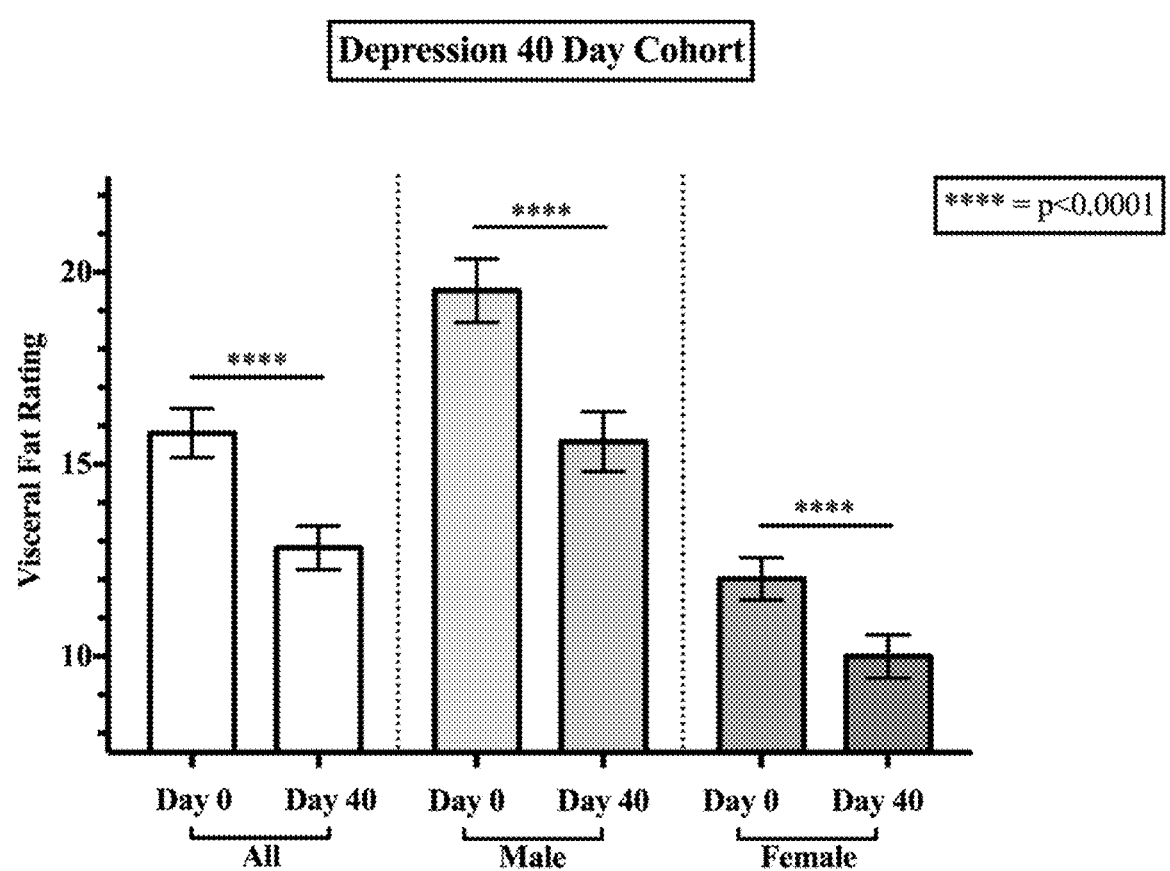

FIG. 14 provides the baseline and experimental values of mean VF ratings for 40-Day depression cohort subjects (subjects who were currently prescribed and taking one or more pharmaceutical drugs to treat depression on Day 1), where results are grouped either as all subjects together or results of subjects separated by gender.

Figure 15:
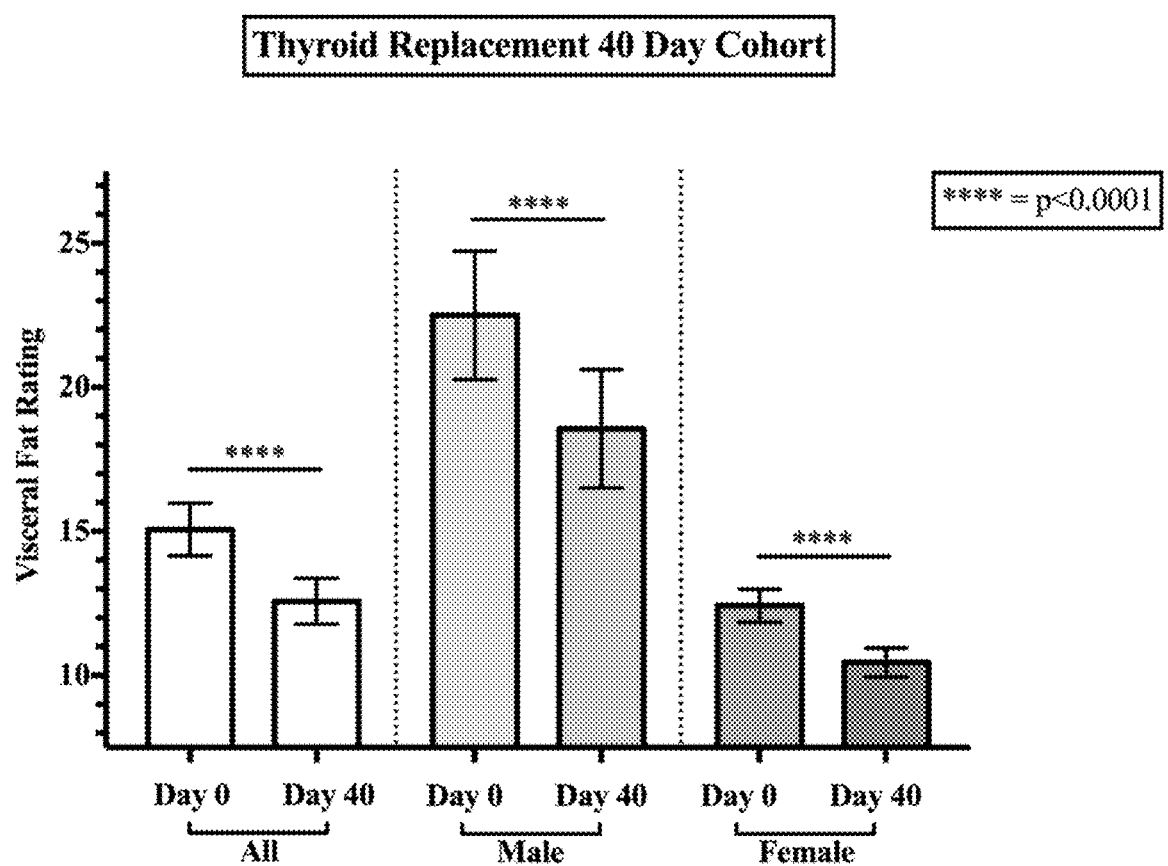

FIG. 15 provides the baseline and experimental values of mean VF ratings for 40-Day thyroid replacement cohort subjects (subjects who were currently prescribed and taking one or more pharmaceutical thyroid hormone replacement drugs on Day 1), where results are grouped either as all subjects together or results of subjects separated by gender.

Figure 16:
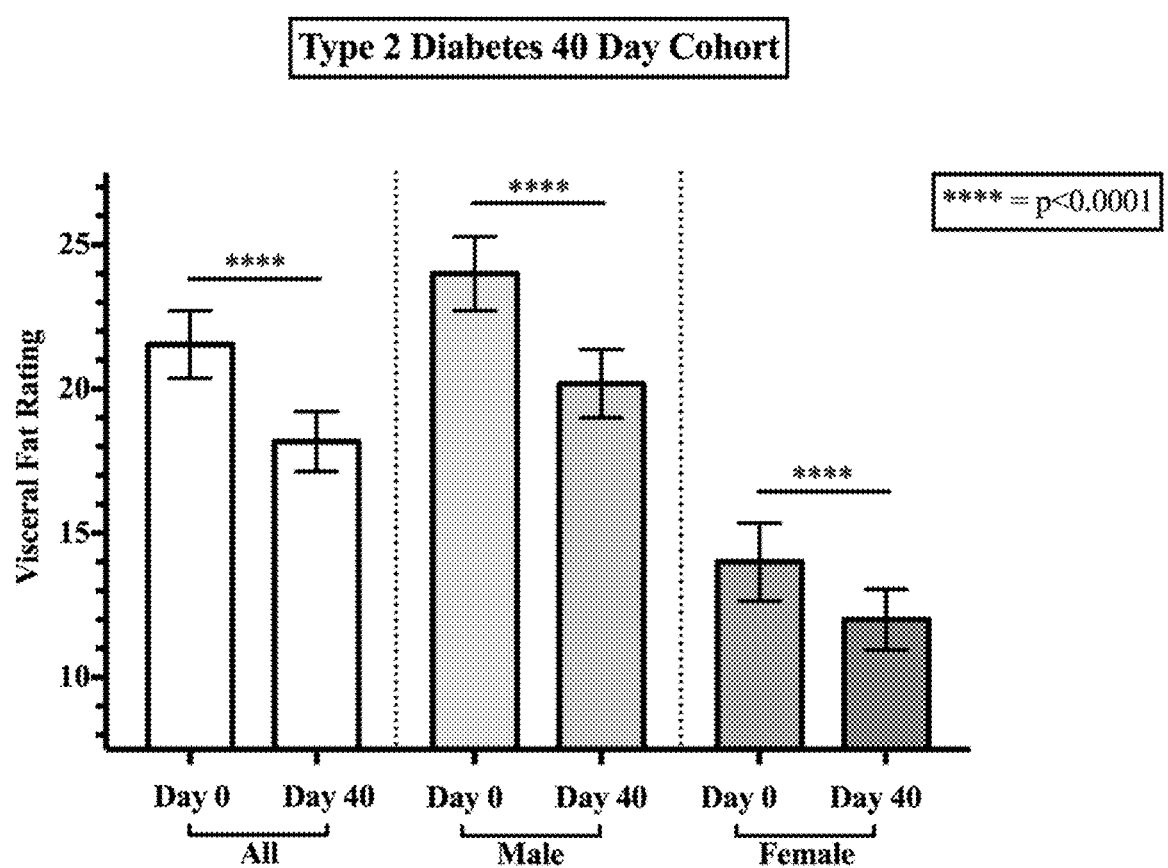

FIG. 16 provides the baseline and experimental values of mean VF ratings for 40-Day type 2 diabetes cohort subjects (subjects who were currently prescribed and taking one or more oral or injectable pharmaceutical drugs to treat Type 2 Diabetes on Day 1), where results are grouped either as all subjects together or results of subjects separated by gender.

Figure 17:
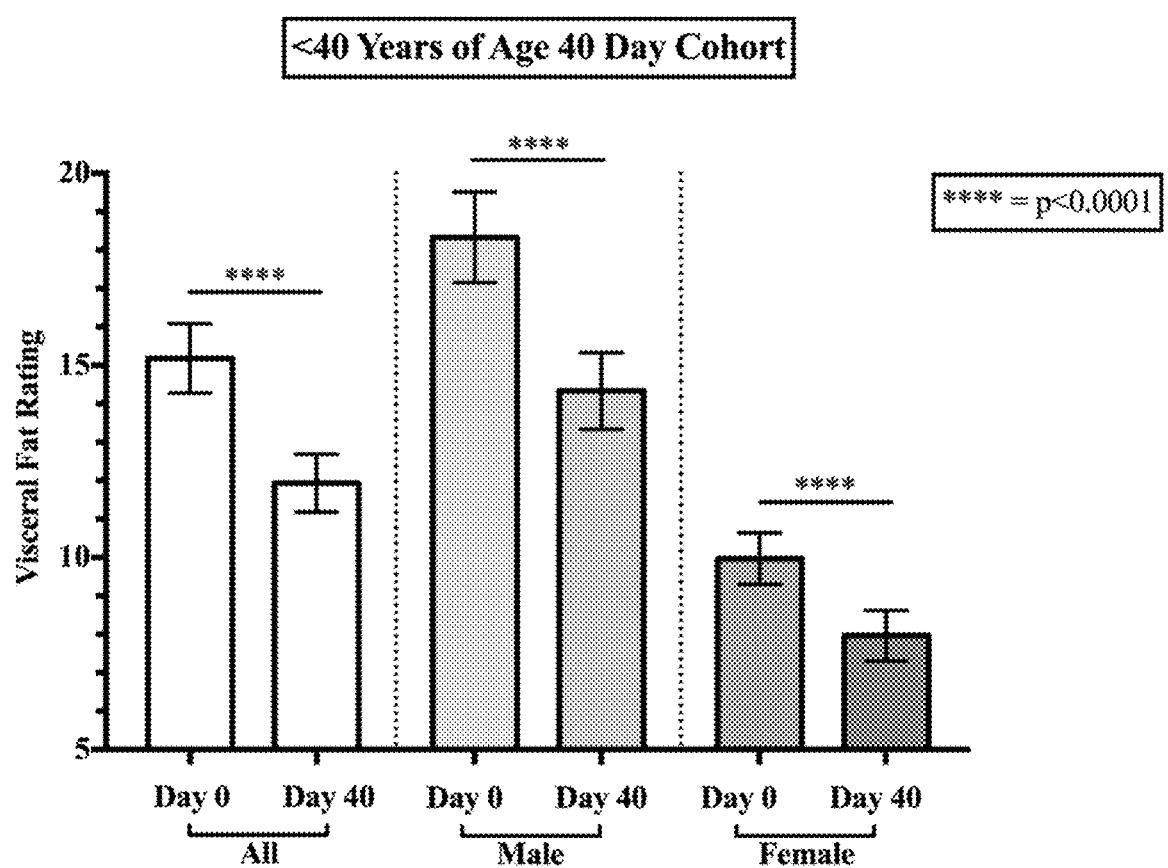

FIG. 17 provides the baseline and experimental values of mean VF ratings for all 40-Day subjects of 39 years of age or less, where results are grouped either as all subjects together or results of subjects separated by gender.

Figure 18:
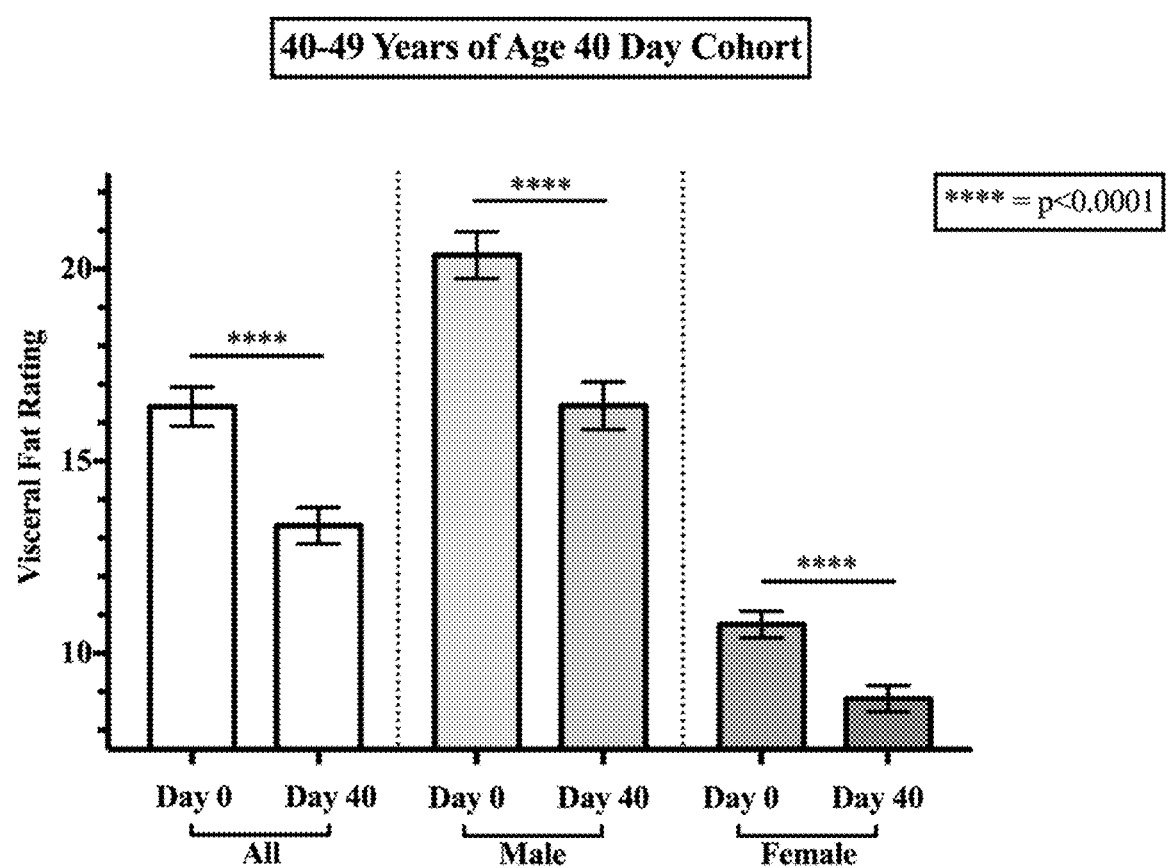

FIG. 18 provides the baseline and experimental values of mean VF ratings for all 40-Day subjects of 40 years of age to 49 years of age, where results are grouped either as all subjects together or results of subjects separated by gender.

Figure 19:
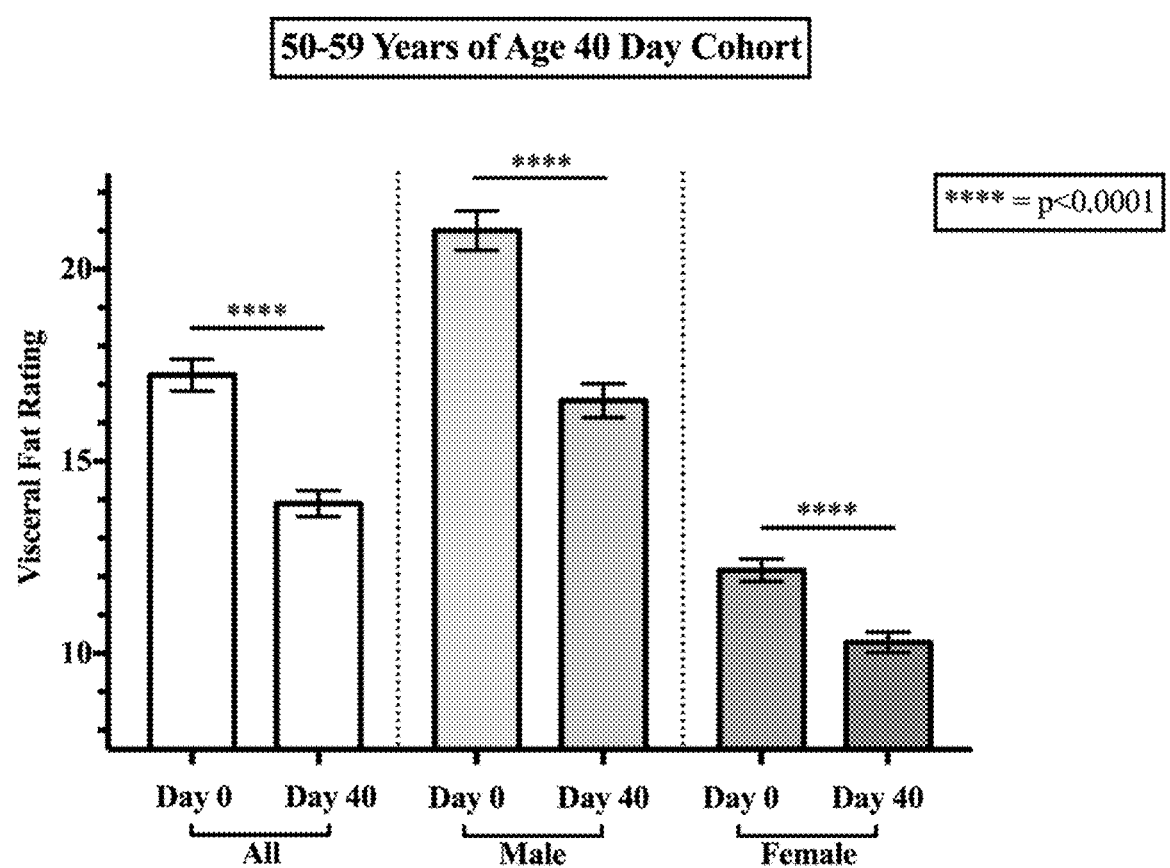

FIG. 19 provides the baseline and experimental values of mean VF ratings for all 40-Day subjects of 50 years of age to 59 years of age, where results are grouped either as all subjects together or results of subjects separated by gender.

Figure 20:
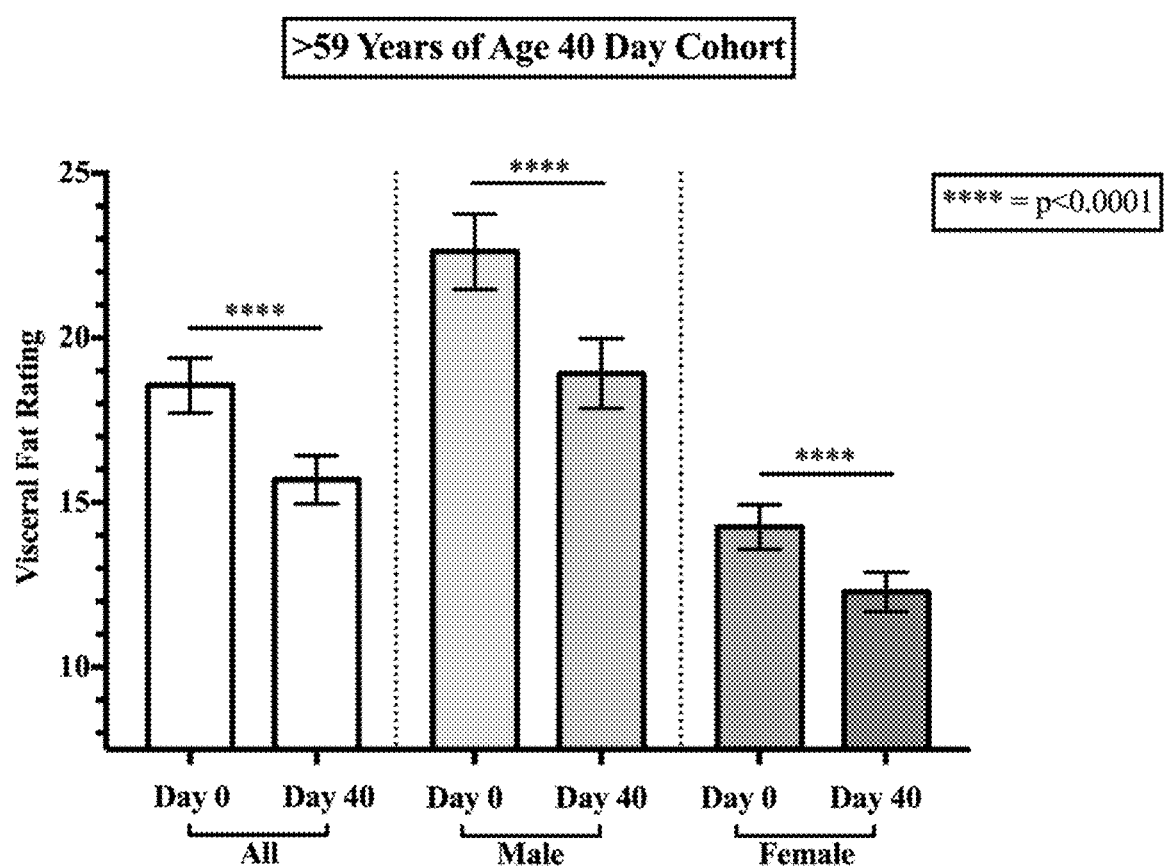

FIG. 20 provides the baseline and experimental values of mean VF ratings for all 40-Day subjects of greater than 59 years of age, where results are grouped either as all subjects together or results of subjects separated by gender.

Figure 21:
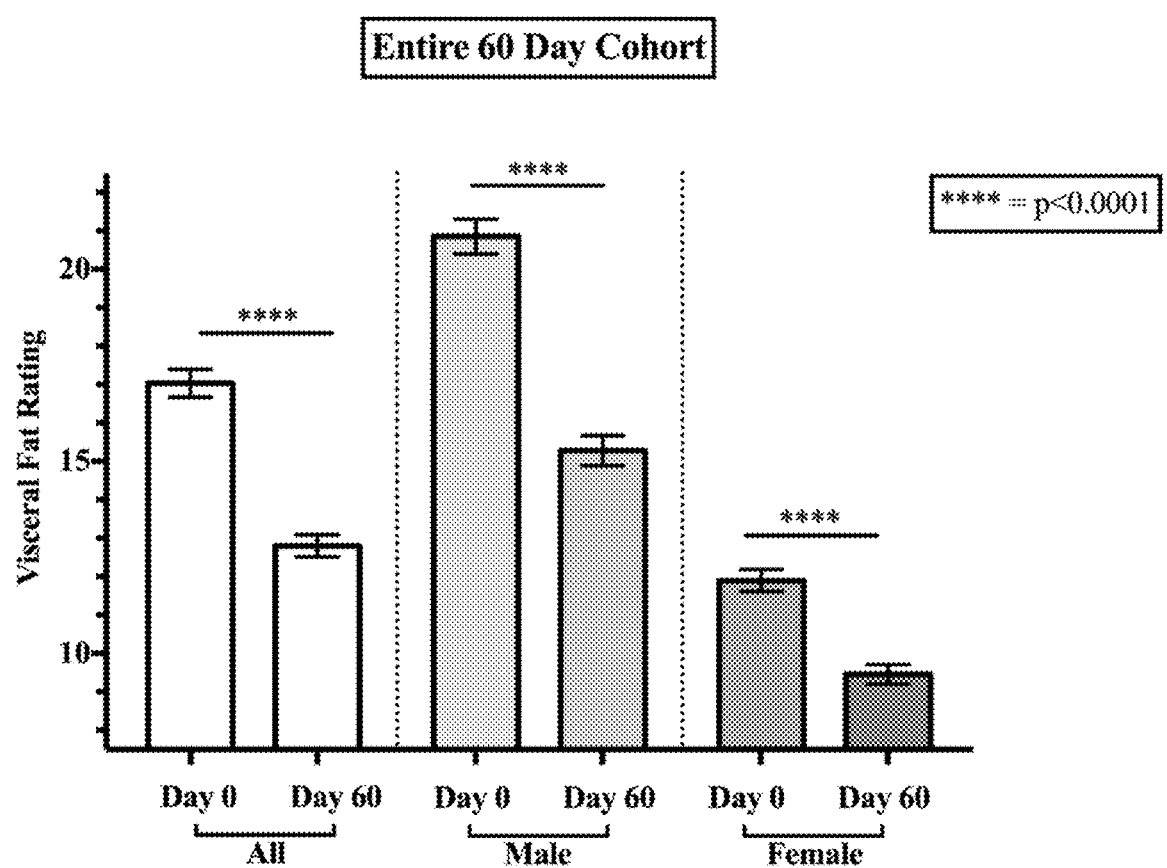

FIG. 21 provides the baseline and experimental values of mean VF ratings for 60-Day cohort samples, where results are grouped either as all subjects together or results of subjects separated by gender.

Figure 22:
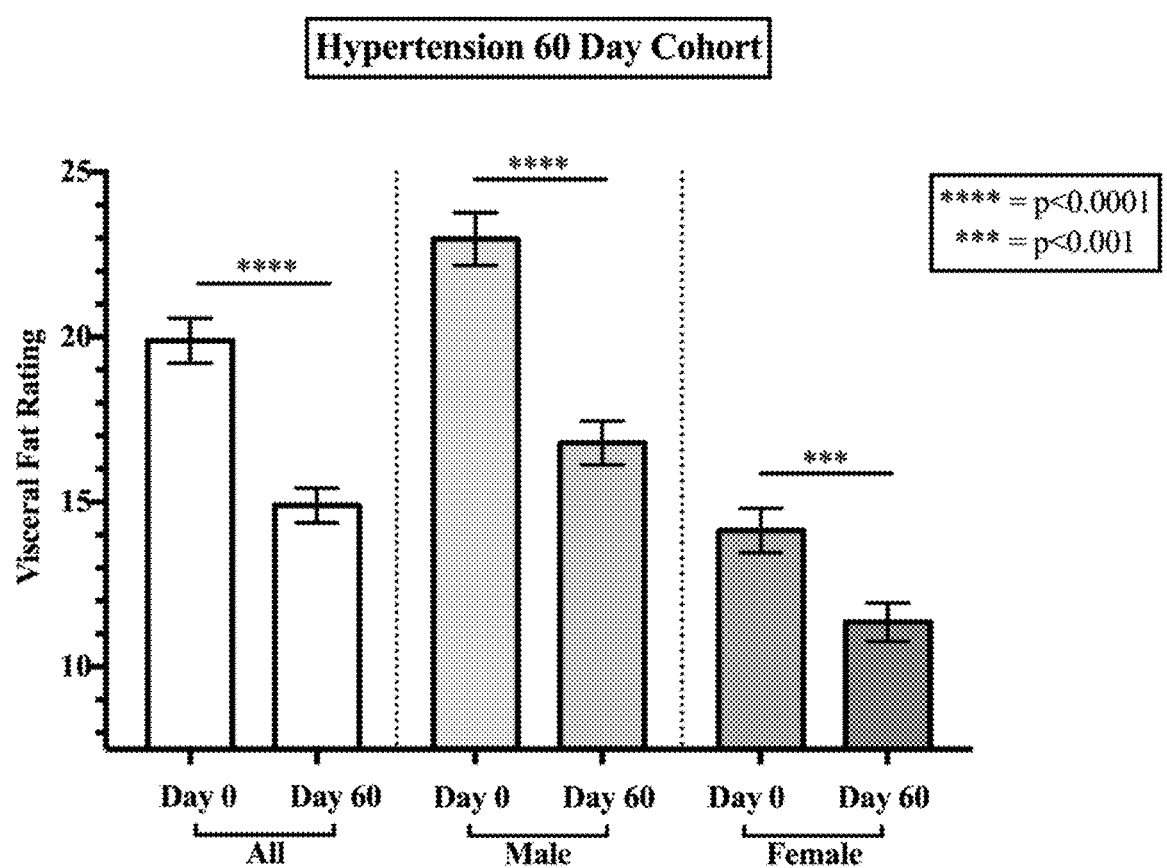

FIG. 22 provides the baseline and experimental values of mean VF ratings for 60-Day hypertension cohort subjects (subjects who were currently prescribed and taking one or more pharmaceutical drugs to treat hypertension on Day 1), where results are grouped either as all subjects together or results of subjects separated by gender.

Figure 23:
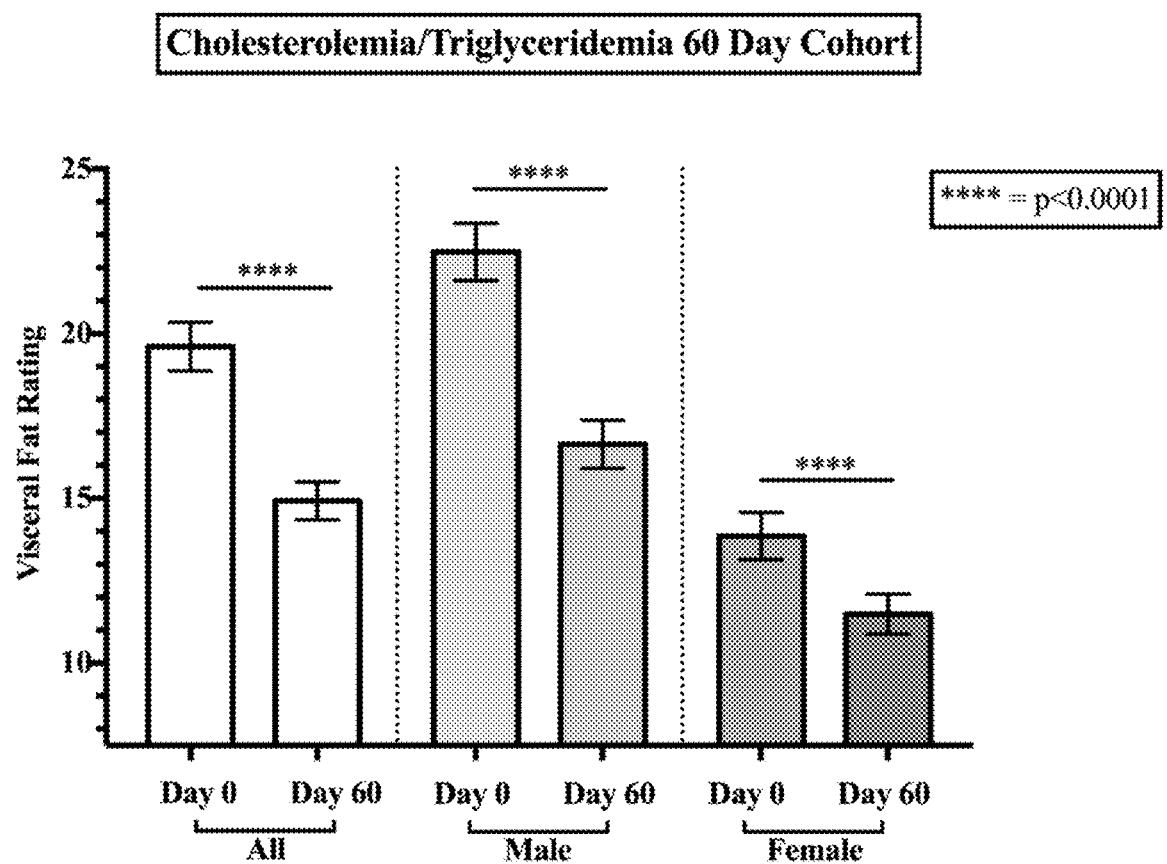

FIG. 23 provides the baseline and experimental values of mean VF ratings for 60-Day cholesterolemia/triglyceridemia cohort subjects (subjects who were currently prescribed and taking one or more pharmaceutical drugs to treat elevated lipids and/or triglycerides on Day 1), where results are grouped either as all subjects together or results of subjects separated by gender.

Figure 24:
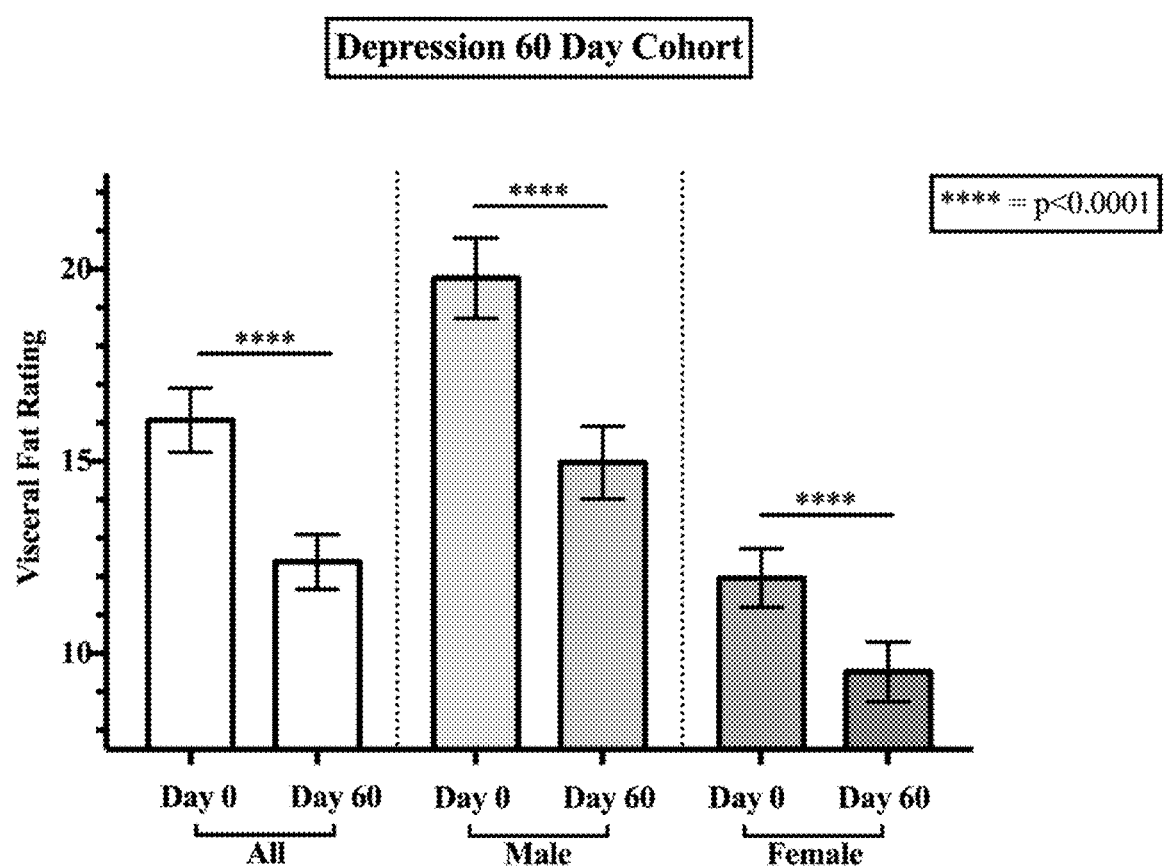

FIG. 24 provides the baseline and experimental values of mean VF ratings for 60-Day depression cohort subjects (subjects who were currently prescribed and taking one or more pharmaceutical drugs to treat depression on Day 1), where results are grouped either as all subjects together or results of subjects separated by gender.

Figure 25:
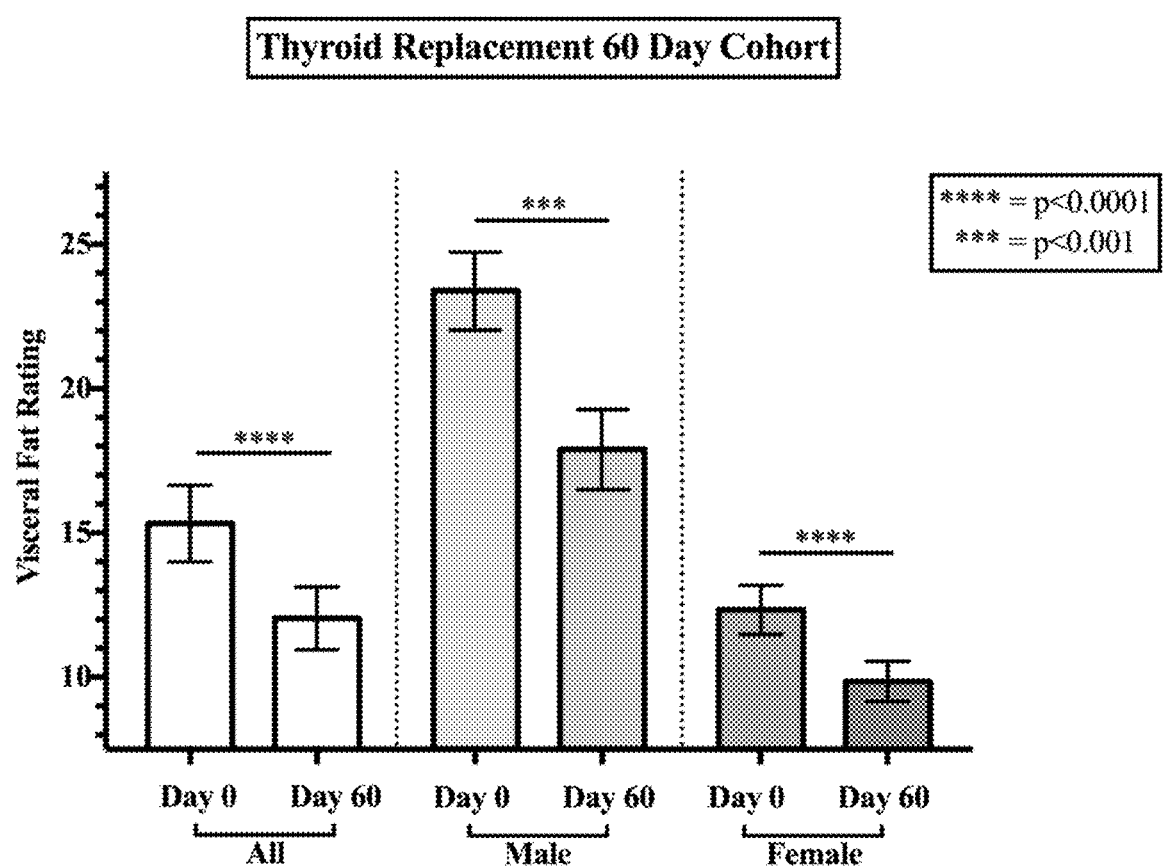

FIG. 25 provides the baseline and experimental values of mean VF ratings for 60-Day thyroid replacement cohort subjects (subjects who were currently prescribed and taking one or more pharmaceutical thyroid hormone replacement drugs on Day 1), where results are grouped either as all subjects together or results of subjects separated by gender.

Figure 26:
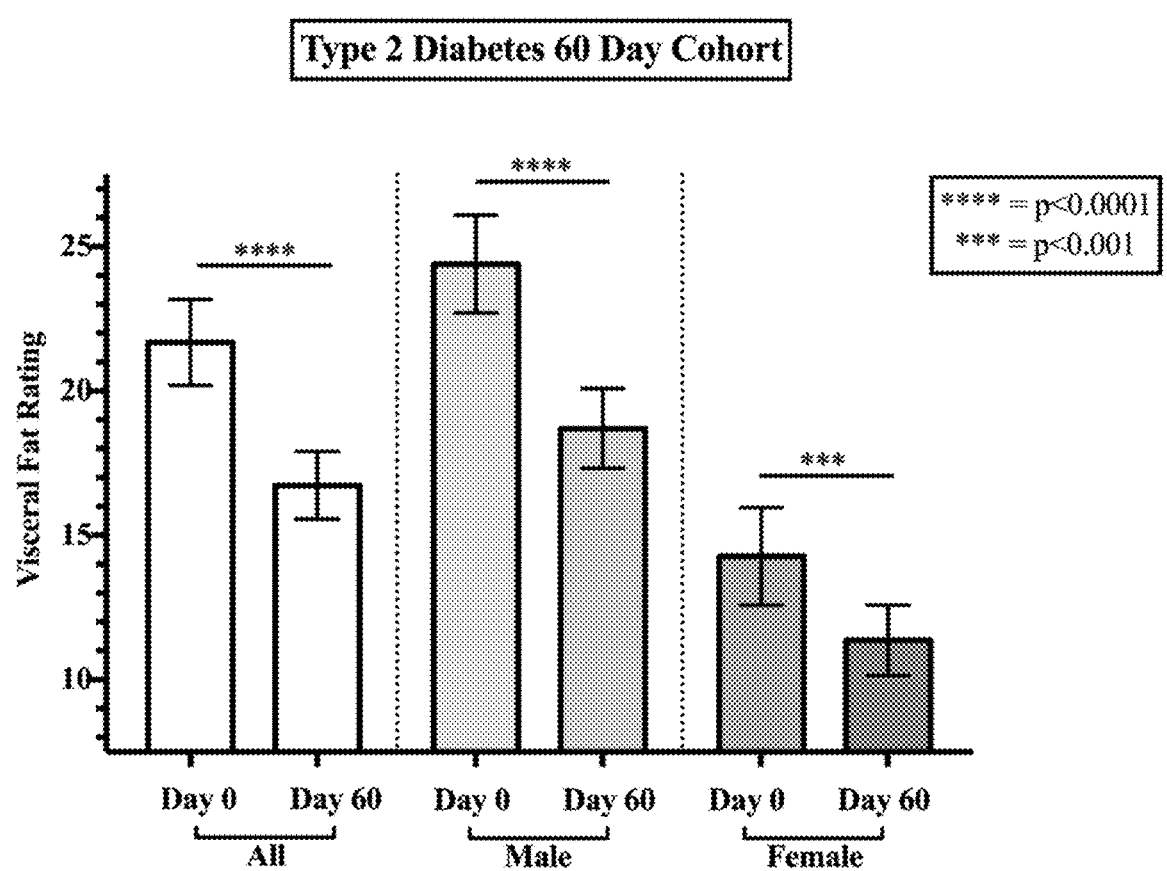

FIG. 26 provides the baseline and experimental values of mean VF ratings for 60-Day type 2 diabetes cohort subjects (subjects who were currently prescribed and taking one or more oral or injectable pharmaceutical drugs to treat Type 2 Diabetes on Day 1), where results are grouped either as all subjects together or results of subjects separated by gender.

Figure 27:
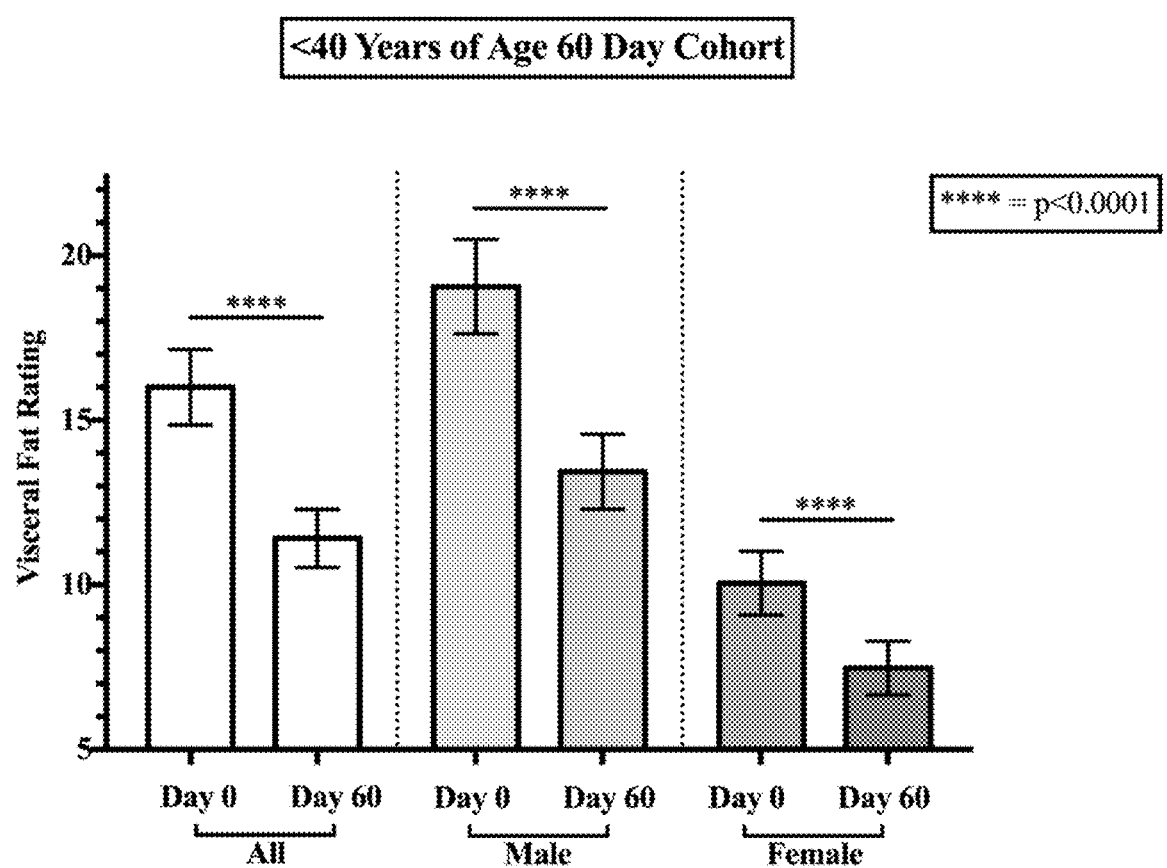

FIG. 27 provides the baseline and experimental values of mean VF ratings for all 60-Day subjects of 39 years of age or less, where results are grouped either as all subjects together or results of subjects separated by gender.

Figure 28:
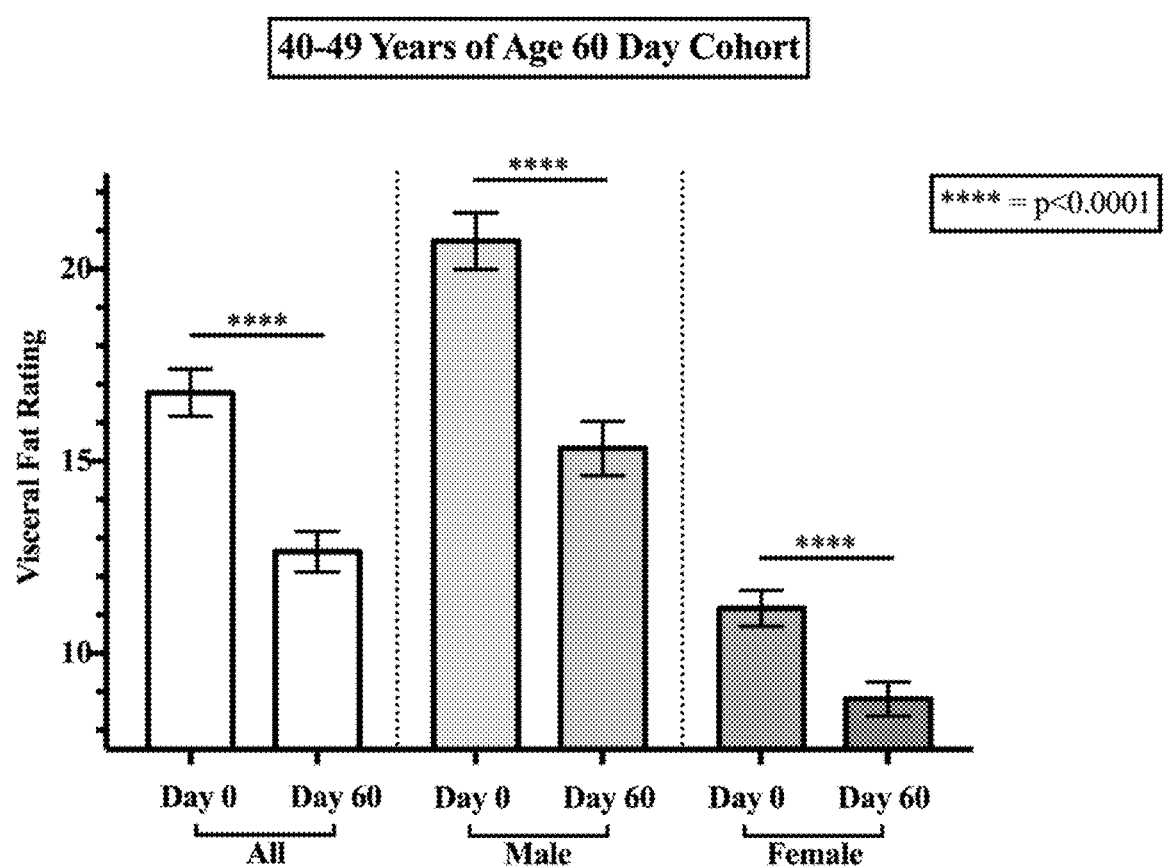

FIG. 28 provides the baseline and experimental values of mean VF ratings for all 60-Day subjects of 40 years of age to 49 years of age, where results are grouped either as all subjects together or results of subjects separated by gender.

Figure 29:
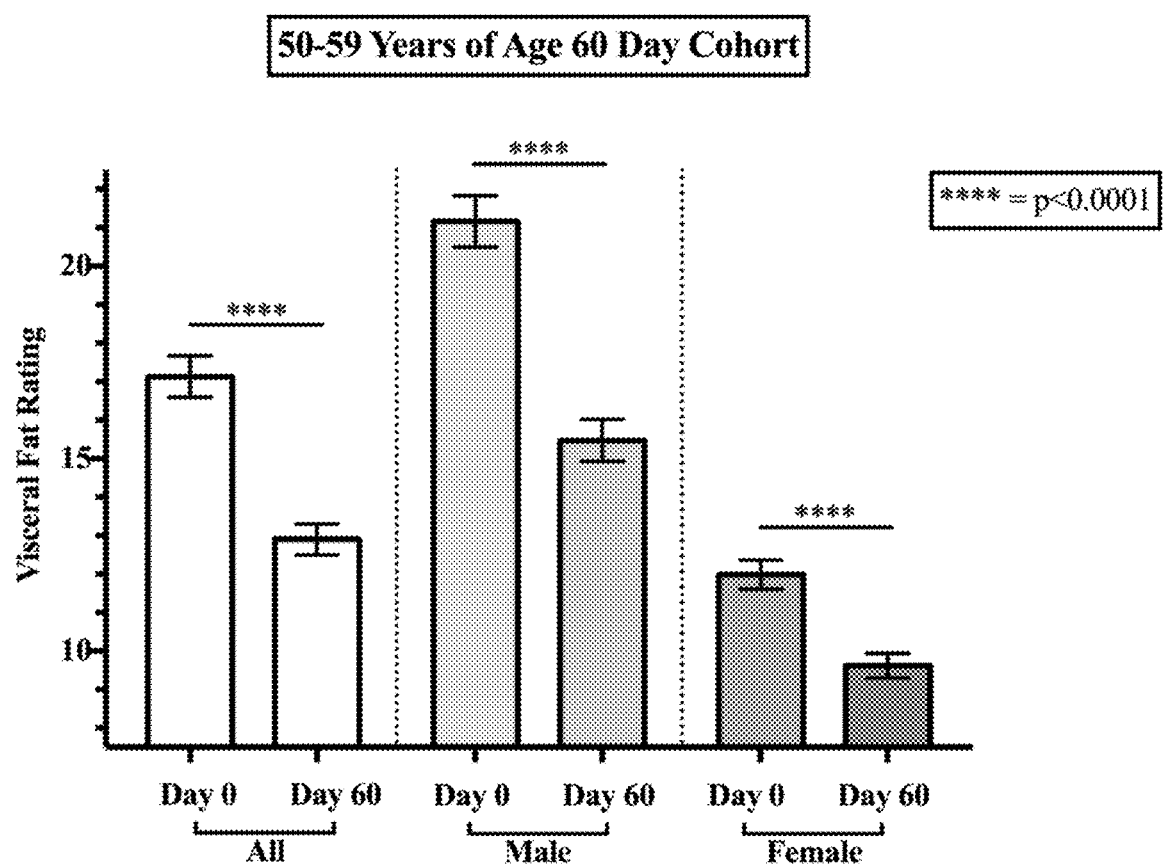

FIG. 29 provides the baseline and experimental values of mean VF ratings for all 60-Day subjects of 50 years of age to 59 years of age, where results are grouped either as all subjects together or results of subjects separated by gender.

Figure 30:
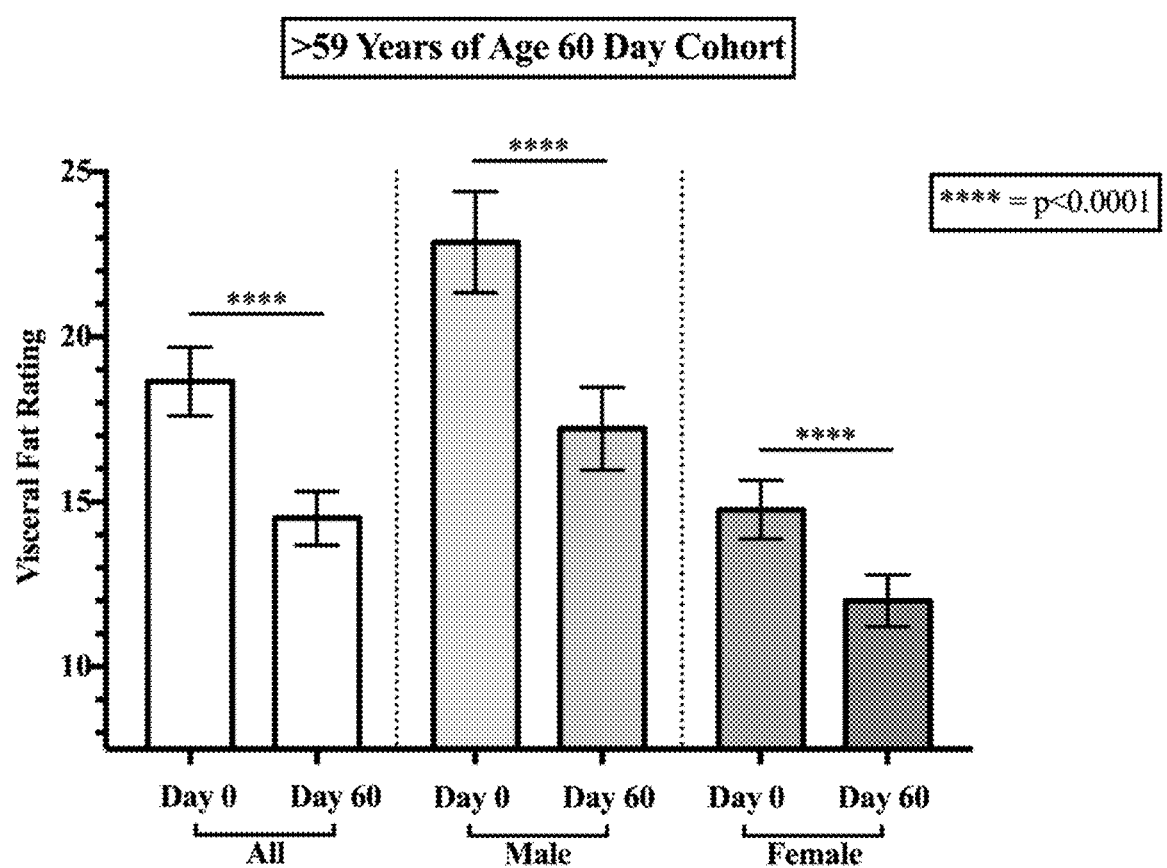

FIG. 30 provides the baseline and experimental values of mean VF ratings for all 60-Day subjects of greater than 59 years of age, where results are grouped either as all subjects together or results of subjects separated by gender.

FIG. 31 provides an example of an average meal plan for a subject whose baseline value of VF is relatively low and who exhibits an average daily amount of activity that is considered to be sedentary.

FIG. 32A to FIG. 32D provides an example of a 7-day week of lunch and dinner meal plans for a subject whose baseline value of VF is relatively low and who exhibits an average daily amount of activity that is considered to be sedentary. FIG. 32A is Day 1 and Day 2. FIG. 32B is Day 3 and Day 4. FIG. 32C is Day 5 and Day 6. FIG. 32D is Day 7.

FIG. 33 provides an example of an average meal plan for a subject whose baseline value of VF is relatively low and who exhibits an average daily amount of activity that is considered to be acutely active. The left panel is an example of such a diet administered on a day in which the subject experiences no activity. The right panel is an example of such a diet administered on a day in which the subject is active and the day after the subject is active.

FIG. 34A to FIG. 34D provides an example of a 7-day week of lunch and dinner meal plans for a subject whose baseline value of VF is relatively low and who exhibits an average daily amount of activity that is considered to be acutely active. FIG. 34A is Day 1 and Day 2. FIG. 34B is Day 3 and Day 4. FIG. 34C is Day 5 and Day 6. FIG. 34D is Day 7.

FIG. 35 provides an example of an average meal plan for a subject whose baseline value of VF is relatively low and who exhibits an average daily amount of activity that is considered to be chronically active.

FIG. 36A to FIG. 36D provides an example of a 7-day week of lunch and dinner meal plans for a subject whose baseline value of VF is relatively low and who exhibits an average daily amount of activity that is considered to be chronically active. FIG. 36A is Day 1 and Day 2. FIG. 36B is Day 3 and Day 4. FIG. 36C is Day 5 and Day 6. FIG. 36D is Day 7.

FIG. 37 provides an example of an average meal plan for a subject whose baseline value of VF is relatively high and who exhibits an average daily amount of activity that is considered to be sedentary.

FIG. 38A to FIG. 38D provides an example of a 7-day week of lunch and dinner meal plans for a subject whose baseline value of VF is relatively high and who exhibits an average daily amount of activity that is considered to be sedentary. FIG. 38A is Day 1 and Day 2. FIG. 38B is Day 3 and Day 4. FIG. 38C is Day 5 and Day 6. FIG. 38D is Day 7.

FIG. 39 provides an example of an average meal plan for a subject whose baseline value of VF is relatively high and who exhibits an average daily amount of activity that is considered to be acutely active. The left panel is an example of such a diet administered on a day in which the subject experiences no activity. The right panel is an example of such a diet administered on a day in which the subject is active and the day after the subject is active.

FIG. 40A to FIG. 40D provides an example of a 7-day week of lunch and dinner meal plans for a subject whose baseline value of VF is relatively high and who exhibits an average daily amount of activity that is considered to be acutely active. FIG. 40A is Day 1 and Day 2. FIG. 40B is Day 3 and Day 4. FIG. 40C is Day 5 and Day 6. FIG. 40D is Day 7.

FIG. 41 provides an example of an average meal plan for a subject whose baseline value of VF is relatively high and who exhibits an average daily amount of activity that is considered to be chronically active.

FIG. 42A to FIG. 42D provides an example of a 7-day week of lunch and dinner meal plans for a subject whose baseline value of VF is relatively high and who exhibits an average daily amount of activity that is considered to be chronically active. FIG. 42A is Day 1 and Day 2. FIG. 42B is Day 3 and Day 4. FIG. 42C is Day 5 and Day 6. FIG. 42D is Day 7.

DETAILED DESCRIPTION

Definitions

It is to be noted that the term "a" or "an" entity refers to one or more of that entity; for example, "a binding molecule," is understood to represent one or more binding molecules. As such, the terms "a" (or "an"), "one or more," and "at least one" can be used interchangeably herein.

Furthermore, "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "about" or "approximately" refers to a variation of 10% from the indicated values (e.g., 50%, 45%, 40%, etc.), or in case of a range of values, means a 10% variation from both the lower and upper limits of such ranges. For instance, "about 50%" refers to a range of between 45% and 55%.

Unless defined otherwise, technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary Of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. Unless otherwise indicated, amino acid sequences are written left to right in amino to carboxy orientation. The headings provided herein are not limitations of the various aspects or aspects of the disclosure, which can be had by reference to the specification as a whole. Accordingly, the terms defined immediately below are more fully defined by reference to the specification in its entirety.

As used herein, the term "calorie restriction" is used broadly to describe any reduction in energy intake by a subject, regardless of baseline, i.e. 2000 calories per day is considered to be a "calorie restricted" diet as compared with a subject who has a 3000 calorie average intake. While the phrase "calorie restriction" can relate to diets/weight loss programs (lower calorie consumption), it can also be used as a means to alter the severity of a pathological/abnormal health condition, such as cardiovascular and metabolic disease, by reducing the amount of VF in a subject regardless of weight.

As used herein, the term "flavorant" as used herein means a substance that gives another substance flavor, altering the characteristics of the solute, causing it to become sweet, sour, tangy, and the like. Flavorants can be natural or synthetic or artificial. Flavorants often include esters and can include such compounds as diacetyl, isoamyl acetate, benzaldehyde, cinnamaldehyde, ethyl propionate, methyl anthranilate, limonen and other similar oils, ethyl decadienoate, allyl hexanoate, ethyl maltol, ethylvanillin, methyl salicylate, manzanate, and the like. Flavorants enhance the flavor of food and can include salts, such as glycine salts, and acids such as glutamic acid, guanylic acid, citric acid, lactic acid, malic acid, ascorbic acid, tartaric acid, inosinic acid, and the like. According to the U.S. Code of Federal Regulations (CFR), a natural flavorant is the essential oil, oleoresin, essence, or extractive, protein hydrolysate, distillate, or any product of roasting, heating, or enzymolysis, which contains the flavoring constituents derived from a spice, fruit, or fruit juice, vegetable or vegetable juice, edible yeast, herb, bark, bud, root, leaf, or any other edible portions of a plant, meat, seafood, poultry, eggs, dairy products, or fermentation products thereof, whose primary function in food is flavoring rather than nutritional.

As used herein, "flavorant" also includes, for example, vanillin, sage, marjoram, parsley oil, spearmint oil, cinnamon oil, oil of wintergreen (methylsalicylate), peppermint oil, clove oil, bay oil, anise oil, *Eucalyptus* oil, citrus oils, fruit oils and essences including those derived from lemon, orange, lime, grapefruit, apricot, banana, grape, apple, strawberry, cherry, pineapple, etc., bean- and nut-derived flavors such as coffee, cocoa, cola, peanut, almond, etc., adsorbed and encapsulated flavorants and the like. Other possible flavorants include FC Brighter Flavor K91-5661, a Colgate-Palmolive compound flavor. Also encompassed within flavorants herein are ingredients that provide fragrance and/or other sensory effect in the mouth, including cooling or warming effects. Such ingredients illustratively include menthol, menthyl acetate, menthyl lactate, camphor, *Eucalyptus* oil, eucalyptol, anethole, eugenol, *Cassia*, oxanone, α-irisone, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), menthone glycerol acetal (MGA) and the like.

As used herein, the term "calorie" (also known as "food calorie" or "Cal") is a unit of heat content or energy and means the energy needed to raise the temperature of 1 kilogram of water through 1° C., and is often used to measure the energy value of foods. One thousand gram calories, or 3.968 Btu ("Cal") are also called large calories. Calories can also be expressed as joules. One joule is 0.239 calories.

As used herein, the term "meat" means the flesh of an animal as food and includes the flesh of fish, animals, mammals, birds, insects, etc. Meat does not mean nuts or other protein-rich agricultural foods. The term "meat" encompasses both raw, undercooked, and cooked animal flesh, and animal flesh cooked in any manner including, for example, baked, pan-fried, grilled, microwaved, steamed, boiled, etc.

As used herein, the terms "low" and "high" when referring to VF means a subject who has an amount of VF either above or below the average amount of VF typically held by a non-obese/non-overweight subject of the same age and gender. Low VF can mean a subject with 10% or more VF than the average of subjects of the same age and gender. A subject with low VF than average means the subject has 10% or less VF than the average of subjects of the same age and gender.

As used herein, the term "vegetable" means any edible an herbaceous plant, or edible part of a plant that is not a fruit or seed, but including mature fruits that are eaten as part of a main meal, including various plant parts such as stems, leaves, or flower parts used as food, such as, for example, the tomato, onion, asparagus, spinach, or cauliflower, and the like. Vegetables are edible by subjects, including animals, mammals, humans, and the like. The term fruit and the term vegetable are mutually exclusive.

As used herein, the term "fruit" means an edible seed-bearing structure in flowering plants (angiosperms) formed from the ovary after flowering, and includes, for example, the fleshy seed-associated structures of a plant that are sweet or sour, and edible in the raw state, such as apples, peaches, cherries, lemons, oranges, and strawberries.

As used herein, the term "subject" means a mammal, for example, primates, dogs, cats, rabbits, rats, and mice. In some embodiments, the subject is a primate, for example, a human.

As used herein, the term "diet" means the sum of food, including both liquid and solid food, consumed by a subject.

As used herein, the term "body mass index" (BMI) means a value derived from the mass (weight) and height of a subject and is a measure of overall body fat in a subject. The BMI is defined as the body mass divided by the square of the body height, and is universally expressed in units of $kg/m^2$, resulting from mass in kilograms and height in meters. The higher the value of BMI, the higher the amount of total fat present in a given subject. For the average adult American, a low BMI is a score of less than 18.5, an average BMI is a score of 18.5 to 24.9, and an overweight subject typically has a BMI score of 25 to 29.9. Obese adults are considered to be those subjects with a BMI score of 30 or higher.

As used herein, the term "cancer therapy" means pharmaceutical and/or radiological treatment for cancer (benign or malignant) of any stage or any type.

As used herein, the term "vegetarian" means a subject who restricts their diet to grains, pulses, legumes, nuts, seeds, vegetables, fruits, fungi, algae, yeast and/or some other non-animal-based foods (e.g. salt) with, or without, dairy products, honey and/or eggs. A subject who is a vegetarian does not eat foods that include, or have been produced with, the aid of products of, or created from, any part of the body of a living or dead animal. This includes meat, poultry, fish, shellfish, insects, by-products of slaughter, or any food made with processing aids created from these.

As used herein, the term "bipolar disorder" refers to a disease, also known as manic-depressive illness, that is a brain disorder that causes unusual shifts in mood, energy, activity levels, and the ability to carry out day-to-day tasks for any subject suffering therefrom. Bipolar disorder can be broken down into four main types, including type I, type II, cyclothymic, and other/unspecified bipolar and related disorders. Subjects with bipolar disorder experience periods of unusually intense emotion, changes in sleep patterns and activity levels, and unusual behaviors called "mood episodes," which are drastically different from the moods and behaviors that are typical for a subject of the same age.

As used herein, the term "depression" (also called major depressive disorder, or clinical depression) is a psychiatric mood disorder that can be categorized into various diseases including persistent depressive disorder, perinatal depression, psychotic depression, seasonal affective disorder, and bipolar disorder. Depression often results in a loss of social function, reduced quality of life and increased mortality. The World Health Organization estimates that roughly 322 million people suffer from clinical depression. (World Health Organization (WHO) (2017); "Depression and Other Common Mental Disorders: Global Health Estimates," Geneva: World Health Organization). This disorder can occur from infancy to old age, with women being affected more often than men. Depression can have many causes that range from genetic, over psychological factors (negative self-concept, pessimism, anxiety and compulsive states, etc.) to psychological trauma. (See, Leubner et al., *Front. Psychol.*, 8:1109, 2017). Depression is associated with a chronic, low-grade inflammatory response and activation of cell-mediated immunity, as well as activation of the compensatory anti-inflammatory reflex system. (See, Berk et al., *BMC Med.*, 11:200, 2013). Evidence suggests that clinical depression can be accompanied by increased oxidative and nitrosative stress (O&NS) and autoimmune responses directed against O&NS modified neoepitopes. (Id.).

As used herein, the term "hypertension" (high blood pressure) means abnormally high blood pressure. Hypertension is a chronic condition in which arterial blood pressure is persistently elevated above normal levels. While short-term high blood pressure does not readily produce detectable symptoms, long-term high blood pressure is associated with coronary artery disease, stroke, heart failure, peripheral vascular disease, vision loss, and chronic kidney disease. Hypertension can be primary (essential) or secondary (identifiable cause). For instance, normal blood pressure in humans is generally considered to correlate with a systolic reading of less than 120 mm Hg, or about 90 mm Hg to about 120 mm Hg, and less than 80 mm Hg diastolic, or about 60 mm Hg to about 80 mm Hg. High blood pressure is generally considered to be a systolic reading of 140 to 159 mm Hg or more and a diastolic reading of 89 to 99 mm Hg or more.

As used herein, the terms "dyslipidemia" and/or "cholesterolemia" and/or "hypercholesterolemia" and/or "triglyceridemia" and/or "hypertriglyceridemia" means an elevated level of cholesterol in the blood or the presence of elevated levels of triglycerides in the blood, respectively. Cholesterolemia is a condition in which the bloodstream contains higher than normal amounts of blood lipids and is a form of hyperlipoproteinemia. Long-term exposure to high levels of cholesterol in the blood can lead to atherosclerosis (hardening of the arteries) and formation of atheromatous plaques in the arteries, and ultimately heart attack and/or stroke due to the narrowing of arteries. Cholesterolemia is commonly associated with obesity, a high fat or high calorie diet, and stress. High levels of cholesterol in the bloodstream for an average adult human is generally considered to correlate with a total cholesterol amount of greater than 250 mg/dL (6.2 mmol/L), a low-density lipoprotein (LDL) cholesterol of about 160 to 189 mg/dL (4.1 to 4.9 mmol/L), and a high-density lipoprotein (HDL) cholesterol amount of about 60 mg/dL (1.55 mmol/L).

Hypertriglyceridemia denotes higher levels than normal of triglycerides, the most abundant fatty acid molecule in most organisms. Elevated levels of triglycerides are associated with atherosclerosis and can lead to cardiovascular disease, acute pancreatitis, xanthomas, hepatosplenomegaly, and other neurological symptoms. The main causes of hypertriglyceridemia are unbalanced diet high in carbohydrates or fat, obesity, diabetes mellitus and insulin resistance, excess alcohol consumption, renal failure, among others.

As used herein, the term "thyroid replacement" means a therapy prescribed to a subject after removal of all or part of the thyroid or due to dysfunction (hypothyroidism, i.e. caused by Hashimoto's thyroiditis) of the thyroid gland. The thyroid gland can be removed (thyroidectomy) for many reasons, such as inflammation, nodule growth, swelling (goiter), hyperthyroidism (Graves' disease), or cancer. To replace the normal biochemical function of the thyroid, such subjects are often prescribed a hormone since one important function of the thyroid gland is to produce and excrete thyroid hormones, including triiodothyronine and thyroxine, which influence metabolic rate and protein synthesis in the body. To replace these activities, subjects are often prescribed triiodothyronine and/or thyroxine.

As used herein, the term "type 2 diabetes" (T2D) means diabetes mellitus type 2, or "Adult Onset Diabetes," is a disease characterized by long-term high blood sugar levels in the bloodstream, insulin resistant, and relative lack of insulin. T2D is a chronic condition related to the metabolism of glucose in which the body either resists the effects of insulin or does not produce sufficient insulin to maintain normal glucose levels in the blood. T2D can affect children as well as adults, but is more common in adults, affecting approximately 27 million adults in the US. Pancreatic cells, specifically beta cells, are responsible for synthesizing insulin. T2D can be caused either by an inadequate supply of insulin due to pancreatic dysfunction, or inability of cells to properly utilize insulin to metabolize glucose. Subjects can suffer from both conditions. T2D is often associated with poor lifestyle choices including unhealthy diet, obesity, being overweight (BMI of greater than 25), lack of physical activity, stress, smoking. T2D can also be due to genetic predisposition, i.e. mutations in genes associated with beta cell function. Lifestyle and diet changes are often prescribed to manage the symptoms of T2D, as well as prescription of medications including metformin, sulfonylureas, thiazolidinediones, dipeptidyl peptidase-4 inhibitors, SGLT2 inhibitors, and glucagon-like peptide-1 analogs, as well as injections of insulin.

As used herein, the term "immunosuppressant" means a chemical compound or drug often prescribed to inhibit or prevent the activity of the immune system in a subject. Immunosuppressants are often prescribed to prevent rejection of a transplanted organ or tissue (bone marrow, heart, kidney, liver, etc.), to treat an autoimmune disease or disorder (rheumatoid arthritis, multiple sclerosis, myasthenia gravis, psoriasis, vitiligo, system lupus erythematosus, etc.), and/or to treat other non-autoimmune inflammatory disease (asthma, ankylosing spondylitis, etc.). Immunosuppressants include, but are not limited to, various classes of drugs such as glucocorticoids, cytostatics, antibodies, immunophilin active agents, etc. Immunosuppressants include those that inhibit cellular and/or humoral immunity in a subject, and/or cell division (cytostatic agents), and/or cyclophilin. Examples of immunosuppressants include, but are not limited to, corticosteroids (prednisone, budesonide, prednisolone), cyclosporine, tacrolimus, sirolimus, everolimus, azathioprine, leflunomide, mycophenolate, antibodies (abatacept, adalimumab, anakinra, rituximab, infliximab, secukinumab, muromonab, etc.), cyclophosphamide, nitrosoureas, platinum compounds, methotrexate, fluorouracil, dactinomycin, anthracyclines, mitomycin C, bleomycin, and mithramycin, and the like.

As used herein, the term "sedentary" means a relatively low basal level of daily activity in a subject, i.e. a state in which a subject has an increased heart rate above resting level for less than about 45 minutes per day. As used herein, the term "acutely active" means a relatively moderate amount of daily activity in a subject, i.e. a state in which the subject has an increased heart rate above resting level for about 45 minutes or more, one to two times per week. As used herein, the term "chronically active" means a relatively high level of daily activity in a subject, i.e. a state in which the subject has an increased heart rate above resting level for about 45 minutes or more, three times or more per week. A resting level heart rate for an average US adult depends on age, weight, gender, and other physiological factors and can be subject-specific. Generally, a normal resting heart rate for children 10 years of age and older, or an adult, is considered in the field to be from about 60 to 100 beats per minute according to the American Heart Association. Well-trained athletes in good physical condition will have a heart rate of generally between about 40 and 60 beats per minute. A heart rate that is "above a resting level" is one that is 10% or more above these generally accepted guidelines of resting heart rates. For instance, a heart rate above a resting level can be one that is 10% more, 15% more, 20% more, 25% more, 30% more, 35% more, 40% more, 45% more, 50% more, 55% more, 60% more, 65% more, 70% more, 75% more, 80% more, 85% more, 90% more, or 95% more than an average resting heart rate. As used herein in this context, the term "about 45 minutes" means from about 40 minutes to about 50 minutes.

As used herein, the term "bioelectric impedance," or "bioelectrical impedance," means a method of estimation body composition or body fat in a subject. The method employs the use of an electrical device that passes a relatively small electrical current through cellular tissue and measuring the amount of current absorbed by the cellular tissue. The decrease in voltage experienced when two electrodes of a bioelectric impedance device are placed in contact with a subject is then associated with an overall body percentage of fat, VF, and the like, through the use of proprietary algorithms (bioelectric impedance analysis, BIA). Impedance of the electrical current is generally measured from the wrist to the contralateral ankle of the subject. Bioelectrical impedance devices often employ two or four electrodes and a small current of about 1 to 10 µA passed between the electrodes. In some BIA devices, the subjects hold two electrodes, one in each hand, and stands on a platform containing two additional electrodes. Thus, the current is passed through the subject's body from wrist to foot on both sides of the body. Some BIA devices employ multiple electrical frequencies (two, three, four, five, six, seven, or eight or more frequencies) in a single device to determine body composition.

A "class 2" device is defined by the U.S. Food and Drug Administration (FDA) as a device that requires both general controls and special controls. Device classification by the FDA depends on the intended use of the device and its indications for use as well as the risk associated with the device. According to the FDA, general controls "are the baseline requirements of the Food, Drug and Cosmetic (FD&C) Act that apply to all medical devices, Class I, II, and III." (See, fda.gov/MedicalDevices/DeviceRegulationandGuidance/Overview/ClassifyYourDevice/, accessed on Aug. 1, 2017). Examples of Class II medical devices are powered wheelchairs, acupuncture needles, infusion pumps, air purifiers, and some pregnancy testing kits. General controls are regulatory requirements authorized by the FD&C Act, under sections 501, 502, 510, 516, 518, 519, and 520. General controls apply to all medical devices, unless exempted by regulations. If a device is exempted from one of the general controls, such exemption is stated in the classification regulation for that device. Special controls include device-specific regulatory requirements, including special labeling requirements, patient registries, premarket data requirements, guidelines, mandatory performance standards, and post-market surveillance. Class II medical devices are generally held to a higher level of assurance than Class I devices and have a low risk of injury or harm to a patient or user.

As used herein, the term "administered," or "administration," or "to administer," means the step of giving (i.e. administering) a composition (drug, calories, meals, portions, etc.) to a subject. A subject being administered the disclosed compositions is one who ingests, eats, drinks, or otherwise consumes the composition. Compositions can include components of a diet, i.e. an edible meal, portion of edible vegetable, meat, or fruit, according to the requirements set forth below, etc.

As used herein, the term "non-caffeinated beverage" means an ingestible liquid beverage that contains no caffeine or undetectable amounts of caffeine.

As used herein, the term "portion" means a specific amount of an edible food, which is meat, vegetable, or fruit. If the portion is referring to a portion of meat, the portion is an amount of meat equivalent to about 3 ounces of meat at the time the meat is consumed, i.e., if the meat is cooked prior to consumption, a portion of cooked meat is 3 ounces of meat weighed after it is cooked. Conversely, if the meat is eaten raw or partially cooked, a portion of such meat is again about 3 ounces raw or 3 ounces after the cooking is completed, i.e. at the time the meat is consumed by the subject. If the portion is referring to a portion of vegetable, the portion of vegetable is equivalent to about 1 cup of vegetable. If the portion is referring to a portion of fruit, the portion of fruit is equivalent to about 1 cup of fruit.

As used herein, the term "flash frozen" or "blast freezing" or "shock freezing" means to freeze an item at a sufficient rate such that ice crystals do not form, or form only in a relatively small quantity and size compared to simply placing an item in a household freezer. To flash freeze an item or portion of food (meat, vegetable, or fruit) means to place the item into a cold environment of circulating cryogenic temperature air such that the item freezes completely within a few hours. The cryogenic temperature into which the food item is placed must be well below the melting/freezing point of water. Often liquid nitrogen and/or dry ice in ethanol is used in the flash freezing process. (See, for instance, U.S. Pat. No. 1,773,079). Commercially available appliances capable of flash freezing foods include those that provide consistent temperatures of from 0° C. to −40° C. Such appliances are generally capable of passing through the maximum temperature zone of crystallization, which is about −1° C. to about −5° C., in less than one hour. Commercially available shock or blast freezing appliances require about 90 minutes to pass through this zone. Depending on the ingredients or food that is frozen, the time to reach crystallization at the molecular level using both the shock freezer and flash freezer can be similar. Commercial foods available in grocery stores often are described as being "flash frozen" and are intended to be encompassed by this definition, such as flash frozen fish and the like.

As used herein, the term "preserved" means food that is processed to prevent spoilage such as by heating or drying. Preserved foods can be shelf stable. "Shelf stable" means that the food does not require refrigeration to prevent spoilage. Shelf stable foods can be processed in aseptic or retort packaging that does not require refrigeration until after opening, such as canned food products.

As used herein, the term "synthetic sugar" or "artificial sweetener" or "sugar substitute" (these terms are used interchangeably throughout the present disclosure) means a non-naturally occurring sugar that is wholly or partially non-naturally occurring and which is synthesized using organic synthetic chemistry or is isolated using various chemical purification techniques to create an extract containing the sugar substitute. Examples of synthetic sugars include, but are not limited to, acesulfame potassium, aspartame, neotame, advantame, saccharin, sucralose, mannitol, sorbitol, and xylitol. Other less common sugar substitutes include, but are not limited to, cyclamate, allulose, other sugar alcohols. However, the naturally occurring sweeteners *Stevia* and mogrosides, or any known natural extracts of monk fruit, are not synthetic sugars or artificial sweeteners or sugar substitutes according to these definitions.

As used herein, the term "adjunctive item" means any one or more of, or combination of, potassium citrate, sodium bicarbonate, citric acid, sodium citrate, and/or trace mineral supplements. These are elements commonly employed by dieticians and nutritionists to raise systemic pH to avoid issues associated with acidity as a result of fat burning, etc. Trace minerals can include, for example, iron, manganese, copper, iodine, zinc, cobalt, chromium, copper, molybdenum, fluoride, and selenium that are found naturally in foods of a normal human diet. Trace minerals are most often made commercially available in recommended dietary allowance dosages (U.S. National Academy of Sciences), over the counter. While in some embodiments of the methods trace elements can be added to the diet, in other embodiments, sodium is not included in the calorie-restricted diet and food portions.

Terms such as "treating" or "treatment" or "to treat" or "alleviating" or "to alleviate" refer to therapeutic measures that cure, slow down, lessen symptoms of, and/or halt or slow the progression of an existing diagnosed pathologic condition or disorder. Terms such as "prevent," "prevention," "avoid," "deterrence" and the like refer to prophylactic or preventative measures that prevent the development of an undiagnosed targeted pathologic condition or disorder. Thus, "those in need of treatment" can include those already with abnormally high levels of VF; those prone to gaining VF; and those in whom VF gain is to be prevented. Terms such as "treating" or "treatment" or "to treat" or "alleviating" or "to alleviate" refer to both 1) therapeutic measures that cure, slow down, lessen symptoms of, reverse, and/or halt progression of a diagnosed pathologic condition or disorder such as an increase in VF contributing to such diseases, and 2) prophylactic or preventative measures that prevent and/or slow the development of VF. Beneficial or desired clinical results include, but are not limited to, alleviation of symptoms associated with a high level of VF, diminishment of the extent of a disease associated with VF accumulation, stabilized (i.e., not worsening) state of disease, delay or slowing of disease progression, amelioration or palliation of the disease state, and remission (whether partial or total), whether detectable or undetectable. "Treatment" can also mean prolonging survival as compared to expected survival if not receiving treatment. Those in need of treatment include those already with high levels of VF or a disorder associated therewith, as well as those prone to have a condition or disorder associated with high levels of VF, or those in which the condition or disorder is to be prevented.

By "subject" or "individual" or "animal" or "patient" or "mammal," is meant any subject, particularly a mammalian subject, for whom diagnosis, prognosis, or therapy is desired. Mammalian subjects include humans, domestic animals, farm animals, and zoo, sports, or pet animals such as dogs, cats, guinea pigs, rabbits, rats, mice, horses, swine, cows, bears, and so on.

As used herein, phrases such as "a subject that would benefit from therapy" and "an animal in need of treatment" includes subjects, such as mammalian subjects, that would benefit from disclosed methods and compositions for the purpose of prevention of diseases or conditions associated with relatively high levels of VF.

The term "processed food" and other terms provided in this paragraph, as used herein, are defined as provided by the U.S. Food, Drug, and Cosmetic Act (21 U.S.C. § 201(gg)), and means any food other than a raw agricultural commodity and includes any raw agricultural commodity that has been subject to processing, such as canning, cooking, freezing, dehydration, or milling. The term "raw agricultural commodity" means any food in its raw or natural state, including all fruits that are washed, colored, or otherwise treated in their unpeeled natural form prior to marketing. The term "food additive" means any substance the intended use of which results or may reasonably be expected to result, directly or indirectly, in its becoming a component or otherwise affecting the characteristics of any food (including any substance intended for use in producing, manufacturing, packing, processing, preparing, treating, packaging, transporting, or holding food; and including any source of radiation intended for any such use). The term "color additive" means a material which: (A) is a dye, pigment, or other substance made by a process of synthesis or similar artifice, or extracted, isolated, or otherwise derived, with or without intermediate or final change of identity, from a vegetable, animal, mineral, or other source, and (B) when added or applied to a food, drug, or cosmetic, or to the human body or any part thereof, is capable (alone or through reaction with other substance) of imparting color thereto.

The terms "refined food" and "processed food" as used herein are also considered to be readily available "fast" or "convenience" ready-to-eat or ready-to-heat processed food, bars, and drink products. Refined and/or processed foods are calorically dense, are high in refined starches, sugars, fats or salt, and have a heavy glycemic load. Refined and/or processed foods can include, for example, meat, poultry, fish or shellfish, fruits, vegetables, and dairy that do not contain all of its original nutrients or does not exist in its refined state in nature. Some or all of the unique nutrient profile of such foods, i.e. proteins, water soluble and fat-soluble vitamins, minerals, enzymes, essential fatty acids, calcium, iron, fiber, bran, germ, endosperm, and the like, has been removed through chemical or mechanical processing in refined and/or processed foods. These refined and/or processed food items are artificially enriched using methods and techniques that return a minimal proportion of nutrients that is different than the original food item before processing and packaging. Such processed and/or refined foods can also be fortified by supplementing the food with additional vitamins, minerals, or nutrients that were not originally in the food in its natural harvested state. Refined foods and/or processed foods also have an unnaturally long shelf life compared to natural foods that are not refined or processed. Refined foods and/or processed foods can also contain refined carbohydrates that were plant-based foods that have had part or all of the whole grain (bran, germ and endosperm) extracted during processing. Refined carbohydrates are forms of sugars and starches that don't exist in nature. For instance, it is not possible to pick or harvest a refined food immediately from a garden and consume it. (See, J. Moubarac, "Consumption of ultra-processed foods and likely impact on human health," *Canada Public Health Nutrition*, 16(12):2240-2248, 2012; C. Monteiro, "A new classification of foods based on the extent and purpose of their processing," *Cad. Saúde Pública, Rio de Janeiro*, 26(11):2039-2049, 2010; and C. Monteiro, "Increasing consumption of ultra-processed foods and likely impact on human health," *Brazil Public Health Nutrition*, 14(1):5-13, 2010).

Visceral Fat

In 2015, the World Health Organization estimated a worldwide population of 2.3 billion of overweight individuals and more than 700 million of obese adults (who.int/topics/obesity/en/). This epidemic affects not only adults, but also children. At least about 41 million children are obese and/or overweight. (See, Bibiloni et al., *ISRN Obes.*, 2013:392747, 2013).

Abdominal obesity is associated with increased accumulation of VF. VF, sometimes called "deep fat," or "visceral adipose tissue," or "intra-abdominal adipose tissue", "organ fat", or "visceral adiposity," is stored primarily in the abdominal and thoracic cavities, and surrounding inner organs. Thoracic and abdominal organs are commonly understood to include at least the stomach, liver, pancreas, kidneys, heart, lungs, and intestines. VF can be divided into intraperitoneal [omental (for stomach and spleen), mesenteric (for intestine) and epiploic (for colon)], retroperitoneal or perirenal (surrounding the kidneys), gonadal (adhered to the uterus/ovaries or epididymis/testis), and pericardial or epicardial adipose tissue (around heart and major vessels). (See, Gonzalez et al., *Cardiovasc. Diabetol.*, 16:44, 2017). VF is a type of ectopic fat tissue deposit used when the subcutaneous adipose tissue cannot accommodate excess fat because of its limited expandability. (Smith, U., *J. Clin. Invest.*, 125(5):1790-1792, 2015).

VF is different from subcutaneous fat (SF) both physiologically and cellularly. SF is found mainly under the skin. Visceral adipocytes in particular are increasingly recognized as being biologically active. Scientists and clinicians view VF (also referred to as visceral adipose tissue) as comprising an endocrine organ or gland that produces hormones and other substances that can profoundly affect health. It is becoming clearer with recent studies that excess body fat, especially abdominal fat, disrupts the normal balance and functioning of these hormones, and contributes to weight gain and weight regain after weight loss, and directly drives the physiological processes that lead to numerous serious and prevalent health issues, such as nonalcoholic fatty liver disease (NAFLD), hypertension, coronary artery disease (CAD), cardiovascular disease (CVD), T2D, and the like.

On a cellular and molecular level, studies have shown that the biological characteristics of VF and SF differ dramatically by gene-expression profiling (Linder J., *Lipid Res.*, 45: 148-154, 2004; Matsuzawa et al., *J. Atheroscler. Thromb.*, 18(8):629-39, 2011; Funahashi et al., *Intern. Med.*, 38: 202-206, 1999). VF is a highly secretory organ compared to SF. VF is capable of secreting large quantities of pro-inflammatory cytokines (coined adipokines) and free fatty acids. For this reason, VF is considered toxic. (Farb et al., *Horm. Mol. Biol. Clin. Investig.*, 21(2):125-136, 2015).

One reason excess VF is considered to be harmful to health is its location near the portal vein, which carries blood from the intestinal area to the liver. Substances released by VF, including pro-inflammatory signaling molecules and free fatty acids, enter the portal vein and travel to the liver, where they can influence the production of blood lipids. VF is directly linked with higher total cholesterol and LDL (bad) cholesterol, lower HDL (good) cholesterol, and insulin resistance.

There is accumulating evidence to support a direct involvement of these VF regional adipose tissue deposits in the development of many metabolic and immune-related conditions and diseases including but not limited to atherosclerosis, cardiovascular disease (CVD, Gomez-Hernandez et al., *Int. J. Endocrinol.*, 2016:1216783, 2016; Britton et al., *Circulation*, 124:e837-41, 2011), inflammatory bowel disease (IBD), cancer, type 2 diabetes (T2D, Walsh et al., *Calcif. Tissue Int.*, 100(5):528-535, 2017), hypertension, hepatic steatosis (Park et al., *J. Gastroenterol. Hepatol.*, 23:900-907, 2008), metabolic syndrome, dementia, depression, arthritis, obesity, sleep disorders, and NAFLD (Heinrich et al., *Front. Endocrinol. (Lausanne)*, 8:8, 2017; and Graffy et al., *Br. J. Radiol.*, 89(1062):20151024, 2016).

Methods of Quantifying Visceral Fat

Various methods, instruments, and apparatuses are commercially available that provide various degrees of accuracy in estimating the relative amount of VF in a subject, including, for example, bioelectric impedance analysis (BIA), body mass index (BMI), measurement of neck, thigh, waist, and/or hip circumference, hip to waist ratio measurements, neck to thigh ratio measurements, waist to thigh ratio measurements, sagittal abdominal diameter measurement, ultrasound, dual image/dual energy x-ray absorptiometry (DEXA), air displacement plethysmography, and computed tomography (CT), among others. The presently disclosed methods and compositions are amenable to use of any of these methods for estimating VF content in a subject and any one or more of these methods can be employed to measure the decrease in VF achieved by the disclosed methods and compositions.

BIA is a method employing an electrical instrument or apparatus to determine body composition or body fat in a subject. The method is based on the concept that relatively small electrical currents can be sent through cellular tissue and will decrease in magnitude depending on the amount of fat in the cellular tissue. Thus, the instruments employed by this method measure the amount of voltage absorbed by the cellular tissue. The decrease in voltage experienced when two electrodes of a bioelectric impedance device are placed in contact with a subject is then associated with an overall body percentage of fat, VF, and the like, through the use of proprietary algorithms (bioelectric impedance analysis, BIA). Impedance of the electrical current is generally measured from the wrist to the contralateral ankle of the subject. Bioelectrical impedance devices often employ two or four electrodes and a small current of about 1 to 10 µA passed between the electrodes. In some BIA devices, the subjects hold two electrodes, one in each hand, and stands on a platform containing two additional electrodes. Thus, the current is passed through the subject's body from wrist to foot on both sides of the body. Some BIA devices employ multiple electrical frequencies (two, three, four, five, six, seven, or eight or more frequencies) in a single device to determine body composition. Such instruments are commonly referred to as class II bioelectrical impedance instruments.

BIA is based on the electrical impedance, or opposition to the flow of an electrical current through body tissues, used to determine the relative amount of total body water (TBW). The TBW determination can in turn be used to determine fat-free body mass, and by different with body weight, the relative amount of body fat. Living cellular tissue is essentially a resistor to electrical current, whereas water is a conductor. Electrical impedance of a human being to determine body fat content is typically performed by measuring electrical impedance from the wrist to the contralateral ankle using two or four electrodes.

The FDA classifies medical devices as Class I, Class II, and Class III based on the level of control necessary to assure safety and effectiveness. Class I devices are subjected to the least amount of regulatory control, called "General Controls" that are directed to adulteration, misbranding; device registration and listing; premarket notification; banned devices; notification, including repair, replacement, or refund; records and reports; restricted devices; and good manufacturing practices. Class II devices require more regulation from the FDA in addition to General Controls, including special labeling requirements, mandatory performance standards, and post-market surveillance, etc. Examples of Class II devices include acupuncture needles, powered wheelchairs, infusion pumps, air purifiers, and surgical drapes.

Various BIA devices are commercially available, such as those manufactured by Omron® (Shimogyō-ku, Kyoto, Kyoto Prefecture, Japan), InBody® (Cerritos, Calif., US), Bodystat® (Cronkbourne, Douglas, Isle of Man, British Isles, United Kingdom), RJL Systems (Clinton Township, Mich., US), BiolAnalogics® (Beaverton, Oreg., US), Seca® (Chino, Calif., US), Maltron International (Rayleigh, Essex, England, UK), Boditrax (Nottingham, England), and Tanita® (Amsterdam, The Netherlands). At least Tanita®, Boditrax, Seca®, InBody®, and Omron® currently commercially offer Class II BIA devices that quantify VF and that can be used in the present methods. Any one or more BIA device capable of detecting and measuring VF can be employed in the presently disclosed methods.

As one non-limiting example, Omron® BIA devices can be used according to manufacturer recommended instructions and procedures in the disclosed methods to measure VF content in a subject. Omron® indicates that for both men and women, a low VF reading is one that yields a score of less than 10 (includes 0 on models using 0, +, ++), and a high VF rating is one that yields a score of equal to or greater than 10 (includes + and ++ on models using 0, +, ++).

In a further non-limiting example, InBody® BIA instruments, such as their Model 570, Model 770, or S10, can be used according to manufacturer recommended instructions and procedures in the disclosed methods to measure VF content in a subject. InBody® manufacturer instructions indicate that for both men and women, a low VF reading is one that is less than a value of 11, and a high VF reading is one that indicates a value of equal to or greater than 11 for the Model 570. In the InBody® Model 770, the manufacturer indicates that a reading of less than 70 $cm^2$ indicates a low level of VF for women and less than 90 $cm^2$ indicates a low level of VF for men. Likewise, in the InBody® Model 770, the manufacturer indicates that a reading of equal to or greater than 70 $cm^2$ indicates a high level of VF for women and a reading of equal to or greater than 90 $cm^2$ indicates a high level of VF for men.

In another non-limiting example, Seca® BIA instruments, such as models 514 or 525, can be used according to manufacturer recommended instructions and procedures in the disclosed methods to measure VF content in a subject. Seca® manufacturer instructions indicate that for both men and women, a low VF reading is one that is less than a value of 2.0, and a high VF reading is one that indicates a value of equal to or greater than 2.0.

Further, in a non-limiting example, Boditrax BIA instruments can be used according to manufacturer recommended instructions and procedures in the disclosed methods to measure VF content in a subject. Boditrax manufacturer instructions indicate that for both men and women, a low VF reading is one that is less than a value of 11, and a high VF reading is one that indicates a value of equal to or greater than 11.

Finally, Tanita® manufactures and produces class II BIA medical devices that can be used according to manufacturer instructions and procedures in the presently disclosed methods. Tanita® manufacturer instructions indicate that for both men and women, a low VF reading is one that is less than a value of 12, and a high VF reading is one that indicates a value of equal to or greater than 12.

In other embodiments of the disclosed methods, relative VF content in a subject can be determined by reference to Body Mass Index (BMI). To determine BMI, the subject's height and weight are measured. The BMI is the subject's weight divided by the subject's height. A BMI value of less than 18.5 indicates generally that the subject is underweight. A BMI value of 18.5 to 23.9 indicates that the subject is generally at normal weight. A BMI value of 25 to 29.9 indicates that the subject is overweight. A BMI value of 30 or greater typically is an indication that the subject is obese. However, it should be noted that BMI is a less-accurate measure of VF since can often lead to spurious results (but not always), such as indicating an athletic subject is obese, and because BMI values do not indicate where fat is distributed in a subject. According to the World Health Organization, whose BMI ranges are often cited in fitness centers and health clinics, BMI "provides the most useful population-level measure of overweight and obesity, as it is the same for both sexes and for all ages of adults. However, it should be considered as a rough guide because it may not correspond to the same body fat percentage in different individuals." (See, who.int/dietphysicalactivity/childhood_what/en/). However, other published studies, such as one focusing on a cross section of 300 college students and staff at the University of Hail, have found "significant positive correlations . . . among Body Mass Index, Body Fat % and VF level." (See, Bano et al., *Curr. Res. Nutrition Food Sci.*, 3(3):256-262, 2015).

Other methodologies useful in estimating VF employ various other measurements of subject anatomy, such as waist, neck, and/or hip circumference measurement, hip to waist ratio measurements, neck to thigh ratio measurements, and waist to thigh ratio measurements as an estimation of VF. Such measurements often include measuring the sagittal abdominal diameter of the subject. VF level can also be determined via waist circumference, but similar to BMI, such methodologies relying solely on waist circumference can be an inaccurate means of assessing baseline or changes in VF load. However, these anthropometric measurement-based methodologies take into account subject body shape (pear-shaped human subjects are generally believed to be healthier than apple-shaped human subjects). Since abdominal fat is where VF is most often stored in subjects, a measurement taking into account the abdominal diameter of the subject can under some circumstances be a good indicator of the relative amount of VF in a subject.

For example, when employing a hip-to-waist ratio (or the waist-hip ratio) measurement methodology, the following guidelines can be used. To measure the waist in a human subject, place a tape measure directly on the skin of the subject, or over no more than one layer of light clothing of the subject. The subject's waist should be measured halfway between the lowest rib and the top of the hipbone. This is roughly in line with the belly button. The subject should then breathe out normally before taking the measurement, i.e. the circumferential value is obtained at the end of normal breath exhalation, when the lungs are at their functional residual capacity. The abdominal wall of the subject should be relaxed, not tensed. The measuring tape should be snug and not squeeze or pinch the skin of the subject. The World Health Organization provides further advice on this measurement technique in its document "Waist Circumference and Waist-Hip Ratio: Report of a WHO Expert Consultation," from Dec. 8-11, 2008 (Geneva). (See, ISBN 9789241501491, 39 pages, 2011, chapter 2). The WHO publication instructs that the waist should be measured at the level of the umbilicus or navel of the subject, i.e. the midpoint between the lower margin of the last palpable rib and the top of the iliac crest, whereas measurement of the hip of the subject should be taken around the widest portion of the buttocks. (Id., at page 5-6). The WHO document further instructs that the measuring tape should be parallel to the floor, snug around the subject but pulled so tight as to be constricting. A stretch-resistant tape measure should be used in this protocol, and "the subject stands with arms at the sides, feet positioned close together, and weight evenly distributed across the feet." (Id.). Generally, the WHO document recommends that subjects' waist and hip measurements be taken after an overnight fast period for consistency. For human women subjects, a hip-to-waist ratio of less than 0.85 indicates a relatively low level of VF, whereas a hip-to-waist ratio equal to or greater than 0.85 can indicate a relatively high level of VF. Similarly, for human men subjects, a hip-to-waist ratio of less than 0.90 indicates a relatively low level of VF, whereas a hip-to-waist ratio equal to or greater than 0.90 can indicate a relatively high level of VF.

Some reports indicate that methodologies employing purely a waist circumference measurement can be a better indication of VF in a subject than BMI or hip-to-waist measurements since this is where major deposits of VF most often are located in a subject. For human women subjects, a waist circumference of less than 80 cm indicates a relatively low level of VF, whereas a waist circumference greater than 80 cm can indicate a relatively high level of VF. Similarly, for human men subjects, a waist circumference of less than 90 cm indicates a relatively low level of VF, whereas a waist circumference greater than 90 cm can indicate a relatively high level of VF.

Another method of estimating relative amounts of VF before and after employing the disclosed methods involves measuring the sagittal abdominal diameter (SAD), i.e. the height of the abdomen in the supine position, or the distance from the small of the back of the subject to the upper abdomen. SAD may be measured at any point from the narrowest point between the last rib and the iliac crests of the subject to the midpoint of the iliac crests. In such methodologies, for both male and female subjects, a measurement of less than 25 cm can indicate a low level of VF, whereas a measurement of equal to or greater than 25 cm can indicate a high level of VF.

Methodologies including ultrasound instruments can be used to quantify VF. Ultrasound measures the intra-abdominal thickness, usually at 1 to 5 cm above the umbilicus. In such methodologies, for both male and female subjects, a measurement of less than 7 cm can indicate a low level of VF, whereas a measurement of equal to or greater than 7 cm can indicate a high level of VF. (See, for example, Wagner, D. R., J. Obes., 2013:280713, 2013). As reported in Wagner, ultrasound has been used for nearly five decades to assess body fat and can be used to measure various tissue thicknesses, including adipose.

Dual-Energy X-Ray Absorptiometry (DXA, or DEXA) is another method commonly employed to estimating VF in a subject, as well as bone mineral density. (See, for example, Sung et al., Arch. Dis. Child., 85:263-267, 2001; and Clasey et al., Med. Sci. Sports Exerc., 29(4):560-567, 1997). DEXA provides a reading of fat and lean mass distribution throughout the entire body of the subject using x-ray technology and can provide data concerning loss of body fat over time. In this method, the instrument sends two x-ray beams of differing energy levels through body tissue. Fat, bone mineral, and fat-free soft tissue each have different absorption properties, as do VF versus subcutaneous fat. Soft tissue can be subtracted from the scans using various algorithms and body fat is determined in a similar manner to BIA in that the absorption of the x-ray energies is directly related to the type of tissue the x-ray strikes. A scan is made of the entire subject from head to foot and the digitized readouts are used to calculate relative amounts of body fat, and especially VF. DEXA therefore can also be employed in the presently disclosed methods to accurately determine the amount of VF in a subject before and after following the disclosed methods for reducing VF.

Air displacement plethysmography (ADP) is a densitometric method that can be used to determine body composition in a subject, including VF. Air displacement plethysmography has been used to quantitate body composition for two decades. Displacement plethysmography has previously also included acoustic plethysmography, helium displacement, photogrammetry, and 3-dimensional photonic scanning. (See, Fields et al., Am. J. Clin. Nutrit., 75:453-467, 2002). ADP methodology quantitates body composition by measuring the volume of air a subject's body displaces inside an enclosed chamber (plethysmograph). Total body volume of the subject is therefore measured by subtracting the volume of air remaining inside the chamber when the subject is inside from the volume of air in the chamber when it is empty. (Id.). Typical chamber sizes are from 300 to 450 liters. Measurements occur under mostly adiabatic conditions. Displacement plethysmography therefore can also be employed in the presently disclosed methods to accurately determine the amount of body fat in a subject before and after following the disclosed methods for reducing VF.

Another methodology commonly employed to measure body fat in a subject is computed tomography or computed axial tomography (CT or CAT, respectively). Like DEXA, CT instruments operate by beaming x-rays at a subject's body and measuring absorption of the x-ray energy. In this method, cross-sectional images of the subject's body are generated using digital geometry processing thereby generating a three-dimensional volume of the inside of the subject from a series of 2-dimensional slices. Computer algorithms then evaluate these images to accurately calculate percent body fat including various different types of fat. However, the energy level of radiation received by a subject when subjected to the x-rays employed in such devices has been linked to cancer and has been shown to damage body cells, including DNA molecules over time.

As with CT scanning, Magnetic Resonance Imaging (MRI) can also be used to accurately determine the amount of VF in a subject before and after following the disclosed methods of reducing VF. For human women subjects, an MRI measurement of less than 70 cm$^2$ of VF indicates a relatively low level of VF, whereas a measurement equal to or greater than 70 cm$^2$ of VF indicates a relatively high level of VF. Similarly, for human men subjects, an MRI measurement of VF of less than 90 cm$^2$ indicates a relatively low level of VF, whereas an MRI-based measurement of VF of equal to or greater than 90 cm$^2$ indicates a relatively high level of VF.

Any of these methods can be employed in the present methods of decreasing VF in a subject as a way to detect VF in the subject before and after the subject has followed the disclosed methods. While such detection methods are in some embodiments not included, the detection methods allow the subject to determine the quantity of VF lost while following the disclosed methods. That is, detection of VF in the disclosed methods is not necessary to lose VF by following the disclosed methods. The detections merely offer a means by which the subject can measure progress towards the goal of decreasing VF. Any one or more of the disclosed methods of detecting VF can be employed, in any combination desired. All combinations are contemplated, but especially detection by way of a class II BIA instrument is contemplated since such devices are ubiquitous in the industry, readily commercially available, relatively inexpensive, and simple to operate by an inexperienced user.

Furthermore, many such devices incorporate access to the internet, world wide web, capabilities. Such connectivity allows for easy reporting of results of measurements to counselors, doctors, partners, or other personnel working with the subjects to monitor and evaluate progress towards the goal of reducing VF. Such monitoring can be helpful in some embodiments because it allows others administering the method to adjust the method as needed to achieve optimal VF loss results. That is, in some embodiments, the subject can choose which types of foods they will consume while performing the disclosed methods. Some foods consumed by the subject can yield better results than other foods in some subjects. A trained professional, counselor, or other administrator working with the subject to perform the disclosed methods can assess which foods or components of the method work best for a particular subject by being notified of the results of daily, weekly, bi-weekly, monthly, or even hourly measurements of visceral body fat and optionally charting progress against various embodiments of the disclosed methods, i.e. various foods able to be administered and consumed by the subject. Wi-Fi connectivity in such devices, in certain embodiments, would facilitate this process of optionally reporting progress to an administrator or other experienced health professional.

Methods of Reducing Visceral Fat

Previously attempted low-calorie diet (LCD) studies employed as a means of reducing weight all include various limitations in their designs that prevents extrapolation of those results to the general population, or to the population of subjects who would be in most need of weight loss and reduction of VF for health reasons and quality of life. The cohorts studied in past trials typically included very small groups, i.e. less than about 55 individuals, or required that subjects possess restrictively defined starting parameters. These restrictions include, for example, gender (male or female only), gender demographic sub-cohorts (only premenopausal women not taking oral contraception), and health histories, medication and comorbidities ("healthy" obese individuals with no comorbidities, those only undergoing current treatment for T2D with no additional medications or comorbidities, etc.). These studies often included prepackaged foods, or supplementation with pre-prepared powders or liquids. Imposed exercise regimens in past studies often included either a prescribed regimen, or instead exercise was fully excluded from subjects. No previous study takes into account the current, daily average physical intensity of the subjects that is experienced in their daily routines or occupation. In other words, in many of the past studies, subjects had to meet either a sedentary lifestyle definition or were excluded.

There are no previously reported studies whose design allows for extrapolation and/or direct application of their results to the larger general unsorted population of Americans who ironically are the most likely to want or need to lose weight and reduce their VF burden. Most commonly, overweight or obese individuals are prescribed medications for hypertension, dyslipidemia/triglyceridemia, and/or T2D. These are the three most common comorbidities found in the section of the American population that most often seeks to lose weight or reduce VF. Not a single published study, prior to the results reported herein, evaluated a cohort of subjects that includes a statin by itself, nor any combination (≥2) of comorbidities, including a history of or concurrent prescription of hypertension, dyslipidemia/triglyceridemia, and/or T2D medications. These past studies have, in essence, selected for cohorts of subjects that are in fact most likely to show a favorable response to intervention using previous diet methods with minimum side effects or adverse consequences. If we then look to additional comorbidities beyond the top three, but still commonly occurring in the population, there is a high rate of occurrence of depression, hypothyroidism requiring hormone replacement, arthritis, gout, sleep apnea (with and without prescription of a CPAP machine), previous heart attack, and previous weight loss surgery. There is not a single weight loss study or intervention published before the present study that has allowed subjects with these common ailments and diseases.

The duration of LCD studies performed before the present study are generally less than 12 weeks in total length, and none are directly comparable to the presently disclosed 20 Day timepoint (below). For example, only two studies (Pasquali et al., *Int. J. Obes.*, 14:207-217, 1990; and, Kim et al., *Diabetes Res Clin Pract*, 66:S139-S144, 2004) had a duration close to any of the method timepoints reported below (20 Days, 40 Days, or 60 Days). The Pasquali publication reports a 4 week (28 Day) study where a combination of LCD and metformin intervention was employed only in premenopausal women (no other comorbidities were included other than polycystic ovary syndrome, nor were any concurrent prescription medications admitted to the study). An overall VF reduction of 8.3% (as determined by CT scan) was reported. In Kim et al., a 4 week study is described in which a 5.7% VF reduction (as determined by CT scan) was reported using a LCD and prescription of sibutramine. In this study, the subjects were restricted to only Korean premenopausal nondiabetic women.

In contrast, the presently disclosed methods, are not restricted to only premenopausal women, and are directly applicable to most of the general public, including those suffering from and/or diagnosed with the various comorbidities or ailments described above. As can be seen from the reported 20 Day data in Table 3, below, women of less than 40 years of age and between 40 and 49 years of age showed a 12.2% reduction in VF. (See also, Tables 15 and 17). Thus, the data reported below as outcomes from the presently disclosed methods is more effective at 20 Days than any of the previously reported LCD with metformin and the LCD with sibutramine interventions, with results reported at 28 days.

All very low-calorie diet (VLCD) studies restricted to less than 850 calories per day had limitations in the study design that prevents the extrapolation and/or direct application of the reported methodologies and results to the general population of subjects, or to the population of those subjects who would be most in need of weight loss and a reduction of VF. (See, for example, Gray et al., *Am. J. Clin. Nutr.,* 54:623-627, 1991; Colles et al., *Am. J. Clin. Nutr.,* 84:3 04-11, 2006; Zamboni et al., *Obes. Res.,* 4:555-560, 1996; Zamboni et al., *Am. J. Clin. Nutr.,* 58:29-34, 1993; and DePergola et al., *Obes. Res.,* 6(6):408-415, 1998). As in previous LCD studies, the cohorts to which the subjects were restricted in these studied included very small groups (n≤20) of strictly defined participants. These restrictions included, for example, gender (male or female only), gender demographic sub-cohorts (only premenopausal women), and health histories or prescription medication use (requiring normal glucose tolerance and normal lipid profiles, and excluding subjects with comorbid conditions including coronary heart disease, or hypertension, or prescription medications including oral contraception). The majority of these previous VLCD studies required hospitalization, adherence to a strictly liquid diet, and/or were conducted outside of the US. In no study was physical intensity of the subjects' occupation taken into account (subjects had to lead a sedentary lifestyle or they were excluded from the study).

No previous study design allows for extrapolation and/or application of the described method and/or results to a general population of subjects who are most likely to want or need to lose weight and to reduce their VF burden. Most commonly, overweight or obese individuals in the general population are prescribed various medications to control hypertension, dyslipidemia/triglyceridemia, and/or T2D. Not a single published study evaluated a cohort of subjects that includes a statin by itself, nor any combination (≥2) of prescription medications used to treat hypertension, dyslipidemia/triglyceridemia, or T2D. Studies that included premenopausal women always excluded oral contraception. Two previous studies (DePergola et al., *Obes. Res.,* 6(6): 408-415, 1998, and Gray et al., *Am. J. Clin. Nutr.,* 54:623-627, 1991) provided a duration similar in magnitude to the methods employed herein, corresponding to timepoints of 20 Days, 40 Days, and/or 60 Days. DePergola et al. describes a 3 week (21 day) study of premenopausal women conducted outside of the US. The women in the DePergola et al. study were restricted to a daily calorie intake of 318 calories, and were required to be hospitalized during the study. In Gray et al., a study of 10 weeks (70 days) duration was conducted of 36 women (24 who had T2D and 12 who were non-diabetic) who were restricted to a liquid diet of 650 calories per day. Although the study reported a non-statistically significant 3.7% reduction of VF (as determined by waist to hip ratio measurements) in the 10 non-diabetic subjects to complete the study, no information on the reduction of the T2D subjects was provided. In contrast, at 60 days, the presently disclosed methods and compositions provide an overall reduction in VF of 20.5% for all women, and a 20.4% reduction in VF in particular for the female T2D sub-cohort (see below). In contrast to prior studies, both of these reductions are shown below to be statistically significant, did not require hospitalization, and allowed oral contraceptives.

Other studies of weight loss in this field have restricted their subjects in numerous ways that are incompatible with the daily lives and routines of most average adults living in a modern society. For instance, prior studies have been conducted for small groups of participants (less than 50) in which diets are restricted to liquid-only intake of calories, have included pre-packaged, processed, or meal replacement foods such as bars, shakes, or frozen dinners and the like. (See, for example, Leenen et al., *J. Clin. Endocrinol. Metab.,* 78:1515-1520, 1994; Conway et al., *Am. J. Clin. Nutr.,* 61: 765-771, 1995). Many prior studies required that the subjects exhibit a normal lipid profile and/or that they be non-smokers. Other subjects routinely excluded from such studies were women using oral contraceptives (see, Laaksonen et al., *Nutr. Metab. Cardiovasc. Dis.,* 13:349-356, 2003), postmenopausal or pre-menopausal women, subjects with a history of weight change, subjects having a history of weight change prior to enrollment, i.e. a stable weight for at least 12 weeks prior to study enrollment (see Ross et al., *Ann. Intern. Med,* 133:92-103, 2000; Purnell et al., *J. Clin. Endocrinol. Metab.,* 85:977-982, 2000), subjects who are sedentary (see, Okura et al., *Obes. Res.,* 11:1131-1139, 2003; Weinsier et al., *Am. J. Clin. Nutr.,* 74:631-636, 2001; Gower et al., *Am. J. Clin. Nutr.,* 76:923-927, 2002; and Rice et al., *Diabetes Care,* 22:684-691, 1999), subjects unable to fit into a CT or MRI machine, subjects with a history of glucose intolerance or who were at the time of the study intolerant to glucose (see, Tchernof et al., 2000 and 2002, *Circulation,* 105:564-569, 2002; and Tchernof et al., *Diabetes,* 49:1709-1713, 2000), subjects with a history of type 1 diabetes, subjects with a history of hypertension or those who at the time of enrollment were diagnosed with hypertension, and subjects possessing one or more comorbidity indications including, but not limited to, prescribed medication(s) for illnesses including immune disorders, cardiovascular disorders, gastrointestinal disorders, previous treatment for cancer, renal disorders, respiratory disorders, hepatic disorders, endocrine disorders, skeletomuscular disorders, and/or neurological disorders. (See, for instance, Alverez et al., *Am. J. Physiol. Endocrinol. Metab.,* 289: E665-E669, 2005; Tiikainnen et al., *Diabetes,* 52:701-707, 2003; Tiikainnen et al., 2004, *Am. J. Clin. Nutr.,* 79:22-30, 2004). Further restrictions commonly placed on subjects of prior studies included hospitalization requirements, one-on-one direct counseling requirements (see, Van Rossum et al., *Obes. Res.,* 8:29-35, 2000; and Nicklas et al., *J. Gerontol. A Biol. Sci. Med. Sci.,* 58:181-189, 2003), and the requirement of specified exercise routines during the course of the study methods (see, Janssen et al., *Int. J. Obes. Relat. Metab. Disord.,* 23:1035-1046, 1999; and Thong et al., *Am. J. Physiol. Endocrinol. Metab.,* 279:E307-E313, 2000). Specific exclusions are common in prior studies, including the exclusion of subjects with a history of hyperlipidemia, coronary heart disease, vascular disease, and the like. (See, for example, Goodpaster et al., *Diabetes,* 48:839-847, 1999; Kockx et al., *Thromb. Haemost.,* 82:1490-1496, 1999; and Van der Kooy et al., *Am. J. Clin. Nutr.,* 57:327-333, 1993).

As reported in Giannopoulou et al., earlier studies often did not include individuals with T2D, in whom disordered fat storage and mobilization occurs, causing dramatic metabolic abnormalities. In these individuals, the abdominal fat may respond to the weight loss interventions differently than in obese individuals. (See, Giannopoulou et al., *J. Clin.*

*Endocrin. Metab.*, 90(3):1511-1518, 2005). In fact, Giannopoulou et al. reports that "exercise is required for a reduction in VAT, because the high monounsaturated fat (HMF) diet alone did not reduce this fat depot." (Id.). Thus, Giannopoulou et al. concludes that exercise is a requirement to achieve any reduction in VF.

In contrast to previous belief in the field and all previously reported studies, the presently disclosed methods and compositions achieve a meaningful reduction in VF by adhering to caloric intake from a defined set of foods within a specific window of time each day. A nutritionally balanced, structured diet within a specified calorie range, which triggers weight loss via reduction of visceral adipose tissue providing improvement in health. The presently disclosed methods include a structured low fat, low sodium, low carb, very low calorie diet that does not include prepackaged meals or liquid meal replacements. These methods are specifically designed to reduce visceral adipose tissue in adult individuals, thereby also lowering the weight of the subjects following the methods.

Thus, unlike previously reported generic weight-loss regimens and methods, the disclosed methods are compatible with the majority of subjects, many of whom present with various clinically-diagnosed diseases or co-morbidities such as T2D, hypercholesterolemia, cardiovascular conditions and diseases, and the like, and who otherwise have a history of taking medications, such as statins, to address these other health issues. Furthermore, it is known that such health issues are commonly associated with diet, a state of being overweight, and obesity. Thus, what is needed is a method of decreasing VF in a subject that is generally applicable to the overall general population. The presently disclosed methods and compositions are intended to be, and in practice are shown to be, fully compatible with the large majority of the US population, even those who are prescribed various pharmaceuticals, such as, but not limited to, contraceptives, one or more lipid and/or triglyceride lowering drugs including, but not limited to statins, fibrates, niacin, bile acid sequestrants, microsomal triglyceride transfer protein inhibitors, cholesterol/lipid absorption inhibitors; drugs prescribed for hypertension including but not limited to thiazide diuretics, calcium channel blockers, angiotensin converting enzyme inhibitors, angiotensin II inhibitors, and beta blockers; drugs prescribed for depression and major depressive syndrome including but not limited to selective serotonin reuptake inhibitors, atypical antipsychotics, serotonin-norepinephrine reuptake inhibitors, norepinephrine-dopamine reuptake inhibitors, monoamine oxidase inhibitors, tricyclic antidepressants, and dopamine reuptake inhibitors; medications prescribed for thyroid hormone replacement including but not limited to synthetic or naturally derived thyroxine, synthetic or naturally derived triiodothyronine, and a synthetic or naturally derived thyroxine/triiodothyronine combination; medications prescribed for T2D including but not limited to insulin, sulfonylureas, biguanides, thiazolidinediones, alpha-glucosidase inhibitors, metlitinides, dipeptidyl peptidase 4 inhibitors, sodium-glucose co-transporter-2 inhibitors, and bile acid sequestrants; medications prescribed for gout including but not limited to xanthine oxidase inhibitors, colchicine, and uricase variants.

The methods and compositions disclosed herein, in one embodiment, are to be conducted over a period of between about 20 and about 60 days. In another embodiment, the methods disclosed herein are to be conducted for between about 20 and 60 days, 21 and 60 days, 22 and 60 days, 23 and 60 days, 24 and 60 days, 25 and 60 days, 26 and 60 days, 27 and 60 days, 28 and 60 days, 29 and 60 days, 30 and 60 days, 31 and 60 days, 32 and 60 days, 33 and 60 days, 34 and 60 days, 35 and 60 days, 36 and 60 days, 37 and 60 days, 38 and 60 days, 39 and 60 days, 40 and 60 days, 41 and 60 days, 42 and 60 days, 43 and 60 days, 44 and 60 days, 45 and 60 days, 46 and 60 days, 47 and 60 days, 48 and 60 days, 49 and 60 days, 50 and 60 days, 51 and 60 days, 52 and 60 days, 53 and 60 days, 54 and 60 days, 55 and 60 days, 56 and 60 days, 57 and 60 days, 58 and 60 days, about 20 days, about 25 days, about 30 days, about 35 days, about 40 days, about 45 days, about 50 days, about 55 days, or about 60 days. Any number of days within these ranges may be employed depending on the initial measurement of VF and overall health, medical history, age, gender, history of medical illness, occupation, relative daily energy expenditure, allergies, and/or stress levels of the subject employing the disclosed methods. Each of these variables can be taken into consideration when conducting the disclosed methods, or may be considered individual or in combination, when embarking upon the disclosed method. For instance, an elderly adult female who has a high level of VF but is otherwise healthy and exhibits no medical complications, can follow the disclosed methods for as many as 60 days, whereas a younger adult male with a history of heart conditions, T2D, and who is only moderately overweight or nearly average in initial VF readings, can follow the disclosed methods for a shorter period of time and achieve the desired VF loss.

The age of subject can be anywhere from 12 years of age and older. No particular age is necessary. As noted, the disclosed methods are generally applicable and amenable to subjects of the general population of any gender and age. In one embodiment, the subject is from about 12 years of age to about 99 years of age. In another embodiment, the subject is from 18 years of age to 90 years of age. In other embodiments, the subject is from 20 to 90 years of age, 25 to 90 years of age, 30 to 90 years of age, 35 to 90 years of age, 40 to 90 years of age, 45 to 90 years of age, 50 to 90 years of age, 55 to 90 years of age, 60 to 90 years of age, 65 to 90 years of age, 70 to 90 years of age, 75 to 90 years of age, 80 to 90 years of age, or 85 to 90 years of age. The subject can be 12 years old, 18 years old, 20 years old, 25 years old, 30 years old, 35 years old, 40 years old, 45 years old, 50 years old, 55 years old, 60 years old, 65 years old, 70 years old, 75 years old, 80 years old, 85 years old, or even 90 years old, or any age therebetween. In another embodiment, the subject is between about 40 and about 65 years of age and is male, the subject is between about 40 and about 65 years of age and is female, or is between about 40 years of age and about 65 years of age.

While the methods disclosed herein are generally applicable to any subject in the general population, such as any subject of the general population of a civilized country, such as any subject of the general population of the United States, some contraindications are contemplated. Certain subjects having various medical conditions or diseases can be excluded from the disclosed methods. Such contraindications or exclusions applicable to subjects of the disclosed methods can optionally include, for example, subjects who are pregnant and/or breastfeeding, subjects prescribed a current treatment for cancer, such as chemotherapy, immunotherapy, and/or radiation therapy, subjects who have or will during the method undergo surgery including a major organ transplant with prescription of immunosuppressant medication, subjects who are over 70 years of age and have experienced three or more CVD comorbidities, subjects restricted to a vegetarian diet, subjects diagnosed with or presenting with psychiatric conditions such as and including but not limited to: schizophrenia, bipolar disorder, and/or manic depression. Such subjects in some embodiments are optionally excluded from the disclosed methods because in some circumstances such subjects are not capable of adequately or reliably assessing VF, and thereby unable to adjudge progress towards reduction of VF.

Thus, while various embodiments of durations are provided above for conducting the disclosed methods, the disclosed methods can be safely conducted, and are conceived of being conducted, for various amounts of time with the overall goal in mind of reducing the amount of VF in the subject. Thus, the methods are not necessarily intended to reach the goal of reducing the overall weight of the subject to an ideal level (though this can occur as a byproduct of a subject following the disclosed methods) or to reduce healthy VF. On the other hand, the methods disclosed herein can be conducted more than once, or even twice, or three or more times by the same subject, with a recovery period between each attempt. The recovery period between each attempt can be, for example, 1 week, 2 weeks, 3 weeks, 4 weeks, 5 weeks, 6 weeks, 7 weeks, or 8 week or more. In one embodiment, the subject follows the disclosed methods multiple times to achieve an overall loss in VF goal. Thus, the goal of the disclosed methods is to reduce VF in the subject; however, overall body fat of the subject will also be reduced as a result of following the described methods because VF is a component of the overall body fat of a subject. In one embodiment, the method comprises a calorie-restricted diet that is administered to the subject for a period of time equivalent to the amount of time needed for the amount of VF in the subject to decrease by between about 5% and about 56%, or between about 5% and about 30%. In another embodiment, the period of time the diet of the method is administered to the subject is the amount of time sufficient for the amount of VF in the subject to decrease by a minimum of about 5%, about 5.5% to about 12.5% when using a 20 day program, about 14% to about 22% when using a 40 day program, or about 17% to about 30% when using a 60 day program, or a maximum of about 56%. In another embodiment, the period of time the diet of the method is administered to the subject is the amount of time sufficient for the amount of VF in the subject to decrease by about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, or 56%.

When a single subject repeats the disclosed methods more than once, in one embodiment, the subject rests, or in other words refrains from calorically restricting their diet, for a period of two weeks, three weeks, four weeks, five weeks, six weeks, seven weeks, or even as many as eight weeks or more, before performing the disclosed methods a second time. The disclosed methods can be performed by a subject or administered to a subject as many as three, four, five, or even six or more times to achieve the desired reduction in visceral fat in the subject.

In the disclosed methods, on one embodiment, the amount of VF present in the subject is measured before following any other steps in the method so as to obtain a first value, or "baseline," or starting point set of basal level conditions (metrics or health metrics) of the subject. The amount of VF present in the subject is quantitated or determined using any one or more of the methodologies for such purposes described herein or that is commercially available. Multiple methodologies and/or instruments can be used to detect VF in the subject, or a single methodology can be employed. In another embodiment of the disclosed methods, at a second time point after beginning the method, the amount of VF in the subject is again determined or determined. In another embodiment of the disclosed methods, the amount of VF in the subject is determined, quantitated, or calculated multiple times throughout the method, at regular or irregular intervals during the time the diet of the method is administered to the subject. In one embodiment, the amount of VF in the subject is determined every day, every other day, every third day, every fourth day, every fifth day, every sixth day, once per week, or every other week until completion of the method. In another embodiment, a final determination is made of the amount of VF in the subject after completion of the method. Optionally, the amount of VF in the subject is not determined at any point during the method.

In another embodiment, the amount of VF in the subject is reported to an advisor, administrator, counselor, health professional, coach, partner, trainer, exercise physiologist, dietician, nurse, doctor, researcher, or person other than the subject for tracking purposes. Tracking of the amount of VF in the subject over a period of time can in some embodiments then be used to alter and/or customize the diet of the method to the individual, or the length of the method, or other aspects of the method. Optionally, the reporting of the amount of VF in the subject is conducted through the internet either by wireless communication (Wi-Fi), wired communication (ethernet), cell phone signal, or any other similar means, to a central location where the data is stored. The stored data can then optionally be accessed by the other person to track, monitor, assess, or otherwise follow the progress of the subject towards reaching the goal of the disclosed method and make any necessary changes to optimize the method or to make changes for health reasons, i.e. health of the subject, i.e. if the subject becomes sick, weak, contracts a disease, is in an accident, or is otherwise unable to continue the method to its completion in the same manner in which it was initiated by the subject.

Contemplated herein are also commercialization embodiments of the method wherein the method and the diet(s) of the method are administered by a health professional or other person or organization designed specially to implement and monitor the method. Such organizations can be franchises, clinics, virtual counseling programs, and the like. Such organizations, in one embodiment, can offer for sale and make commercially available regimens, routines, methods, and procedures identical to the disclosed methods and designed specifically for the subject and the subject's baseline metrics, i.e. amount of VF, overall health, history of disease, age, gender, and the like. Thus, in one embodiment, persons are involved in assessing the subject's baseline health metrics and thereafter customizing or designing a set of method elements and diet elements as disclosed herein for that subject and based on the specific health needs of that subject. To this end, distribution of the method on printed material, in a virtual environment, audibly, and otherwise visually, such as over the internet or cellular signals, is contemplated herein, including all forms of such printed material or conveyances of information disclosing the method and the diet(s) or compositions disclosed herein.

The methods disclosed herein include administration of a diet. The diet is a calorie-restricted diet. "Calorie-restricted" means that the subject cannot consume more than a specific number of calories of food per unit of time, i.e. per day, per week, per month, per hour, etc. The diet includes specific portions of food groups. The food groups are broken into meat, vegetable, and fruit. In one embodiment, carbohydrates are not included in the diet administered to the subject. In this context, the term "administered" means that the subject's consumption of food is restricted to only the food items and portions defined by the diet. Administration means, in other words, the subject is either prescribed, or selects, specific quantities and types of food consistent with the diet as defined below. In some embodiments, a person provides the food of the diet to the subject and thereby administers the diet to the subject and the subject consumes the diet that is administered to them. In other embodiments, the subject acquires the food items of the diet themselves and self-administers the diet to themselves by self-restricting their selected foods to those that are within the definition of the diet. Thus, the term "administering" in this context can be either a person other than the subject providing the food comprising the diet to the subject, or a person other than the subject instructing the subject which items of food and portions they must consume according to the diet of the method and subsequently the subject procuring those items of food consistent with the instructions and thereafter consuming the food in the required portions.

In one embodiment, the methods disclosed herein require that the subject consume the diet, i.e. the food items and portions thereof, within about 10 hours on a daily basis. In one embodiment, the 10 hour period of time is from about 11 am to 9 pm. In another embodiment, the consumption of food of the diet by the subject is confined to a daily period of 9.5 hours, 9.0 hours, 8.5 hours, 8.0 hours, 7.5 hours, 7.0 hours, 6.5 hours, 6.0 hours, 5.5 hours, or even 5.0 hours. In one embodiment, the methods disclosed herein restrict the consumption of the food of the diet from between about 11 am to about 6 pm each day, between about 12 pm to about 6 pm, about 12 pm to about 7 pm, about 1 pm to about 7 pm, about 10 am to about 9 pm, about 11 am to about 8 pm, about 12 pm to about 8 pm, or about 11 am to about 7 pm. In another embodiment of the disclosed methods, food consumption of the diet by the subject is restricted to between about 4 to about 6 hours after the subject typically awakens each day to about 3 to about 5 hours before the subjects go to sleep for the day. In other embodiments, subjects are precluded from consuming food of the diet after 6 pm, after 7 pm, after 8 pm, or after 9 pm. In other embodiments of the disclosed methods, the subject is precluded from consuming food within about 4 hours, about 5 hours, or about 6 hours after waking each day.

The disclosed methods, in some embodiments, include a step of administering to the subject a diet. The diet is a calorie-restricted diet. The number of calories to which the diet is restricted depends on the overall and general daily physical activity normally experienced by the subject, the baseline or first amount of VF in the subject, and the like. In other embodiments, the calorie quantity to which the diet is restricted depends on other factors including, but not limited, the age, gender, weight, medical history, and/or medical status vis-à-vis present medical condition of the subject and prescription medications (if any) prescribed to the subject at the time the method is performed.

In some embodiments, the method employs administration of a calorie-restricted diet of between about 500 and about 850 calories obtained from food per day. In other embodiments, the number of calories of the calorie-restricted diet is about 500 calories per day, about 525 calories per day, about 550 calories per day, about 575 calories per day, about 600 calories per day, about 625 calories per day, about 650 calories per day, about 675 calories per day, about 700 calories per day, about 725 calories per day, about 750 calories per day, about 775 calories per day, about 800 calories per day, about 825 calories per day, or about 850 calories per day. In one embodiment of the methods disclosed herein, the calorie-restricted diet never drops below 500 calories per day during the performance of the method.

In another embodiment of the disclosed methods, where the subject's baseline health metrics indicate a relatively low level of VF, and wherein the subject daily level of activity is considered to be sedentary, the number of calories to which the diet of the method is restricted is between about 650 and about 725, or about 650 to 675, or about 675 to 700, or about 700 to 725, calories per day. In another embodiment of the disclosed methods, where the subject's baseline health metrics indicate a relatively low level of VF, and wherein the subject daily level of activity is considered to be acutely active, the number of calories to which the diet of the method is restricted is between about 650 and about 725, or about 650 to 675, or about 675 to 700, or about 700 to 725, calories per day or between about 725 to about 800, or about 725 to 750, about 750 to 775, about 775 to 800, calories per day. In another embodiment of the disclosed methods, where the subject's baseline health metrics indicate a relatively low level of VF, and wherein the subject daily level of activity is considered to be chronically active, the number of calories to which the diet of the method is restricted is between about 750 and about 850, or about 750 to 775, or about 775 to 800, or about 800 to 825, or about 825 to 850, calories per day. The definitions of sedentary, acutely active, and chronically active are provided elsewhere herein.

In another embodiment of the disclosed methods, where the subject's baseline health metrics indicate a relatively high level of VF, and wherein the subject daily level of activity is considered to be sedentary, the number of calories to which the diet of the method is restricted is between about 500 and about 550, or about 500 to 525, or about 525 to 550, calories per day. In another embodiment of the disclosed methods, where the subject's baseline health metrics indicate a relatively high level of VF, and wherein the subject daily level of activity is considered to be acutely active, the number of calories to which the diet of the method is restricted is between about 500 and about 550, or about 500 to 525, or about 525 to 550, calories per day or between about 550 and about 650, or about 550 to 575, or about 575 to 600, or about 600 to 625, or about 625 to 650, calories per day. In another embodiment of the disclosed methods, where the subject's baseline health metrics indicate a relatively high level of VF, and wherein the subject daily level of activity is considered to be chronically active, the number of calories to which the diet of the method is restricted is between about 650 and about 750, or about 650 to 675, or about 675 to 700, or about 700 to 725, or about 725 to 750, calories per day. The definitions of sedentary, acutely active, and chronically active are provided elsewhere herein.

The methods disclosed herein, as noted above, are restricted in some embodiments to specific amounts of calories to be consumed by the subject per day during the course of the method. These calories are obtained from foods that are carefully defined below. The foods include general categories of protein/meat, vegetable, and fruit. The diet administered to the subject, in some embodiments, prescribes specific percentages of calories that are obtained from each of the general categories of meat, vegetable, and fruit. The percentages, in some embodiments, are different each day, different each week, or different every other week. In some embodiments, the percentage ranges are consistent throughout the entire method.

Food items are further defined by portion size. In some embodiments of the disclosed methods, the food that is administered as part of the calorie-restricted diet is administered in specific portion sizes. In one embodiment, a portion of meat is equivalent to about 3 ounces of meat. In another embodiment, a portion of vegetable is defined as one cup of vegetable. In another embodiment, a portion of fruit is defined as one cup of fruit. The term "cup" as used herein is the generally accepted term of art common in the cooking industry as a specific measurement, i.e. one cup is equal to 8 US fluid ounces, 16 tablespoons, 236.5 mL, 0.25 quarts, etc. The weight of the portion is as measured at the time of consumption, i.e. if the meat is consumed raw, then the portion is about 3 ounces of raw meat, and if the meat is cooked, then the portion is about 3 ounces of cooked meat, etc.

As noted above, in one embodiment of the disclosed methods, the subject is free to select whichever fruit, vegetable, and/or meat they wish to consume in any given meal on any given day of the method. However, the food must not exceed the indicated portion sizes of the method, the total number of calories of the method, or be selected from foods not permitted to be administered to the subject or consumed by the subject, as defined below. In another embodiment, the specific food items that make up the portions administered in the diet of the method are specifically designed for the subject by another person administering the diet to the subject, such that the subject has no choice in which food items to consume each day.

In one embodiment, 1 cup of vegetable, i.e. a single portion of vegetable according to the disclosed methods, is equivalent to 1 cup of precooked, chopped vegetable, where the vegetable is chopped into about 0.5 to about 1.0 in$^3$ pieces. The vegetable, in some embodiments, is restricted to a selection from a specific list of acceptable vegetables, as described in further detail below. Likewise, in some embodiments, 1 cup of fruit means 1 cup of raw fruit or cooked fruit chopped into about 0.5 to about 1.0 in$^3$ pieces. In some embodiments, the fruit must be only those provided in a specific list of fruits provided hereinbelow.

In one embodiment of the disclosed methods, the food of the administered diet is comprised of meat, vegetable, and/or fruit, wherein the fruit is optionally organically grown and harvested. In one embodiment, the fruit is fresh, and in other embodiments the fruit is flash frozen. In other embodiments, the fruit is not dried. In another embodiment of the method, the fruit is not canned. In a further embodiment of the disclosed methods, the fruit is not preserved, not heat processed, or otherwise does not contain preservatives. In other embodiments, the fruit is fresh, organically grown and harvested, fresh or flash frozen, is not dried, not canned, and does not contain preservatives of any kind.

In one aspect of the disclosed methods, the fruit portions from which the subject can select, and/or the person administering the calorie-restricted diet can select, in satisfaction of the administered calorie-restricted diet, are one or more or any combination of citrus, berries, apples, apricots, peaches, pears, nectarines, and/or plums. In another aspect of the disclosed methods, the fruit must be, and can only be, selected from one or more or any combination of citrus, berries, apples, apricots, peaches, pears, nectarines, and/or plums. In another aspect of the disclosed methods, the citrus is one or more or any combination of lemon, lime, grapefruit, tangerine, mandarin oranges, ugly fruit, clementine, and/or tangelo. In another aspect of the disclosed methods, the berries are one or more or any combination of raspberries, blackberries, blueberries, strawberries, and/or cherries.

In another aspect of the disclosed methods, the citrus must be selected from, and can only be selected from, one or more or any combination of lemon, lime, grapefruit, tangerine, mandarin oranges, ugly fruit, clementine, and/or tangelo. In another aspect of the disclosed methods, the berries must be selected from, and can only be selected from, one or more or any combination of raspberries, blackberries, blueberries, strawberries, and/or cherries.

In one embodiment of the disclosed methods, the food of the administered diet is comprised of meat, vegetable, and/or fruit, wherein the vegetable is optionally organically grown and harvested. In one embodiment, the vegetable is fresh, and in other embodiments the vegetable is flash frozen. In other embodiments, the vegetable is not dried. In another embodiment of the method, the vegetable is not canned. In a further embodiment of the disclosed methods, the vegetable is not preserved, not heat processed, or otherwise does not contain preservatives. In other embodiments, the vegetable is fresh, organically grown and harvested, fresh or flash frozen, is not dried, not canned, and does not contain preservatives of any kind.

In one aspect of the disclosed methods, the vegetable portions from which the subject can select, and/or the person administering the calorie-restricted diet can select, in satisfaction of the administered calorie-restricted diet, are one or more or any combination of artichokes, asparagus, bamboo shoots, bean sprouts, broccoli, Brussels sprouts, cabbage, cauliflower, celery, cucumber, fennel, leafy greens, garlic, green beans, peas, leaks, mushrooms, okra, onion, radishes, shallots, tomatoes, peppers including bell peppers and hot peppers, and/or zucchini. In another aspect of the disclosed methods, the vegetable must be, and can only be, selected from one or more or any combination of artichokes, asparagus, bamboo shoots, bean sprouts, broccoli, Brussels sprouts, cabbage, cauliflower, celery, cucumber, fennel, leafy greens, garlic, green beans, peas, leaks, mushrooms, okra, onion, radishes, shallots, tomatoes, peppers including bell peppers and hot peppers, and/or zucchini. In another aspect of the disclosed methods, the leafy green is one or more or any combination of arugula, spinach, kale, cabbage, bok choy, swiss chard, collard greens, dandelion greens, lettuce, and the like. In another aspect of the disclosed methods, the leafy green must be, and can only be, selected from one or more or any combination of arugula, spinach, kale, cabbage, bok choy, swiss chard, collard greens, dandelion greens, and lettuce.

The methods disclosed herein, in some embodiments, include administration of a calorie-restricted diet that comprises fruit, vegetable, and meat. In these embodiments, meat is optionally organically grown and harvested, free-range raised, and minimally processed. In one embodiment, the meat is fresh, and in other embodiments the meat is flash frozen. In other embodiments, the meat is not dried. In another embodiment of the method, the meat is not canned, processed, refined, part of a pre-packaged food product, or otherwise altered after harvesting. In a further embodiment of the disclosed methods, the meat is not preserved or otherwise contains preservatives. In other embodiments, the meat is fresh, organically grown and harvested, fresh or flash frozen, and must not be dried, canned, or contain preservatives of any kind. In another aspect of these disclosed methods, meats consumed by the subject as part of the administered diet are lean meats, i.e. meats containing less than 7% fat, less than 6% fat, less than 5% fat, less than 4% fat, less than 3% fat, less than 2% fat, less than 1% fat, or are fat free. In a particular embodiment of the described methods, the meat must contain less than at least 7% fat.

In one aspect of the disclosed methods, the meat portions from which the subject, and/or the person administering the calorie-restricted diet, can select in satisfaction of the administered calorie-restricted diet, are one or more or any combination of white poultry meat, i.e., turkey and/or chicken meat, seafood, beef, hunted game such as elk, bison, and/or venison, and/or veal. In another aspect of the disclosed methods, the meat must be, and can only be, selected from one or more or any combination of white poultry meat including only turkey and/or chicken meat, seafood, beef, hunted game including only elk, bison, and/or venison, and/or veal. In another aspect of the disclosed methods, the seafood is one or more or any combination of whitefish, cod, flounder, haddock, halibut, tilapia, sea bass, red snapper, wahoo, grouper, marlin, pollock, trout, sole, red fish, tuna, crustaceans, mollusks, squid, octopus, mussels, lobster, shrimp, crab, scallops, oysters, clams, and/or mussels. In another aspect of the disclosed methods, the seafood must be selected from, and can only be selected from, one or more or any combination of whitefish, cod, flounder, haddock, halibut, tilapia, sea bass, red snapper, wahoo, grouper, marlin, pollock, trout, sole, red fish, tuna, crustaceans, mollusks, squid, octopus, mussels, lobster, shrimp, crab, scallops, oysters, clams, and/or mussels. In another aspect of these methods, the meat is selected only from lean cuts such as tenderloin, sirloin, London broil, and/or fillet.

In another aspect of the disclosed methods, the meat portions administered to the subject as part of the calorie-restricted diet includes any combination of one or more of certain dairy foods, egg whites, and/or non-fat plain Greek yogurt. In one aspect of the described methods, the egg whites can be in liquid or powdered form when first acquired by the subject prior to consumption. In a further aspect of the disclosed methods, the non-fat plain Greek yogurt consumed by the subject as a portion of meat satisfying the requirements of the administered calorie-restricted diet is only consumed at most once per week. In this context, "Greek" yogurt is a yogurt that has been processed by extensive straining to remove a portion of, most, or all, of the liquid whey and lactose of the yogurt, leaving behind a thicker-textured yogurt product. As a reference, it is noted that commercially available plain Greek yogurt generally possesses about twice as much protein, about half the amount of carbohydrates, and about half the amount of sodium, of non-"Greek" variety yogurts. Production of Greek yogurt requires about three times the amount of milk used to make regular, non-Greek, yogurt. A typical 6-ounce serving of Greek yogurt contains 15 to 20 grams of protein, whereas regular yogurt contains about 9 grams of protein, on average. Greek yogurt contains about 5 to 8 grams of carbohydrates per 6-ounce serving, as compared to about 13 to 17 grams of carbohydrates found in regular yogurt. Greek yogurt contains about 50 milligrams of sodium per 6-ounce serving, as compared to about 100 milligrams of sodium found in regular yogurt. (See, Hiatt et al., U.S. News & World Report, Sep. 30, 2011, "Greek Yogurt Vs. Regular Yogurt: Which is More Healthful?").

In the disclosed methods involving administering to the subject a calorie-restricted diet, the preparation of the food comprising that diet is restricted. In another embodiment of the disclosed methods, the foods administered to the subject as the calorie-restricted diet are not pre-packaged, not processed or refined, and/or do not comprise additives, such as colors, dyes, preservatives, calorie-containing nutrients such as sugars, saccharides, or other injections of non-naturally occurring components or chemicals. The foods in these embodiments consumed by the subjects as part of the administered diet are not refined, fast-food, or convenience "ready to eat" meals or components of meals, and the unique natural nutrient profile of the foods are not otherwise altered by processing, purification, mechanical manipulation or processing, not canned, dried or dehydrated, or otherwise enhanced or refined to extend shelf life.

In another embodiment, the foods of the diet are not prepared or cooked in any manner with any oils. In a further embodiment of these methods, coconut oil spray is used to coat grilling surfaces or pans if/when the food portions are cooked. In a further embodiment of the disclosed methods, the food portions of the calorie-restricted diet can be prepared using low or no salt canned or boxed liquid or powder vegetable, chicken, or beef broth for use in sautéing the food portions that comprise the calorie-restricted diet.

In further embodiments of the disclosed methods, no table salt or sea salt (NaCl) is permitted to be used either to flavor the diet foods or to prepare the foods. In one embodiment, the calorie-restricted diet comprises Himalayan pink salt that can be added to food portions in the disclosed methods.

The disclosed methods, in some embodiments, require that no artificial sweeteners or sugars are added to the calorie-restricted diet foods. In another embodiment, the disclosed methods permit addition of synthetic sugars, such as *Stevia*, erythritol, xylitol, and/or monkfruit extract as additional sweeteners to the calorie-restricted diet foods. In another embodiment, the disclosed methods permit addition of only the synthetic sugars *Stevia*, erythritol, xylitol, and/or monkfruit extract as additional sweeteners to the calorie-restricted diet foods. In another embodiment, the diet of the disclosed methods precludes synthetic sugars, such as, but not limited to, refined sugar, brown sugar, maple sugar/syrup, molasses, coconut sugar, date sugar, corn syrup, agave nectar, honey, sucralose, aspartame, acesulfame, saccharin, neotame, alitame, and/or advantame.

In another aspect of the disclosed methods, the calorie-restricted diet of the disclosed methods can comprise spices and/or natural seasonings including items derived from plants that are used to flavor foods, such as dried and crushed plant material of one or more different sources, such as nutmeg, allspice, pepper, chive, oregano, cilantro, cinnamon, basil, bay leaves, cloves, coriander, cumin, fennel, garlic, ginger, juniper, mace, marjoram, mint, onion, paprika, parsley, rosemary, saffron, caraway seed, celery seed, parsley, tarragon, thyme, mustard seed, anise seed, poppy seed, lemongrass, star anise, turmeric, peppercorn, savory, achiote seed, epazote, sage, vanilla bean, and combinations thereof. Other seasonings permitted by the disclosed calorie-restricted diets administered in the disclosed methods include non-plant derived flavorants including Mrs. Dash® Original seasoning blend and/or Bragg's Sprinkle Seasoning (Live Food Products, Goleta Calif., US). In another embodiment, the calorie-restricted diet does not include monosodium glutamate. In an alternative embodiment, the calorie-restricted diet of the disclosed methods can optionally comprise only the spices and/or natural seasonings including only nutmeg, allspice, pepper, chive, oregano, cilantro, cinnamon, basil, bay leaves, cloves, coriander, cumin, fennel, garlic, ginger, juniper, mace, marjoram, mint, onion, paprika, parsley, rosemary, saffron, caraway seed, celery seed, parsley, tarragon, thyme, mustard seed, anise seed, poppy seed, lemongrass, star anise, turmeric, peppercorn, savory, achiote seed, epazote, sage, vanilla bean, and combinations thereof.

The methods disclosed herein include the step of administering to the subject a calorie-restricted diet, and in some embodiments the calorie-restricted diet includes non-caffeinated beverages. In these embodiments, the non-caffeinated beverages can be one or more of unsweetened iced tea, club soda, coffee, seltzer water, and water, and/or any combination thereof. The water can optionally include one or more of various additives such as *Stevia*, lemon juice, lime juice, vitamin C, citric acid, monkfruit extract, erythritol, and xylitol, and combinations thereof. In other embodiments, the calorie-restricted diet is restricted to only non-caffeinated beverages that are one or more of unsweetened iced tea, club soda, coffee, seltzer water, and water, and/or any combination thereof. In one further embodiment of these disclosed methods, the calorie-restricted diet is confined to no more than about 1 gallon of non-caffeinated beverage to be administered per day.

The methods described herein therefore generally provide some amount of flexibility to the subject in terms of selection of foods and portions of foods to be consumed as the calorie-restricted diet is administered. In some embodiments, the calorie-restricted diet is very restricted and requires that only the above-defined items of meat, vegetable, fruit, and beverage be consumed, and that these food items be prepared specifically as described above, without exception, during the method. Exemplary and non-limiting embodiments of detailed meal plans that are consistent with the disclosed food requirements are provided, for example, in FIGS. 31 to 42 for various groups of subjects, including subjects who initially present as a baseline level as relatively low VF or high VF, and who are sedentary, acutely active, or chronically active. These meal plans are provided as an example and not intended to restrict the presently described methods to only these meal plans. As noted above, the subject, or the person administering the calorie-restricted diet to the subject, can vary these meal plans as desired or needed to achieve specific VF reduction outcomes based on specific percentages of meat, vegetable, and/or fruit, specific meats, specific vegetables, specific fruits, specific portion sizes, time of day the meals are consumed, etc.

As noted above, the calorie-restricted diet is based on administering a specific number of portions of meat, vegetable, and fruit to the subject in need thereof. The number of portions of each, and total number of portions, administered to the subject per day varies depending on many factors including relative activity level of the subject, age, gender, baseline health metrics, and the like. Table 1, below, provides various embodiments of the calorie-restricted diet based on the number of portions of each of meat, vegetable, and fruit administered to the subject based on the subject's baseline health metrics, as non-limiting examples of the structure of the calorie-restricted diet.

TABLE 1

Portions Based on Baseline Health Metrics

| VF | Activity | Daily Calories | PORTIONS | | |
|---|---|---|---|---|---|
| | | | Meat | Vegetable | Fruit |
| Low | Sedentary | 650-725 | 3 | 3-3.5 | 2 |
| Low | Acute Active | 650-800 | 3-3.5 | 3-4 | 2-2.5 |
| Low | Chronic Active | 750-850 | 3.5 | 3-4 | 2.5 |
| High | Sedentary | 500-550 | 2-2.5 | 2-4 | 2 |
| High | Acute Active | 500-650 | 2-3 | 2-4 | 2 |
| High | Chronic Active | 650-750 | 3 | 3-4 | 2.5 |

In the disclosed methods described herein, the calorie-restricted diet is administered to the subject on a daily basis. This means that the portions of food administered to the subject and calorie restrictions apply per 24 hour period. In some embodiments, the diet comprises two meals per day in which the number of portions and calories are divided between the two meals. In one embodiment, the portions and calories are divided evenly between the two meals. In another embodiment, the calorie-restricted diet is not administered in two meals on a daily basis but instead the subject is free to consume the portions of food and calories as needed throughout the day in several smaller meals.

All of the references cited above, as well as all references cited herein, are incorporated herein by reference in their entireties. The following examples are offered by way of illustration and not by way of limitation.

EXAMPLES

Example 1: General Protocol

Data described hereinbelow was generated from an Institutional Review Board (IRB)-approved retrospective review of data from subjects completing 20, 40, or 60 days of a structured very low calorie diet (VLCD). As described elsewhere in this application, the VLCD total daily calorie range and the percentage total daily calories from protein, vegetables, and fruit for each subject was based on the baseline relative level of VF, e.g., high or low, and baseline level of physical activity, e.g., sedentary, acutely active, or chronically active, etc. Subjects were free to choose food and beverage items from a list of acceptable options that were prepared (cooked) in accordance with the methods and compositions described above. Food intake for each subject was confined to an approximately 10 hour window each day (typically from 11 AM to 9 PM).

Baseline characteristics of each subject was assessed by Body Composition Analysis (BCA) at baseline (Day 0) and Day 20, 40, or 60, depending on the length of program they were administered. This study included body composition changes measured using an FDA Class 2 medical device with Bioelectrical Impedance Analysis (BIA) employing bipolar foot electrodes (Tanita® BC-1000 plus scale, Tanita Corporation, Arlington Heights, Ill., US) using manufacturer recommended protocols. Data from the BIA device was analyzed with the Healthy Edge Plus® Software (Tanita Corporation, Arlington Heights, Ill., US) to monitor progress of each subject. Day values are approximate and could vary plus or minus one to two days. The endpoint of interest for this study was VF rating.

Baseline demographic values (age, BMI) are reported as median values±SD. The five most prevalent prescription medication classes identified by the subjects in self reporting included pharmacologic intervention for hypertension, dyslipidemia/triglyceridemia, depression, thyroid, hormone replacement, and T2D. Comorbidities identified by subjects in self reporting included hypertension, dyslipidemia/triglyceridemia, T2D, type 1 diabetes, thyroid hormone replacement, current treatment of or history of treatment for depression, previous treatment for cancer, at least one previous heart attack, narcolepsy, joint replacement or reconstructive surgery, arthritis, gout, epilepsy, nonalcoholic fatty liver disease, previous weight loss surgery, angina, atrial fibrillation, sleep apnea requiring a continuous positive airway pressure (CPAP) therapy machine, among others.

All VF outcome data are provided below as mean values±SEM. To assess for significance of relative change of VF from baseline to Day 20, 40, or 60, a D'Agostino & Pearson omnibus normality test (DAP) was used to show presence of normality in the population of mean values. (See, D'Agostino, Ralph B., "Transformation to normality of the null distribution of g1," *Biometrika,* 57(3):679-681, 1970). If the population of mean values passed the DAP normality test (parametric), then subsequent statistical analysis was performed by employing a paired T Test with Welch's Correction. If the means failed the DAP Normality Test (nonparametric). (See, Kim, T. K., test as a parametric statistic," *Korean J. Anesthesiol.,* 68(6):540-546, 2015; and Ghasemi et al., *Int. J. Endocrinol. Metab.,* 10(2):468-489, 2012). Then, subsequent statistical analysis was performed using a Wilcoxon matched-pairs signed rank test. In all cases a minimum of 10 subjects was required to power a statistical significance threshold of p<0.05. (See, Wilcoxon, Frank, "Individual comparisons by ranking methods," *Biometrics Bulletin,* 1(6):80-83, 1945).

Example 2: 20-Day Cohort—Baseline Measurements and Results

Of 256 subjects completing 20 days of structured VLCD, the median age was 53, and 54% were male. The median BMI in the 20-Day cohort was 33, and approximately two-thirds of all subjects reported at least one comorbidity. The data for baseline characteristics for the entire 20-Day cohort is provided in Table 2. All data are presented as median values±SD or number (%).

Reduction of VF rating for the entire 20-Day cohort, regardless of comorbidity or age group, is presented in Table 3 and FIG. 1. Results are presented for the entire group and for each gender. All outcome data are shown as mean values±SEM. (%).

TABLE 3

20 Day Timepoint Entire Cohort Data Table

|  | Baseline | Day 20 | % Change from Baseline | Statistical Significance |
| --- | --- | --- | --- | --- |
| All | 15.52 ± 0.398 | 14.04 ± 0.385 | −9.5 | p < 0.0001 |
| Male | 19.39 ± 0.486 | 17.54 ± 0.497 | −9.5 | p < 0.0001 |
| Female | 10.93 ± 0.308 | 9.87 ± 0.299 | −9.7 | p < 0.0001 |

Example 3: 20-Day Cohort Comorbidity Characteristics and Results

To further investigate the effectiveness of a 20-day period of structured VLCD, the data obtained from the top five most common comorbidities requiring prescription medication were analyzed. Sub-cohorts were separately analyzed and included medication for hypertension, dyslipidemia/triglyceridemia, depression, thyroid hormone replacement, and T2D.

Data describing baseline characteristics and results for each sub-cohort are provided in the following tables and figures for each comorbidity cohort as follows: hypertension (Tables 4 and 5, and FIG. 2), cholesterolemia/triglyceridemia (Tables 6 and 7, and FIG. 3), depression (Tables 8 and 9, and FIG. 4), thyroid replacement (Tables 10 and 11, and FIG. 5), type 2 diabetes (Tables 12 and 13, and FIG. 6), respectively.

Baseline characteristic data are provided below and in the Figures as median values±SD or number (%). Experimental outcome characteristic data at Day 20 are provided below and in the Figures as mean values±SEM.

TABLE 2

20-Day Cohort Baseline Characteristics

|  | All (n = 256) | Male (n = 139) | Female (n = 117) |
| --- | --- | --- | --- |
| Age, years | 53 ± 9.7 | 53 ± 9.2 | 53 ± 10.2 |
| Gender male, n (%) | 139 (54.3) | 139 (100) | 0 (0) |
| BMI | 33.2 ± 5.7 | 34.1 ± 5.9 | 32.0 ± 5.3 |
| Prescription Medications, n (%) |  |  |  |
| Anti-hypertensive | 89 (34.8) | 64 (46) | 25 (21.4) |
| Lipid-lowering | 74 (28.9) | 52 (37.4) | 22 (18.8) |
| Depression | 35 (13.7) | 13 (9.4) | 22 (18.8) |
| Thyroid Hormone | 25 (9.8) | 5 (3.6) | 20 (17.1) |
| Oral Type 2 Diabetes | 22 (8.6) | 17 (12.2) | 5 (4.3) |
| Number of Comorbidities, n (%) |  |  |  |
| ≥3 | 49 (19.1) | 37 (26.6) | 12 (10.3) |
| 2 | 57 (22.3) | 31 (22.3) | 26 (22.2) |
| 1 | 66 (25.8) | 31 (22.3) | 35 (29.9) |
| 0 | 84 (32.8) | 40 (28.8) | 44 (37.6) |

TABLE 4

20-Day Cohort Hypertension Baseline Characteristics

|  | All (n = 89) | Male (n = 64) | Female (n = 25) |
|---|---|---|---|
| Age, years | 55 ± 8.0 | 54 ± 8.0 | 56 ± 7.9 |
| Gender male, n (%) | 64 (71.9) | 64 (100) | 0 (0) |
| BMI | 36.0 ± 6.1 | 35.5 ± 5.9 | 36.5 ± 6.6 |
| Prescription Medications, n (%) | | | |
| Anti-hypertensive | 89 (100) | 64 (100) | 25 (100) |
| Lipid-lowering | 42 (47.2) | 34 (53.1) | 8 (32) |
| Depression | 14 (15.7) | 9 (14.1) | 5 (20) |
| Thyroid Hormone | 6 (6.7) | 1 (1.6) | 5 (20) |
| Oral Type 2 Diabetes | 19 (21.3) | 15 (23.4) | 4 (16) |
| Number of Comorbidities, n (%) | | | |
| ≥3 | 41 (46.1) | 32 (50) | 9 (36) |
| 2 | 31 (34.8) | 20 (31.3) | 11 (44) |
| 1 | 17 (19.1) | 12 (18.8) | 5 (20) |
| 0 | 0 (0) | 0 (0) | 0 (0) |

TABLE 5

20-Day Cohort Hypertension Results

|  | Baseline | Day 20 | % change from Baseline | Statistical Significance |
|---|---|---|---|---|
| All | 18.43 ± 0.523 | 16.89 ± 0.514 | −8.4 | p < 0.0001 |
| Male | 20.47 ± 0.579 | 18.70 ± 0.599 | −8.6 | p < 0.0001 |
| Female | 13.20 ± 0.622 | 12.24 ± 0.628 | −7.3 | p < 0.0001 |

TABLE 6

20-Day Cohort Cholesterolemia/Triglyceridemia Baseline Characteristics

|  | All (n = 74) | Male (n = 52) | Female (n = 22) |
|---|---|---|---|
| Age, years | 56 ± 6.6 | 52 ± 6.5 | 57 ± 5.6 |
| Gender male, n (%) | 52 (70.3) | 52 (100) | 0 (0) |
| BMI | 33.9 ± 5.4 | 34.2 ± 5.3 | 33.9 ± 5.6 |
| Prescription Medications, n (%) | | | |
| Anti-hypertensive | 41 (55.4) | 33 (63.5) | 8 (36.4) |
| Lipid-lowering | 74 (100) | 52 (100) | 22 (100) |
| Depression | 10 (13.5) | 7 (13.5) | 3 (13.6) |
| Thyroid Hormone | 7 (9.5) | 3 (5.8) | 4 (18.2) |
| Oral Type 2 Diabetes | 15 (20.3) | 13 (25) | 2 (9.1) |
| Number of Comorbidities, n (%) | | | |
| ≥3 | 40 (54.1) | 32 (61.5) | 8 (36.4) |
| 2 | 18 (24.3) | 12 (23.1) | 6 (27.3) |
| 1 | 16 (21.6) | 8 (15.4) | 8 (36.4) |
| 0 | 0 (0) | 0 (0) | 0 (0) |

TABLE 7

20-Day Cohort Cholesterolemia/Triglyceridemia Results

|  | Baseline | Day 20 | % change from Baseline | Statistical Significance |
|---|---|---|---|---|
| All | 17.61 ± 0.707 | 15.86 ± 0.690 | −9.9 | p < 0.0001 |
| Male | 19.88 ± 0.765 | 17.92 ± 0.790 | −9.9 | p < 0.0001 |
| Female | 12.23 ± 0.718 | 11.00 ± 0.621 | −10.1 | p = 0.0119 |

TABLE 8

20-Day Cohort Depression Baseline Characteristics

|  | All (n = 35) | Male (n = 13) | Female (n = 22) |
|---|---|---|---|
| Age, years | 51.5 ± 9.3 | 51.5 ± 5.3 | 50 ± 11.2 |
| Gender male, n (%) | 13 (37.1) | 13 (100) | 0 (0) |
| BMI | 33.1 ± 4.4 | 33.8 ± 3.0 | 31.8 ± 5.1 |
| Prescription Medications, n (%) | | | |
| Anti-hypertensive | 14 (40) | 9 (69.2) | 5 (22.7) |
| Lipid-lowering | 10 (28.6) | 7 (53.8) | 3 (13.6) |
| Depression | 35 (100) | 13 (100) | 22 (100) |
| Thyroid Hormone | 7 (20) | 0 (0) | 7 (31.8) |
| Oral Type 2 Diabetes | 1 (2.9) | 1 (7.7) | 0 (0) |
| Number of Comorbidities, n (%) | | | |
| ≥3 | 15 (42.9) | 10 (76.9) | 5 (22.7) |
| 2 | 15 (42.9) | 2 (15.4) | 13 (59.1) |
| 1 | 5 (14.3) | 1 (7.7) | 4 (18.2) |
| 0 | 0 (.0) | 0 (0) | 0 (0) |

TABLE 9

20-Day Cohort Depression Results

|  | Baseline | Day 20 | % change from Baseline | Statistical Significance |
|---|---|---|---|---|
| All | 14.34 ± 0.837 | 13.11 ± 0.798 | −8.6 | p < 0.0001 |
| Male | 19.38 ± 0.924 | 17.77 ± 0.871 | −8.3 | p = 0.0006 |
| Female | 11.36 ± 0.616 | 10.36 ± 0.643 | −8.8 | p < 0.0001 |

TABLE 10

20-Day Cohort Thyroid Replacement Baseline Characteristics

|  | All (n = 25) | Male (n = 5) | Female (n = 20) |
|---|---|---|---|
| Age, years | 53.5 ± 9.2 | 54 ± 15.9 | 53 ± 7.6 |
| Gender male, n (%) | 5 (20) | 5 (100) | 0 (0) |
| BMI | 32.0 ± 5.7 | 40.5 ± 5.0 | 31.7 ± 5.3 |
| Prescription Medications, n (%) | | | |
| Anti-hypertensive | 6 (24) | 1 (20) | 5 (25) |
| Lipid-lowering | 7 (28) | 3 (60) | 4 (20) |
| Depression | 7 (28) | 0 (0) | 7 (35) |
| Thyroid Hormone | 25 (100) | 5 (100) | 20 (100) |
| Oral Type 2 Diabetes | 0 (0) | 0 (0) | 0 (0) |
| Number of Comorbidities, n (%) | | | |
| ≥3 | 5 (20) | 1 (20) | 4 (20) |
| 2 | 11 (44) | 2 (40) | 9 (45) |
| 1 | 9 (36) | 2 (40) | 7 (35) |
| 0 | 0 (0) | 0 (0) | 0 (0) |

TABLE 11

20-Day Cohort Thyroid Replacement Results

|  | Baseline | Day 20 | % change from Baseline | Statistical Significance |
|---|---|---|---|---|
| All | 13.64 ± 1.330 | 12.28 ± 1.153 | −10.0 | p < 0.0001 |
| Male | 24.80 ± 2.709 | 21.80 ± 2.245 | −12.1 | not powered |
| Female | 10.85 ± 0.599 | 9.90 ± 0.584 | −8.8 | p < 0.0001 |

TABLE 12

20-Day Cohort Type 2 Diabetic Baseline Characteristics

|  | All (n = 22) | Male (n = 17) | Female (n = 5) |
|---|---|---|---|
| Age, years | 52 ± 6.2 | 53 ± 6.0 | 55 ± 8.5 |
| Gender male, n (%) | 17 (77.3) | 17 (100) | 0 (0) |
| BMI | 37.7 ± 4.9 | 38.4 ± 5.0 | 36.8 ± 5.0 |
| Prescription Medications, n (%) | | | |
| Anti-hypertensive | 20 (90.9) | 16 (94.1) | 4 (80) |
| Lipid-lowering | 14 (63.6) | 12 (70.6) | 2 (40) |
| Depression | 1 (4.5) | 1 (5.9) | 0 (0) |
| Thyroid Hormone | 0 (0) | 0 (0) | 0 (0) |
| Oral Type 2 Diabetes | 22 (100) | 17 (100) | 5 (100) |
| Number of Comorbidities, n (%) | | | |
| ≥3 | 15 (68.2) | 12 (70.6) | 3 (60) |
| 2 | 6 (27.3) | 5 (29.4) | 1 (20) |
| 1 | 1 (4.5) | 0 (0) | 1 (20) |
| 0 | 0 (0) | 0 (0) | 0 (0) |

TABLE 13

20-Day Cohort Type 2 Diabetic Results

|  | Baseline | Day 20 | % change from Baseline | Statistical Significance |
|---|---|---|---|---|
| All | 20.77 ± 1.343 | 19.36 ± 1.383 | −6.8 | p < 0.0001 |
| Male | 22.53 ± 1.456 | 20.94 ± 1.578 | −7.1 | p = 0.0003 |
| Female | 14.80 ± 1.158 | 14.00 ± 1.000 | −5.4 | not powered |

Example 4: 20-Day Cohort Age Group Characteristics and Results

To further investigate the effectiveness of a 20-Day period of structured VLCD, the subjects for the 20-Day cohort were broken into four groups based on age as of the beginning of the study and the results are analyzed as shown below. Age group sub-cohorts were separately analyzed and included subjects that were 39 years old and younger, 40 to 49 years of age, 50 to 59 years of age, and subjects that were older than 59 years of age. Baseline characteristics and results for each age sub-cohort is provided in the following tables and figures: subjects less than 40 years of age (Tables 14 and 15, and FIG. 7), subjects of age 40 to 49 years (Tables 16 and 17, and FIG. 8), subjects of age 50 to 59 years (Tables 18 and 19, and FIG. 9), subjects that were older than 59 years of age (Tables 20 and 21, and FIG. 10). Baseline characteristic data are provided as median values±SD or number (%). Experimental outcome characteristic data at Day 20 are provided as mean values±SEM.

TABLE 14

20-Day Cohort Subjects Less Than 40 Years of Age Baseline Characteristics

|  | All (n = 32) | Male (n = 15) | Female (n = 17) |
|---|---|---|---|
| Age, years | 31.5 ± 5.3 | 30 ± 5.0 | 35 ± 5.3 |
| Gender male, n (%) | 15 (46.9) | 15 (100) | 0 (0) |
| BMI | 33.3 ± 7.3 | 37.5 ± 7.6 | 30.8 ± 4.4 |
| Prescription Medications, n (%) | | | |
| Anti-hypertensive | 4 (12.5) | 3 (20) | 1 (5.9) |
| Lipid-lowering | 1 (3.1) | 1 (6.7) | 0 (0) |
| Depression | 5 (15.6) | 1 (6.7) | 4 (23.5) |
| Thyroid Hormone | 2 (6.3) | 1 (6.7) | 1 (5.9) |
| Oral Type 2 Diabetes | 0 (0) | 0 (0) | 0 (0) |
| Number of Comorbidities, n (%) | | | |
| ≥3 | 2 (6.3) | 1 (6.7) | 1 (5.9) |
| 2 | 2 (6.3) | 0 (0) | 2 (11.8) |
| 1 | 8 (25) | 6 (40) | 2 (11.8) |
| 0 | 20 (62.5) | 8 (53.3) | 12 (70.6) |

TABLE 15

20-Day Cohort Subjects Less Than 40 Years of Age Results

|  | Baseline | Day 20 | % change from Baseline | Statistical Significance |
|---|---|---|---|---|
| All | 13.09 ± 1.469 | 11.91 ± 1.433 | −9.0 | p < 0.0001 |
| Male | 19.20 ± 2.163 | 17.73 ± 2.183 | −7.7 | p = 0.0026 |
| Female | 7.71 ± 0.623 | 6.77 ± 0.532 | −12.2 | p < 0.0001 |

TABLE 16

20-Day Cohort Subjects 40 to 49 Years of Age Baseline Characteristics

|  | All (n = 62) | Male (n = 31) | Female (n = 31) |
|---|---|---|---|
| Age, years | 46 ± 2.4 | 46 ± 2.3 | 46 ± 2.5 |
| Gender male, n (%) | 31 (50) | 31 (100) | 0 (0) |
| BMI | 33 ± 5.9 | 33.1 ± 6.1 | 32.4 ± 5.3 |
| Prescription Medications, n (%) | | | |
| Anti-hypertensive | 21 (33.9) | 16 (51.6) | 5 (16.1) |
| Lipid-lowering | 20 (32.3) | 16 (51.6) | 4 (12.9) |
| Depression | 8 (12.9) | 3 (9.7) | 5 (16.1) |
| Thyroid Hormone | 8 (12.9) | 0 (0) | 8 (25.8) |
| Oral Type 2 Diabetes | 8 (12.9) | 6 (19.4) | 2 (6.5) |
| Number of Comorbidities, n (%) | | | |
| ≥3 | 16 (25.8) | 12 (38.7) | 4 (12.9) |
| 2 | 12 (19.4) | 7 (22.6) | 5 (16.1) |
| 1 | 15 (24.2) | 3 (9.7) | 12 (38.7) |
| 0 | 19 (30.6) | 9 (29) | 10 (32.3) |

TABLE 17

20-Day Cohort Subjects 40 to 49 Years of Age Results

|  | Baseline | Day 20 | % change from Baseline | Statistical Significance |
|---|---|---|---|---|
| All | 14.18 ± 0.493 | 12.66 ± 0.585 | −10.7 | p < 0.0001 |
| Male | 18.32 ± 0.789 | 16.52 ± 0.836 | −9.8 | p < 0.0001 |
| Female | 10.03 ± 0.496 | 8.81 ± 0.507 | −12.2 | p < 0.0001 |

TABLE 18

20-Day Cohort Subjects 50 to 59 Years of Age Baseline Characteristics

|  | All (n = 130) | Male (n = 78) | Female (n = 52) |
|---|---|---|---|
| Age, years | 55 ± 2.7 | 55 ± 2.7 | 56 ± 2.5 |
| Gender male, n (%) | 78 (60) | 78 (100) | 0 (0) |
| BMI | 33.5 ± 5.4 | 33.9 ± 5.3 | 31.9 ± 5.5 |
| Prescription Medications, n (%) | | | |
| Anti-hypertensive | 46 (35.4) | 34 (43.6) | 12 (23.1) |
| Lipid-lowering | 44 (33.8) | 31 (39.7) | 13 (25) |
| Depression | 18 (13.8) | 9 (11.5) | 9 (17.3) |
| Thyroid Hormone | 11 (8.5) | 4 (5.1) | 7 (13.5) |
| Oral Type 2 Diabetes | 8 (6.2) | 8 (10.3) | 0 (0) |
| Number of Comorbidities, n (%) | | | |
| ≥3 | 25 (19.2) | 20 (25.6) | 5 (9.6) |
| 2 | 34 (26.2) | 20 (25.6) | 14 (26.9) |
| 1 | 32 (24.6) | 16 (20.5) | 16 (30.8) |
| 0 | 39 (30) | 22 (28.2) | 17 (32.7) |

TABLE 19

20-Day Cohort Subjects 50 to 59 Years of Age Results

|  | Baseline | Day 20 | % change from Baseline | Statistical Significance |
|---|---|---|---|---|
| All | 16.53 ± 0.524 | 14.82 ± 0.492 | −10.3 | p < 0.0001 |
| Male | 19.62 ± 0.612 | 17.51 ± 0.604 | −10.8 | p < 0.0001 |
| Female | 11.90 ± 0.437 | 10.79 ± 0.415 | −9.3 | p < 0.0001 |

TABLE 20

20-Day Cohort Subjects Greater Than 59 Years of Age Baseline Characteristics

|  | All (n = 32) | Male (n = 15) | Female (n = 17) |
|---|---|---|---|
| Age, years | 62 ± 3.7 | 62 ± 3.1 | 63 ± 4.1 |
| Gender male, n (%) | 15 (46.9) | 15 (100) | 0 (0) |
| BMI | 33.1 ± 5.3 | 35 ± 5.6 | 32 ± 5.1 |
| Prescription Medications, n (%) | | | |
| Anti-hypertensive | 18 (56.3) | 11 (73.3) | 7 (41.2) |
| Lipid-lowering | 9 (28.1) | 4 (26.7) | 5 (29.4) |
| Depression | 4 (12.5) | 0 (0) | 4 (23.5) |
| Thyroid Hormone | 4 (12.5) | 0 (0) | 4 (23.5) |
| Oral Type 2 Diabetes | 6 (18.8) | 3 (20) | 3 (17.6) |
| Number of Comorbidities, n (%) | | | |
| ≥3 | 7 (21.9) | 4 (26.7) | 3 (17.6) |
| 2 | 12 (37.5) | 5 (33.3) | 7 (41.2) |
| 1 | 11 (34.4) | 5 (33.3) | 6 (35.3) |
| 0 | 2 (6.3) | 1 (6.7) | 1 (5.9) |

TABLE 21

20-Day Cohort Subjects Greater Than 59 Years of Age Results

|  | Baseline | Day 20 | % change from Baseline | Statistical Significance |
|---|---|---|---|---|
| All | 17.12 ± 1.145 | 16.27 ± 1.192 | −5.0 | p = 0.0025 |
| Male | 20.60 ± 1.241 | 19.55 ± 1.447 | −5.0 | p = 0.0339 |
| Female | 12.36 ± 0.947 | 11.73 ± 0.905 | −5.1 | p = 0.0019 |

Example 5: 20-Day Cohort Conclusions

Finally, the overall experimental outcome for all subjects of the 20-Day cohort, including all sub-cohorts was analyzed. The data is summarized below in Table 22. All data in Table 22 are presented as mean values±SEM.

TABLE 22

20-Day Cohort VF Rating Results Review Table

|  | Baseline | Day 20 | % change from Baseline | Statistical Significance |
|---|---|---|---|---|
| Entire Cohort | 15.52 ± 0.398 | 14.04 ± 0.385 | −9.5 | p < 0.0001 |

TABLE 22-continued

20-Day Cohort VF Rating Results Review Table

|  | Baseline | Day 20 | % change from Baseline | Statistical Significance |
|---|---|---|---|---|
| Hypertension Cohort | 18.43 ± 0.523 | 16.89 ± 0.514 | −8.4 | p < 0.0001 |
| Cholesterolemia/ Triglyceridemia Cohort | 17.61 ± 0.707 | 15.86 ± 0.690 | −9.9 | p < 0.0001 |
| Depression Cohort | 14.34 ± 0.837 | 13.11 ± 0.798 | −8.6 | p < 0.0001 |
| Thyroid replacement Cohort | 13.64 ± 1.330 | 12.28 ± 1.153 | −10.0 | p < 0.0001 |
| Type 2 Diabetic Cohort | 20.77 ± 1.343 | 19.36 ± 1.383 | −6.8 | p < 0.0001 |
| <40 Years of Age Cohort | 13.09 ± 1.469 | 11.91 ± 1.433 | −9.0 | p < 0.0001 |
| 40-49 Years of Age Cohort | 14.18 ± 0.493 | 12.66 ± 0.585 | −10.7 | p < 0.0001 |
| 50-59 Years of Age Cohort | 16.53 ± 0.524 | 14.82 ± 0.492 | −10.3 | p < 0.0001 |
| >59 Years of Age Cohort | 17.12 ± 1.145 | 16.27 ± 1.192 | −5.0 | p = 0.0025 |

The 20-Day cohort is of respectable size (n=256), including 139 male and 117 female subjects. The 20-Day cohort represents a broad range of baseline BMI, ages, and weight-associated health issues and is approximately representative of the general US population. Two-thirds of the subjects had at least one health issue requiring medication/intervention and/or at least one comorbidity. The range of baseline BMI of the subjects for the 20-Day cohort included subjects that were overweight, obese, and morbidly obese.

Overall, the 20-Day cohort showed a statistically significant 9.5% reduction in VF, with both men and women performing equally well (9.5% vs 9.7%, respectively). Sub-cohorts, e.g., hypertension group, and sub-sub-cohorts thereof, e.g., male hypertension group, also showed statistically significant reductions in VF ranging from 5.0% to 12.2%. All but two sub-cohorts showed statistically significant VF reduction using the described methods and compositions, both of which were sub-sub-cohorts (male thyroid replacement, and female T2D). However, each of these sub-cohorts comprised only five subjects, which is well below the number of subjects needed to achieve a p<0.05 level of significance.

While statistical significance is important, the bigger issue of clinical significance of the results is even more critical when assessing if this duration of intervention provides a real health benefit to the general population, including those with other clinical complications. Many prior studies have shown that a decrease in accumulated VF (measured by CT or BIA) correlates with a decrease in the number of metabolic risk factors, e.g., hypertension, dyslipidemia, and hyperglycemia. (See, Okauchi et al., *J. Atheroscler. Thromb.*, 17:1237-1245, 2010; Hiuge-Shimizu et al., *Ann. Med.*, 44:82-92, 2012; Fox et al., *Circulation*, 116:39-48, 2007; and Okauchi et al., *Diabetes Care*, 30:2392-2394, 2007). A reduction of ≥5% over a period of less than a month is both a statistically and a clinically significant finding.

Example 6: 40-Day Cohort—Baseline Measurements and Results

Of 622 subjects completing 40 days of structured VLCD, the median age was 50, and 58% were male. The median BMI in the 40-Day cohort was 35, and approximately 63% of all subjects reported at least one comorbidity. Data for baseline characteristics for the entire 40-Day cohort is provided in Table 23. All data are presented as median values±SD or number (%).

Reduction of VF rating for the entire 40-Day cohort, regardless of comorbidity or age group, is presented in Table 24, and FIG. 11. Results are presented for the entire 40-Day cohort and broken down by gender. All outcome data are shown as mean values±SEM.

TABLE 23

40-Day Cohort Baseline Characteristics

|  | All (n = 622) | Male (n = 360) | Female (n = 262) |
|---|---|---|---|
| Age, years | 50 ± 9.4 | 50 ± 9.2 | 51 ± 9.7 |
| Gender male, n (%) | 360 (57.9) | 360 (100) | 0 (0) |
| BMI | 35.1 ± 6.1 | 35.7 ± 5.9 | 33.5 ± 6.0 |
| Prescription Medications, n (%) |  |  |  |
| Anti-hypertensive | 203 (32.6) | 136 (37.8) | 67 (25.6) |
| Lipid-lowering | 167 (26.8) | 119 (33.1) | 48 (18.3) |
| Depression | 87 (14) | 43 (11.9) | 44 (16.8) |
| Thyroid Hormone | 59 (9.5) | 17 (4.7) | 42 (16) |
| Oral Type 2 Diabetes | 57 (9.2) | 43 (11.9) | 14 (5.3) |

TABLE 23-continued

40-Day Cohort Baseline Characteristics

|  | All (n = 622) | Male (n = 360) | Female (n = 262) |
|---|---|---|---|
| Number of Comorbidities, n (%) | | | |
| ≥3 | 113 (18.2) | 73 (20.3) | 40 (15.3) |
| 2 | 111 (17.8) | 74 (20.6) | 37 (14.1) |
| 1 | 165 (26.5) | 87 (24.2) | 78 (29.8) |
| 0 | 233 (37.5) | 126 (35) | 107 (40.8) |

TABLE 24

40-Day Cohort Results

|  | Baseline | Day 40 | % change from Baseline | Statistical Significance |
|---|---|---|---|---|
| All | 16.87 ± 0.288 | 13.68 ± 0.249 | −18.9 | <0.0001 |
| Male | 20.60 ± 0.361 | 16.48 ± 0.333 | −20.0 | <0.0001 |
| Female | 11.75 ± 0.219 | 9.83 ± 0.206 | −16.3 | <0.0001 |

Example 7: 40-Day Cohort Comorbidity Characteristics and Results

To further investigate the effectiveness of a 40-day period of structured VLCD, the data obtained from the top five most common comorbidities requiring prescription medication were analyzed. Sub-cohorts were separately analyzed and included medication for hypertension, dyslipidemia/triglyceridemia, depression, thyroid hormone replacement, and T2D.

Data describing baseline characteristics and results for each sub-cohort are provided in the following tables and figures for each comorbidity cohort as follows: hypertension (Tables 25 and 26, and FIG. 12), cholesterolemia/triglyceridemia (Tables 27 and 28, and FIG. 13), depression (Tables 29 and 30, and FIG. 14), thyroid replacement (Tables 31 and 32, and FIG. 15), T2D (Tables 33 and 34, and FIG. 16), respectively.

Baseline characteristic data are provided below and in the Figures as median values±SD or number (%). Experimental outcome characteristic data at Day 40 are provided below and in the Figures as mean values±SEM.

TABLE 25

40-Day Cohort Hypertension Baseline Characteristics

|  | All (n = 203) | Male (n = 136) | Female (n = 67) |
|---|---|---|---|
| Age, years | 53 ± 8.0 | 52 ± 7.9 | 55 ± 8.2 |
| Gender male, n (%) | 136 (67) | 136 (100) | 0 (0) |
| BMI | 36.5 ± 6.2 | 36.6 ± 5.8 | 36.0 ± 6.9 |
| Prescription Medications, n (%) | | | |
| Anti-hypertensive | 203 (100) | 136 (100) | 67 (100) |
| Lipid-lowering | 109 (53.7) | 77 (56.6) | 32 (47.8) |
| Depression | 34 (16.7) | 15 (11) | 19 (28.4) |
| Thyroid Hormone | 14 (6.9) | 4 (2.9) | 10 (14.9) |
| Oral Type 2 Diabetes | 41 (20.2) | 31 (22.8) | 10 (14.9) |
| Number of Comorbidities, n (%) | | | |
| ≥3 | 87 (42.9) | 54 (39.7) | 33 (49.3) |
| 2 | 71 (35) | 53 (39) | 18 (26.9) |
| 1 | 45 (22.2) | 29 (21.3) | 16 (23.9) |
| 0 | 0 (0) | 0 (0) | 0 (0) |

TABLE 26

40-Day Cohort Hypertension Results

|  | Baseline | Day 40 | % change from Baseline | Statistical Significance |
|---|---|---|---|---|
| All | 19.59 ± 0.504 | 16.01 ± 0.439 | −18.3 | <0.0001 |
| Male | 22.54 ± 0.556 | 18.27 ± 0.515 | −18.9 | <0.0001 |
| Female | 13.66 ± 0.518 | 11.45 ± 0.466 | −16.2 | <0.0001 |

TABLE 27

40-Day Cohort Cholesterolemia/Triglyceridemia Baseline Characteristics

|  | All (n = 167) | Male (n = 119) | Female (n = 48) |
|---|---|---|---|
| Age, years | 54 ± 8.0 | 52 ± 8.0 | 56 ± 7.2 |
| Gender male, n (%) | 119 (71.3) | 119 (100) | 0 (0) |
| BMI | 35.5 ± 6.1 | 35.7 ± 6.2 | 34.7 ± 5.9 |
| Prescription Medications, n (%) | | | |
| Anti-hypertensive | 87 (52.1) | 55 (46.2) | 32 (66.7) |
| Lipid-lowering | 167 (100) | 119 (100) | 48 (100) |
| Depression | 36 (21.6) | 22 (18.5) | 14 (29.2) |
| Thyroid Hormone | 17 (10.2) | 3 (2.5) | 14 (29.2) |
| Oral Type 2 Diabetes | 44 (26.3) | 32 (26.9) | 12 (25) |
| Number of Comorbidities, n (%) | | | |
| ≥3 | 98 (58.7) | 62 (52.1) | 36 (75) |
| 2 | 45 (26.9) | 37 (31.1) | 8 (16.7) |
| 1 | 24 (14.4) | 20 (16.8) | 4 (8.3) |
| 0 | 0 (0) | 0 (0) | 0 (0) |

TABLE 28

40-Day Cohort Cholesterolemia/Triglyceridemia Results

|  | Baseline | Day 40 | % change from Baseline | Statistical Significance |
|---|---|---|---|---|
| All | 19.63 ± 0.566 | 16.10 ± 0.497 | −18.0 | <0.0001 |
| Male | 22.07 ± 0.634 | 17.88 ± 0.590 | −19.0 | <0.0001 |
| Female | 13.60 ± 0.571 | 11.67 ± 0.523 | −14.2 | <0.0001 |

TABLE 29

40-Day Cohort Depression Baseline Characteristics

|  | All (n = 87) | Male (n = 43) | Female (n = 44) |
|---|---|---|---|
| Age, years | 51 ± 8.3 | 50.5 ± 7.8 | 51 ± 8.9 |
| Gender male, n (%) | 43 (49.4) | 43 (100) | 0 (0) |
| BMI | 34.6 ± 5.5 | 35.0 ± 4.1 | 32.0 ± 6.8 |
| Prescription Medications, n (%) | | | |
| Anti-hypertensive | 33 (37.9) | 15 (34.9) | 18 (40.9) |
| Lipid-lowering | 36 (41.4) | 22 (51.2) | 14 (31.8) |
| Depression | 87 (100) | 43 (100) | 44 (100) |
| Thyroid Hormone | 14 (16.1) | 3 (7) | 11 (25) |
| Oral Type 2 Diabetes | 9 (10.3) | 7 (16.3) | 2 (4.5) |
| Number of Comorbidities, n (%) | | | |
| ≥3 | 37 (42.5) | 19 (44.2) | 18 (40.9) |
| 2 | 29 (33.3) | 16 (37.2) | 13 (29.5) |
| 1 | 21 (24.1) | 8 (18.6) | 13 (29.5) |
| 0 | 0 (0) | 0 (0) | 0 (0) |

TABLE 30

40-Day Cohort Depression Results

|  | Baseline | Day 40 | % change from Baseline | Statistical Significance |
|---|---|---|---|---|
| All | 15.82 ± 0.640 | 12.83 ± 0.567 | −18.9 | <0.0001 |
| Male | 19.52 ± 0.826 | 15.59 ± 0.783 | −20.1 | <0.0001 |
| Female | 12.02 ± 0.550 | 10.00 ± 0.559 | −16.8 | <0.0001 |

TABLE 31

40-Day Cohort Thyroid Replacement Baseline Characteristics

|  | All (n = 59) | Male (n = 17) | Female (n = 42) |
|---|---|---|---|
| Age, years | 52 ± 9.0 | 52.5 ± 10.2 | 52 ± 8.6 |
| Gender male, n (%) | 17 (28.8) | 17 (100) | 0 (0) |
| BMI | 40.6 ± 6.3 | 42.4 ± 7.0 | 34.0 ± 6.6 |
| Prescription Medications, n (%) |  |  |  |
| Anti-hypertensive | 15 (25.4) | 8 (47.1) | 7 (16.7) |
| Lipid-lowering | 18 (30.5) | 4 (23.5) | 14 (33.3) |
| Depression | 14 (23.7) | 3 (17.6) | 11 (26.2) |
| Thyroid Hormone | 59 (100) | 17 (100) | 42 (100) |
| Oral Type 2 Diabetes | 5 (8.5) | 3 (17.6) | 2 (4.8) |
| Number of Comorbidities, n (%) |  |  |  |
| ≥3 | 21 (35.6) | 9 (52.9) | 12 (28.6) |
| 2 | 12 (20.3) | 3 (17.6) | 9 (21.4) |
| 1 | 26 (44.1) | 5 (29.4) | 21 (50) |
| 0 | 0 (0) | 0 (0) | 0 (0) |

TABLE 32

40-Day Cohort Thyroid Replacement Results

|  | Baseline | Day 40 | % change from Baseline | Statistical Significance |
|---|---|---|---|---|
| All | 15.07 ± 0.913 | 12.57 ± 0.795 | −16.6 | <0.0001 |
| Male | 22.50 ± 2.232 | 18.56 ± 2.059 | −17.5 | <0.0001 |
| Female | 12.42 ± 0.575 | 10.44 ± 0.511 | −15.9 | <0.0001 |

TABLE 33

40-Day Cohort Type 2 Diabetic Baseline Characteristics

|  | All (n = 57) | Male (n = 43) | Female (n = 14) |
|---|---|---|---|
| Age, years | 52 ± 7.7 | 52 ± 7.8 | 49.5 ± 7.6 |
| Gender male, n (%) | 43 (75.4) | 43 (100) | 0 (0) |
| BMI | 38 ± 6.9 | 38.4 ± 7.3 | 37.9 ± 5.5 |
| Prescription Medications, n (%) |  |  |  |
| Anti-hypertensive | 47 (82.5) | 37 (86) | 10 (71.4) |
| Lipid-lowering | 44 (77.2) | 32 (74.4) | 12 (85.7) |
| Depression | 8 (14) | 6 (14) | 2 (14.3) |
| Thyroid Hormone | 4 (7) | 3 (7) | 1 (7.1) |
| Oral Type 2 Diabetes | 57 (100) | 43 (100) | 14 (100) |
| Number of Comorbidities, n (%) |  |  |  |
| ≥3 | 49 (86) | 37 (86) | 12 (85.7) |
| 2 | 6 (10.5) | 4 (9.3) | 2 (14.3) |
| 1 | 2 (3.5) | 2 (4.7) | 0 (0) |
| 0 | 0 (0) | 0 (0) | 0 (0) |

TABLE 34

40-Day Cohort Type 2 Diabetic Results

|  | Baseline | Day 40 | % change from Baseline | Statistical Significance |
|---|---|---|---|---|
| All | 21.54 ± 1.172 | 18.18 ± 1.042 | −15.6 | <0.0001 |
| Male | 24.00 ± 1.288 | 20.19 ± 1.189 | −15.9 | <0.0001 |
| Female | 14.00 ± 1.351 | 12.00 ± 1.054 | −14.3 | <0.0001 |

Example 8: 40-Day Cohort Age Group Characteristics and Results

To further investigate the effectiveness of a 40-Day period of structured VLCD, the subjects for the 40-Day cohort were broken into four groups based on age as of the beginning of the study and the results are analyzed as shown below. Age group sub-cohorts were separately analyzed and included subjects that were 39 years old and younger, 40 to 49 years of age, 50 to 59 years of age, and subjects that were older than 59 years of age. Baseline characteristics and results for each age sub-cohort is provided in the following tables and figures: subjects less than 40 years of age (Tables 35 and 36, and FIG. 17), subjects of age 40 to 49 years (Tables 37 and 38, and FIG. 18), subjects of age 50 to 59 years (Tables 39 and 40, and FIG. 19), subjects that were older than 59 years of age (Tables 41 and 42, and FIG. 20). Baseline characteristic data are provided as median values±SD or number (%). Experimental outcome characteristic data at Day 40 are provided as mean values±SEM.

TABLE 35

40-Day Cohort Subjects Less Than 40 Years of Age Baseline Characteristics

|  | All (n = 77) | Male (n = 48) | Female (n = 29) |
|---|---|---|---|
| Age, years | 33 ± 5.8 | 33.5 ± 5.5 | 33 ± 6.5 |
| Gender male, n (%) | 48 (62.3) | 48 (100) | 0 (0) |
| BMI | 35.9 ± 6.7 | 37.1 ± 6.5 | 33.9 ± 7.1 |
| Prescription Medications, n (%) |  |  |  |
| Anti-hypertensive | 10 (13) | 8 (16.7) | 2 (6.9) |
| Lipid-lowering | 7 (9.1) | 7 (14.6) | 0 (0) |
| Depression | 5 (6.5) | 1 (2.1) | 4 (13.8) |
| Thyroid Hormone | 5 (6.5) | 2 (4.2) | 3 (10.3) |
| Oral Type 2 Diabetes | 3 (3.9) | 3 (6.3) | 0 (0) |
| Number of Comorbidities, n (%) |  |  |  |
| ≥3 | 5 (6.5) | 4 (8.3) | 1 (3.4) |
| 2 | 7 (9.1) | 6 (12.5) | 1 (3.4) |
| 1 | 20 (26) | 10 (20.8) | 10 (34.5) |
| 0 | 45 (58.4) | 28 (58.3) | 17 (58.6) |

TABLE 36

40-Day Cohort Subjects Less Than 40 Years of Age Results

|  | Baseline | Day 40 | % change from Baseline | Statistical Significance |
|---|---|---|---|---|
| All | 15.18 ± 0.904 | 11.94 ± 0.753 | −21.3 | <0.0001 |
| Male | 18.33 ± 1.181 | 14.33 ± 0.994 | −21.8 | <0.0001 |
| Female | 9.966 ± 0.670 | 7.966 ± 0.659 | −20.1 | <0.0001 |

TABLE 37

40-Day Cohort Subjects 40 to 49 Years of Age Baseline Characteristics

|  | All (n = 205) | Male (n = 121) | Female (n = 84) |
|---|---|---|---|
| Age, years | 45 ± 2.8 | 46 ± 2.7 | 45 ± 2.9 |
| Gender male, n (%) | 121 (59) | 121 (100) | 0 (0) |
| BMI | 35.3 ± 6.3 | 35.9 ± 6.0 | 32.6 ± 6.5 |
| Prescription Medications, n (%) |  |  |  |
| Anti-hypertensive | 54 (26.3) | 37 (30.6) | 17 (20.2) |
| Lipid-lowering | 41 (20) | 33 (27.3) | 8 (9.5) |
| Depression | 34 (16.6) | 20 (16.5) | 14 (16.7) |
| Thyroid Hormone | 21 (10.2) | 3 (2.5) | 18 (21.4) |
| Oral Type 2 Diabetes | 21 (10.2) | 14 (11.6) | 7 (8.3) |
| Number of Comorbidities, n (%) |  |  |  |
| ≥3 | 28 (13.7) | 16 (13.2) | 12 (14.3) |
| 2 | 40 (19.5) | 33 (27.3) | 7 (8.3) |
| 1 | 57 (27.8) | 32 (26.4) | 25 (29.8) |
| 0 | 90 (43.9) | 50 (41.3) | 40 (47.6) |

TABLE 38

40-Day Cohort Subjects 40 to 49 Years of Age Results

|        | Baseline       | Day 40         | % change from Baseline | Statistical Significance |
|--------|----------------|----------------|------------------------|--------------------------|
| All    | 16.42 ± 0.508  | 13.32 ± 0.471  | −18.9                  | <0.0001                  |
| Male   | 20.36 ± 0.609  | 16.45 ± 0.620  | −19.2                  | <0.0001                  |
| Female | 10.75 ± 0.349  | 8.821 ± 0.341  | −17.9                  | <0.0001                  |

TABLE 39

40-Day Cohort Subjects 50 to 59 Years of Age Baseline Characteristics

|                               | All (n = 268) | Male (n = 154) | Female (n = 114) |
|-------------------------------|---------------|----------------|------------------|
| Age, years                    | 54 ± 2.8      | 54 ± 2.7       | 54.5 ± 2.9       |
| Gender male, n (%)            | 154 (57.5)    | 154 (100)      | 0 (0)            |
| BMI                           | 34.8 ± 5.6    | 35.6 ± 5.6     | 33.4 ± 5.5       |
| Prescription Medications, n (%) |             |                |                  |
| Anti-hypertensive             | 93 (34.7)     | 63 (40.9)      | 30 (26.3)        |
| Lipid-lowering                | 78 (29.1)     | 54 (35.1)      | 24 (21.1)        |
| Depression                    | 36 (13.4)     | 16 (10.4)      | 20 (17.5)        |
| Thyroid Hormone               | 27 (10.1)     | 10 (6.5)       | 17 (14.9)        |
| Oral Type 2 Diabetes          | 22 (8.2)      | 18 (11.7)      | 4 (3.5)          |
| Number of Comorbidities, n (%) |              |                |                  |
| ≥3                            | 50 (18.7)     | 34 (22.1)      | 16 (14)          |
| 2                             | 52 (19.4)     | 35 (22.7)      | 17 (14.9)        |
| 1                             | 80 (29.9)     | 39 (25.3)      | 41 (36)          |
| 0                             | 86 (32.1)     | 46 (29.9)      | 40 (35.1)        |

TABLE 40

40-Day Cohort Subjects 50 to 59 Years of Age Results

|        | Baseline       | Day 40         | % change from Baseline | Statistical Significance |
|--------|----------------|----------------|------------------------|--------------------------|
| All    | 17.25 ± 0.417  | 13.90 ± 0.337  | −19.4                  | <0.0001                  |
| Male   | 21.01 ± 0.513  | 16.58 ± 0.443  | −21.1                  | <0.0001                  |
| Female | 12.17 ± 0.295  | 10.29 ± 0.264  | −15.4                  | <0.0001                  |

TABLE 41

40-Day Cohort Subjects Greater Than 59 Years of Age Baseline Characteristics

|                               | All (n = 72) | Male (n = 37) | Female (n = 35) |
|-------------------------------|--------------|---------------|-----------------|
| Age, years                    | 63 ± 3.5     | 63 ± 2.8      | 63 ± 4.1        |
| Gender male, n (%)            | 37 (51.4)    | 37 (100)      | 0 (0)           |
| BMI                           | 34.8 ± 6.3   | 34.8 ± 6.6    | 34.7 ± 5.9      |
| Prescription Medications, n (%) |            |               |                 |
| Anti-hypertensive             | 45 (62.5)    | 27 (73)       | 18 (51.4)       |
| Lipid-lowering                | 41 (56.9)    | 25 (67.6)     | 16 (45.7)       |
| Depression                    | 12 (16.7)    | 7 (18.9)      | 5 (14.3)        |
| Thyroid Hormone               | 8 (11.1)     | 1 (2.7)       | 7 (20)          |
| Oral Type 2 Diabetes          | 11 (15.3)    | 8 (21.6)      | 3 (8.6)         |
| Number of Comorbidities, n (%) |             |               |                 |
| ≥3                            | 34 (47.2)    | 18 (48.6)     | 16 (45.7)       |
| 2                             | 19 (26.4)    | 11 (29.7)     | 8 (22.9)        |
| 1                             | 8 (11.1)     | 6 (16.2)      | 2 (5.7)         |
| 0                             | 11 (15.3)    | 2 (5.4)       | 9 (25.7)        |

TABLE 42

40-Day Cohort Subjects Greater Than 59 Years of Age Results

|  | Baseline | Day 40 | % change from Baseline | Statistical Significance |
|---|---|---|---|---|
| All | 18.56 ± 0.832 | 15.69 ± 0.730 | −15.5 | <0.0001 |
| Male | 22.62 ± 1.142 | 18.92 ± 1.064 | −16.4 | <0.0001 |
| Female | 14.26 ± 0.674 | 12.29 ± 0.599 | −13.8 | <0.0001 |

Example 9: 40-Day Cohort Conclusions

Finally, the overall experimental outcome for all subjects of the 40-Day cohort, including all sub-cohorts was analyzed. The data is summarized below in Table 43. All data in Table 43 are presented as mean values±SEM.

TABLE 43

40-Day Cohort VF Rating Results Review Table

|  | Baseline | Day 40 | % change from Baseline | Statistical Significance |
|---|---|---|---|---|
| Entire Cohort | 16.87 ± 0.288 | 13.68 ± 0.249 | −18.9 | <0.0001 |
| Hypertension Cohort | 19.59 ± 0.504 | 16.01 ± 0.439 | −18.3 | <0.0001 |
| Cholesterolemia/ Triglyceridemia Cohort | 19.63 ± 0.566 | 16.10 ± 0.497 | −18.0 | <0.0001 |
| Depression Cohort | 15.82 ± 0.640 | 12.83 ± 0.567 | −18.9 | <0.0001 |
| Thyroid replacement Cohort | 15.07 ± 0.913 | 12.57 ± 0.795 | −16.6 | <0.0001 |
| Type 2 Diabetic Cohort | 21.54 ± 1.172 | 18.18 ± 1.042 | −15.6 | <0.0001 |
| <40 Years of Age Cohort | 15.18 ± 0.904 | 11.94 ± 0.753 | −21.3 | <0.0001 |
| 40-49 Years of Age Cohort | 16.42 ± 0.508 | 13.32 ± 0.471 | −18.9 | <0.0001 |
| 50-59 Years of Age Cohort | 17.25 ± 0.417 | 13.90 ± 0.337 | −19.4 | <0.0001 |
| >59 Years of Age Cohort | 18.56 ± 0.832 | 15.69 ± 0.730 | −15.5 | <0.0001 |

The 40-Day cohort is of respectable size (n=622), including 360 male and 262 female subjects. The 40-Day cohort represents a broad range of baseline BMI, ages, and weight-associated health issues and is approximately representative of the general US population. Over 60% of the subjects had at least one health issue requiring medication/intervention or comorbidity. The range of BMI includes subjects that are overweight, obese, and morbidly obese.

Overall, the 40-Day cohort showed a statistically significant 18.9% reduction in VF, with men averaging a 20% reduction and women averaging 16.3%. Sub-cohorts, e.g., the hypertension sub-cohort, and sub-sub-cohorts, e.g., the male hypertension sub-cohort, also showed statistically significant reductions in VF ranging from 13.8% to 21.8%. Every analysis in the 40-Day cohort subject group showed statistically significant VF reduction.

While statistical significance is important, the bigger issue of clinical significance of the results is even more critical when assessing if this duration of intervention provides a real health benefit to the general population, including those with other clinical complications. Many prior studies have shown that a decrease in accumulated VF (measured by CT or BIA) correlates with a decrease in the number of metabolic risk factors, e.g., hypertension, dyslipidemia, and hyperglycemia. (See, Okauchi et al., *J. Atheroscler. Thromb.*, 17:1237-1245, 2010; Hiuge-Shimizu et al., *Ann. Med.*, 44:82-92, 2012; Fox et al., *Circulation*, 116:39-48, 2007; and Okauchi et al., *Diabetes Care*, 30:2392-2394, 2007). A reduction of 18.9% for the 40-Day cohort over a period of a little more than a month is both a statistically and a clinically significant finding.

Example 10: 60-Day Cohort—Baseline Measurements and Results

Of 420 subjects completing 60 days of structured VLCD, the median age was 50, and 57% were male. The median BMI in the 60-Day cohort was 35, and approximately 62% of all subjects reported at least one comorbidity. Data for baseline characteristics for the entire 60-Day cohort is provided in Table 44. All data are presented as median values±SD or number (%).

Reduction of VF rating for the entire 40-Day cohort, regardless of comorbidity or age group, is presented in Table 45, and FIG. 21. Results are presented for the entire 60-Day cohort and broken down by gender. All outcome data are shown as mean values±SEM.

TABLE 44

60-Day Cohort Baseline Characteristics

| | All (n = 420) | Male (n = 241) | Female (n = 179) |
|---|---|---|---|
| Age, years | 50 ± 9.3 | 49 ± 9.2 | 50 ± 9.5 |
| Gender male, n (%) | 241 (57.4) | 241 (100) | 0 (0) |
| BMI | 35.2 ± 6.4 | 35.8 ± 6.2 | 33.6 ± 6.6 |
| Prescription Medications, n (%) | | | |
| Anti-hypertensive | 129 (30.7) | 84 (34.9) | 45 (25.1) |
| Lipid-lowering | 105 (25) | 70 (29) | 35 (19.6) |
| Depression | 57 (13.6) | 30 (12.4) | 27 (15.1) |
| Thyroid Hormone | 37 (8.8) | 10 (4.1) | 27 (15.1) |
| Oral Type 2 Diabetes | 41 (9.8) | 30 (12.4) | 11 (6.1) |
| Number of Comorbidities, n (%) | | | |
| ≥3 | 79 (18.8) | 50 (20.7) | 29 (16.2) |
| 2 | 67 (16) | 40 (16.6) | 27 (15.1) |
| 1 | 114 (27.1) | 61 (25.3) | 53 (29.6) |
| 0 | 160 (38.1) | 90 (37.3) | 70 (39.1) |

TABLE 45

60-Day Cohort Results

| | Baseline | Day 60 | % change from Baseline | Statistical Significance |
|---|---|---|---|---|
| All | 17.04 ± 0.361 | 12.80 ± 0.287 | −24.9 | p < 0.0001 |
| Male | 20.85 ± 0.457 | 15.28 ± 0.394 | −26.7 | p < 0.0001 |
| Female | 11.90 ± 0.288 | 9.46 ± 0.255 | −20.5 | p < 0.0001 |

Example 11: 60-Day Cohort Comorbidity Characteristics and Results

To further investigate the effectiveness of a 60-day period of structured VLCD, the data obtained from the top five most common comorbidities requiring prescription medication were analyzed. Sub-cohorts were separately analyzed and included medication for hypertension, dyslipidemia/triglyceridemia, depression, thyroid hormone replacement, and T2D.

Data describing baseline characteristics and results for each sub-cohort are provided in the following tables and figures for each comorbidity cohort as follows: hypertension (Tables 46 and 47, and FIG. 22), cholesterolemia/triglyceridemia (Tables 48 and 49, and FIG. 23), depression (Tables 50 and 51, and FIG. 24), thyroid replacement (Tables 52 and 53, and FIG. 25), T2D (Tables 54 and 55, and FIG. 26), respectively.

Baseline characteristic data are provided below and in the Figures as median values±SD or number (%). Experimental outcome characteristic data at Day 60 are provided below and in the Figures as mean values±SEM.

TABLE 46

60-Day Cohort Hypertension Baseline Characteristics

| | All (n = 129) | Male (n = 84) | Female (n = 45) |
|---|---|---|---|
| Age, years | 52 ± 8.3 | 52 ± 8.2 | 54 ± 8.5 |
| Gender male, n (%) | 84 (65.1) | 84 (100) | 0 (0) |
| BMI | 36.6 ± 6.8 | 36.8 ± 6.5 | 36.1 ± 7.3 |
| Prescription Medications, n (%) | | | |
| Anti-hypertensive | 129 (100) | 84 (100) | 45 (100) |
| Lipid-lowering | 62 (48.1) | 41 (48.8) | 21 (46.7) |
| Depression | 19 (14.7) | 9 (10.7) | 10 (22.2) |
| Thyroid Hormone | 10 (7.8) | 3 (3.6) | 7 (15.6) |
| Oral Type 2 Diabetes | 33 (25.6) | 25 (29.8) | 8 (17.8) |
| Number of Comorbidities, n (%) | | | |
| ≥3 | 62 (48.1) | 40 (47.6) | 22 (48.9) |
| 2 | 38 (29.5) | 24 (28.6) | 14 (31.1) |
| 1 | 29 (22.5) | 20 (23.8) | 9 (20) |
| 0 | 0 (0) | 0 (0) | 0 (0) |

TABLE 47

| 60-Day Cohort Hypertension Results | | | | |
|---|---|---|---|---|
| | Baseline | Day 60 | % change from Baseline | Statistical Significance |
| All | 19.89 ± 0.679 | 14.89 ± 0.527 | −25.1 | p < 0.0001 |
| Male | 22.98 ± 0.798 | 16.79 ± 0.661 | −26.9 | p < 0.0001 |
| Female | 14.13 ± 0.671 | 11.36 ± 0.534 | −19.6 | p = 0.0004 |

TABLE 48

| 60-Day Cohort Cholesterolemia/Triglyceridemia Baseline Characteristics | | | |
|---|---|---|---|
| | All (n = 105) | Male (n = 70) | Female (n = 35) |
| Age, years | 53 ± 8.2 | 52 ± 7.9 | 56 ± 7.6 |
| Gender male, n (%) | 70 (66.7) | 70 (100) | 0 (0) |
| BMI | 35.8 ± 6.3 | 36.4 ± 6.4 | 34.8 ± 6.0 |
| Prescription Medications, n (%) | | | |
| Anti-hypertensive | 62 (59) | 41 (58.6) | 21 (60) |
| Lipid-lowering | 105 (100) | 70 (100) | 35 (100) |
| Depression | 21 (20) | 14 (20) | 7 (20) |
| Thyroid Hormone | 11 (10.5) | 2 (2.9) | 9 (25.7) |
| Oral Type 2 Diabetes | 31 (29.5) | 22 (31.4) | 9 (25.7) |
| Number of Comorbidities, n (%) | | | |
| ≥3 | 63 (60) | 40 (57.1) | 23 (65.7) |
| 2 | 25 (23.8) | 17 (24.3) | 8 (22.9) |
| 1 | 17 (16.2) | 13 (18.6) | 4 (11.4) |
| 0 | 0 (0) | 0 (0) | 0 (0) |

TABLE 49

| 60-Day Cohort Cholesterolemia/Triglyceridemia Results | | | | |
|---|---|---|---|---|
| | Baseline | Day 60 | % change from Baseline | Statistical Significance |
| All | 19.61 ± 0.741 | 14.92 ± 0.576 | −23.9 | p < 0.0001 |
| Male | 22.49 ± 0.870 | 16.64 ± 0.729 | −26.0 | p < 0.0001 |
| Female | 13.86 ± 0.712 | 11.49 ± 0.606 | −17.1 | p < 0.0001 |

TABLE 50

| 60-Day Cohort Depression Baseline Characteristics | | | |
|---|---|---|---|
| | All (n = 57) | Male (n = 30) | Female (n = 27) |
| Age, years | 50 ± 8.5 | 50.5 ± 7.1 | 49 ± 8.0 |
| Gender male, n (%) | 30 (52.6) | 30 (100) | 0 (0) |
| BMI | 34.6 ± 6.0 | 35.3 ± 4.3 | 32 ± 7.6 |
| Prescription Medications, n (%) | | | |
| Anti-hypertensive | 19 (33.3) | 9 (30) | 10 (37) |
| Lipid-lowering | 21 (36.8) | 14 (46.7) | 7 (25.9) |
| Depression | 57 (100) | 30 (100) | 27 (100) |
| Thyroid Hormone | 9 (15.8) | 3 (10) | 6 (22.2) |
| Oral Type 2 Diabetes | 4 (7) | 3 (10) | 1 (3.7) |
| Number of Comorbidities, n (%) | | | |
| ≥3 | 21 (36.8) | 12 (40) | 9 (33.3) |
| 2 | 18 (31.6) | 11 (36.7) | 7 (25.9) |
| 1 | 18 (31.6) | 7 (23.3) | 11 (40.7) |
| 0 | 0 (0) | 0 (0) | 0 (0) |

TABLE 51

60-Day Cohort Depression Results

| | Baseline | Day 60 | % change from Baseline | Statistical Significance |
|---|---|---|---|---|
| All | 16.07 ± 0.835 | 12.39 ± 0.713 | −22.9 | p < 0.0001 |
| Male | 19.77 ± 1.045 | 14.97 ± 0.948 | −24.3 | p < 0.0001 |
| Female | 11.96 ± 0.765 | 9.52 ± 0.774 | −20.4 | p < 0.0001 |

TABLE 52

60-Day Cohort Thyroid Replacement Baseline Characteristics

| | All (n = 37) | Male (n = 10) | Female (n = 27) |
|---|---|---|---|
| Age, years | 52 ± 9.9 | 50.5 ± 11.6 | 52 ± 8.9 |
| Gender male, n (%) | 10 (27) | 10 (100) | 0 (0) |
| BMI | 35.1 ± 7.4 | 37.2 ± 7.5 | 33 ± 7.3 |
| Prescription Medications, n (%) | | | |
| Anti-hypertensive | 10 (27) | 3 (30) | 7 (25.9) |
| Lipid-lowering | 12 (32.4) | 2 (20) | 10 (37) |
| Depression | 9 (24.3) | 3 (30) | 6 (22.2) |
| Thyroid Hormone | 37 (100) | 10 (100) | 27 (100) |
| Oral Type 2 Diabetes | 1 (2.7) | 0 (0) | 1 (3.7) |
| Number of Comorbidities, n (%) | | | |
| ≥3 | 13 (35.1) | 4 (40) | 9 (33.3) |
| 2 | 10 (27) | 3 (30) | 7 (25.9) |
| 1 | 14 (37.8) | 3 (30) | 11 (40.7) |
| 0 | 0 (0) | 0 (0) | 0 (0) |

TABLE 53

60-Day Cohort Thyroid Replacement Results

| | Baseline | Day 60 | % change from Baseline | Statistical Significance |
|---|---|---|---|---|
| All | 15.32 ± 1.331 | 12.03 ± 1.092 | −21.5 | p < 0.0001 |
| Male | 23.40 ± 3.267 | 17.90 ± 2.934 | −23.5 | p = 0.0003 |
| Female | 12.33 ± 0.849 | 9.85 ± 0.695 | −20.1 | p < 0.0001 |

TABLE 54

60-Day Cohort Type 2 Diabetic Baseline Characteristics

| | All (n = 41) | Male (n = 30) | Female (n = 11) |
|---|---|---|---|
| Age, years | 50 ± 7.9 | 52 ± 7.9 | 48 ± 8.1 |
| Gender male, n (%) | 30 (73.1) | 30 (100) | 0 (0) |
| BMI | 37.7 ± 7.6 | 37.3 ± 8.2 | 38 ± 5.9 |
| Prescription Medications, n (%) | | | |
| Anti-hypertensive | 33 (80.5) | 25 (83.3) | 8 (72.7) |
| Lipid-lowering | 31 (75.6) | 22 (73.3) | 9 (81.8) |
| Depression | 4 (9.8) | 3 (10) | 1 (9.1) |
| Thyroid Hormone | 1 (2.4) | 0 (0) | 1 (9.1) |
| Oral Type 2 Diabetes | 41 (100) | 30 (100) | 11 (100) |
| Number of Comorbidities, n (%) | | | |
| ≥3 | 36 (87.8) | 25 (83.3) | 11 (100) |
| 2 | 3 (7.3) | 3 (10) | 0 (0) |
| 1 | 2 (4.9) | 2 (6.7) | 0 (0) |
| 0 | 0 (0) | 0 (0) | 0 (0) |

TABLE 55

60-Day Cohort Type 2 Diabetic Results

|  | Baseline | Day 60 | % change from Baseline | Statistical Significance |
|---|---|---|---|---|
| All | 21.68 ± 1.491 | 16.73 ± 1.172 | −22.8 | p < 0.0001 |
| Male | 24.40 ± 1.697 | 18.70 ± 1.380 | −23.4 | p < 0.0001 |
| Female | 14.27 ± 1.690 | 11.36 ± 1.223 | −20.4 | p = 0.0010 |

Example 12: 60-Day Cohort Age Group Characteristics and Results

To further investigate the effectiveness of a 60-Day period of structured VLCD, the subjects for the 60-Day cohort were broken into four groups based on age as of the beginning of the study and the results are analyzed as shown below. Age group sub-cohorts were separately analyzed and included subjects that were 39 years old and younger, 40 to 49 years of age, 50 to 59 years of age, and subjects that were older than 59 years of age. Baseline characteristics and results for each age sub-cohort is provided in the following tables and figures: subjects less than 40 years of age (Tables 56 and 57, and FIG. 27), subjects of age 40 to 49 years (Tables 58 and 59, and FIG. 28), subjects of age 50 to 59 years (Tables 60 and 61, and FIG. 29), subjects that were older than 59 years of age (Tables 62 and 63, and FIG. 30). Baseline characteristic data are provided as median values±SD or number (%). Experimental outcome characteristic data at Day 40 are provided as mean values±SEM.

TABLE 56

60-Day Cohort Subjects Less Than 40 Years of Age Baseline Characteristics

|  | All (n = 56) | Male (n = 37) | Female (n = 19) |
|---|---|---|---|
| Age, years | 33 ± 5.5 | 34 ± 5.5 | 33 ± 5.7 |
| Gender male, n (%) | 37 (66.1) | 37 (100) | 0 (0) |
| BMI | 36.5 ± 7.3 | 37.2 ± 6.7 | 33.1 ± 8.2 |
| Prescription Medications, n (%) |  |  |  |
| Anti-hypertensive | 8 (14.3) | 7 (18.9) | 1 (5.3) |
| Lipid-lowering | 6 (10.7) | 6 (16.2) | 0 (0) |
| Depression | 5 (8.9) | 1 (2.7) | 4 (21.1) |
| Thyroid Hormone | 3 (5.4) | 2 (5.4) | 1 (5.3) |
| Oral Type 2 Diabetes | 3 (5.4) | 3 (8.1) | 0 (0) |
| Number of Comorbidities, n (%) |  |  |  |
| ≥3 | 5 (8.9) | 4 (10.8) | 1 (5.3) |
| 2 | 5 (8.9) | 4 (10.8) | 1 (5.3) |
| 1 | 14 (25) | 8 (21.6) | 6 (31.6) |
| 0 | 32 (57.1) | 21 (56.8) | 11 (57.9) |

TABLE 57

60-Day Cohort Subjects Less Than 40 Years of Age Results

|  | Baseline | Day 60 | % change from Baseline | Statistical Significance |
|---|---|---|---|---|
| All | 16.00 ± 1.151 | 11.41 ± 0.881 | −28.7 | p < 0.0001 |
| Male | 19.05 ± 1.434 | 13.43 ± 1.135 | −29.5 | p < 0.0001 |
| Female | 10.05 ± 0.975 | 7.47 ± 0.818 | −25.7 | p < 0.0001 |

TABLE 58

60-Day Cohort Subjects 40 to 49 Years of Age Baseline Characteristics

|  | All (n = 143) | Male (n = 84) | Female (n = 59) |
|---|---|---|---|
| Age, years | 45 ± 2.8 | 46 ± 2.7 | 45 ± 2.8 |
| Gender male, n (%) | 84 (58.8) | 84 (100) | 0 (0) |
| BMI | 35.6 ± 6.7 | 35.9 ± 6.2 | 33.5 ± 7.3 |
| Prescription Medications, n (%) |  |  |  |
| Anti-hypertensive | 36 (25.2) | 23 (27.4) | 13 (22) |
| Lipid-lowering | 25 (17.5) | 19 (22.6) | 6 (10.2) |
| Depression | 23 (16.1) | 13 (15.5) | 10 (16.9) |
| Thyroid Hormone | 15 (10.5) | 3 (3.6) | 12 (20.3) |
| Oral Type 2 Diabetes | 15 (10.5) | 9 (10.7) | 6 (10.2) |
| Number of Comorbidities, n (%) |  |  |  |
| ≥3 | 18 (12.6) | 11 (13.1) | 7 (11.9) |
| 2 | 21 (14.7) | 13 (15.5) | 8 (13.6) |
| 1 | 40 (28.0) | 22 (26.2) | 18 (30.5) |
| 0 | 64 (44.8) | 38 (45.2) | 26 (44.1) |

TABLE 59

60-Day Cohort Subjects 40 to 49 Years of Age Results

|  | Baseline | Day 60 | % change from Baseline | Statistical Significance |
|---|---|---|---|---|
| All | 16.78 ± 0.616 | 12.64 ± 0.526 | −24.7 | p < 0.0001 |
| Male | 20.73 ± 0.737 | 15.33 ± 0.707 | −26.0 | p < 0.0001 |
| Female | 11.17 ± 0.466 | 8.81 ± 0.440 | −21.1 | p < 0.0001 |

TABLE 60

60-Day Cohort Subjects 50 to 59 Years of Age Baseline Characteristics

|  | All (n = 173) | Male (n = 97) | Female (n = 76) |
|---|---|---|---|
| Age, years | 54 ± 2.8 | 53 ± 2.7 | 54 ± 2.9 |
| Gender male, n (%) | 97 (56.1) | 97 (100) | 0 (0) |
| BMI | 34.7 ± 5.8 | 35.6 ± 5.8 | 33.4 ± 5.6 |
| Prescription Medications, n (%) |  |  |  |
| Anti-hypertensive | 55 (31.8) | 37 (38.1) | 18 (23.7) |
| Lipid-lowering | 48 (27.7) | 31 (32) | 17 (22.4) |
| Depression | 23 (13.3) | 12 (12.4) | 11 (14.5) |
| Thyroid Hormone | 14 (8.1) | 5 (5.2) | 9 (11.8) |
| Oral Type 2 Diabetes | 15 (8.7) | 13 (13.4) | 2 (2.6) |
| Number of Comorbidities, n (%) |  |  |  |
| ≥3 | 34 (19.7) | 25 (25.8) | 9 (11.8) |
| 2 | 24 (13.9) | 13 (13.4) | 11 (14.5) |
| 1 | 60 (34.7) | 30 (30.9) | 30 (39.5) |
| 0 | 55 (31.8) | 29 (29.9) | 26 (34.2) |

TABLE 61

60-Day Cohort Subjects 50 to 59 Years of Age Results

|  | Baseline | Day 60 | % change from Baseline | Statistical Significance |
|---|---|---|---|---|
| All | 17.13 ± 0.536 | 12.90 ± 0.402 | −24.7 | p < 0.0001 |
| Male | 21.16 ± 0.667 | 15.47 ± 0.546 | −26.9 | p < 0.0001 |
| Female | 11.99 ± 0.378 | 9.62 ± 0.315 | −19.8 | p < 0.0001 |

TABLE 62

60-Day Cohort Subjects Greater Than 59 Years of Age Baseline Characteristics

|  | All (n = 48) | Male (n = 23) | Female (n = 25) |
|---|---|---|---|
| Age, years | 63 ± 3.4 | 63 ± 1.9 | 63 ± 4.3 |
| Gender male, n (%) | 23 (47.9) | 23 (100) | 0 (0) |
| BMI | 35.1 ± 6.5 | 35.3 ± 6.7 | 35 ± 6.4 |
| Prescription Medications, n (%) |  |  |  |
| Anti-hypertensive | 30 (62.5) | 17 (73.9) | 13 (52) |
| Lipid-lowering | 26 (54.2) | 14 (60.9) | 12 (48) |
| Depression | 6 (12.5) | 4 (17.4) | 2 (8) |
| Thyroid Hormone | 5 (10.4) | 0 (0) | 5 (20) |
| Oral Type 2 Diabetes | 8 (16.7) | 5 (21.7) | 3 (12) |
| Number of Comorbidities, n (%) |  |  |  |
| ≥3 | 22 (45.8) | 12 (52.2) | 10 (40) |
| 2 | 11 (22.9) | 5 (21.7) | 6 (24) |
| 1 | 6 (12.5) | 4 (17.4) | 2 (8) |
| 0 | 9 (18.8) | 2 (8.7) | 7 (28) |

TABLE 63

60-Day Cohort Subjects Greater Than 59 Years of Age Results

|  | Baseline | Day 60 | % change from Baseline | Statistical Significance |
|---|---|---|---|---|
| All | 18.65 ± 1.041 | 14.50 ± 0.814 | −22.3 | p < 0.0001 |
| Male | 22.87 ± 1.530 | 17.22 ± 1.259 | −24.7 | p < 0.0001 |
| Female | 14.76 ± 0.889 | 12.00 ± 0.781 | −18.7 | p < 0.0001 |

Example 13: 60-Day Cohort conclusions

Finally, the overall experimental outcome for all subjects of the 60-Day cohort, including all sub-cohorts was analyzed. The data is summarized below in Table 64. All data in Table 64 are presented as mean values±SEM.

TABLE 64

60-Day Cohort VF Rating Results Review Table

|  | Baseline | Day 60 | % change from Baseline | Statistical Significance |
|---|---|---|---|---|
| Entire Cohort | 17.04 ± 0.361 | 12.80 ± 0.287 | −24.9 | p < 0.0001 |
| Hypertension Cohort | 19.89 ± 0.679 | 14.89 ± 0.527 | −25.1 | p < 0.0001 |
| Cholesterolemia/ Triglyceridemia Cohort | 19.61 ± 0.741 | 14.92 ± 0.576 | −23.9 | p < 0.0001 |
| Depression Cohort | 16.07 ± 0.835 | 12.39 ± 0.713 | −22.9 | p < 0.0001 |
| Thyroid replacement Cohort | 15.32 ± 1.331 | 12.03 ± 1.092 | −21.5 | p < 0.0001 |
| Type 2 Diabetic Cohort | 21.68 ± 1.491 | 16.73 ± 1.172 | −22.8 | p < 0.0001 |
| <40 Years of Age Cohort | 16.00 ± 1.151 | 11.41 ± 0.881 | −28.7 | p < 0.0001 |
| 40-49 Years of Age Cohort | 16.78 ± 0.616 | 12.64 ± 0.526 | −24.7 | p < 0.0001 |
| 50-59 Years of Age Cohort | 17.13 ± 0.536 | 12.90 ± 0.402 | −24.7 | p < 0.0001 |
| >59 Years of Age Cohort | 18.65 ± 1.041 | 14.50 ± 0.814 | −22.3 | p < 0.0001 |

The 60-Day cohort is of respectable size (n=622), including 241 male and 179 female subjects. The 40-Day cohort represents a broad range of baseline BMI, ages, and weight-associated health issues and is approximately representative of the general US population. Over 60% of the subjects had at least one health issue requiring medication/intervention or comorbidity. The range of BMI includes subjects that are overweight, obese, and morbidly obese.

Overall, the 60-Day cohort showed a statistically significant 24.9% reduction in VF, with men averaging a 26.7% reduction and women averaging 20.5%. Sub-cohorts, e.g., the hypertension sub-cohort, and sub-sub-cohorts, e.g., the male hypertension sub-cohort, also showed statistically significant reductions in VF ranging from 17.1% to 29.5%. Every analysis in the 40-Day cohort subject group showed statistically significant VF reduction.

While statistical significance is important, the bigger issue of clinical significance of the results is even more critical when assessing if this duration of intervention provides a real health benefit to the general population, including those with other clinical complications. Many prior studies have shown that a decrease in accumulated VF (measured by CT or BIA) correlates with a decrease in the number of metabolic risk factors, e.g., hypertension, dyslipidemia, and hyperglycemia. (See, Okauchi et al., *J. Atheroscler. Thromb.*, 17:1237-1245, 2010; Hiuge-Shimizu et al., *Ann. Med*, 44:82-92, 2012; Fox et al., *Circulation*, 116:39-48, 2007; and Okauchi et al., *Diabetes Care*, 30:2392-2394, 2007). A reduction of 24.9% for the 40-Day cohort over a period of a little more than a month is both a statistically and a clinically significant finding.

The breadth and scope of the present disclosure should not be limited by any of the above-described exemplary embodiments, but should be defined only in accordance with the following claims and their equivalents.

What is claimed is:

1. A method of reducing hypertension in a subject in need thereof, which comprises:
   reducing visceral fat in the subject,
   wherein reducing visceral fat in the subject comprises:
   (a) determining a first estimated amount of visceral fat in the subject;
   (b) administering to the subject a calorie-restricted diet of 500 to 850 calories per day, and wherein the subject consumes the calorie-restricted diet daily;
   (c) determining a second estimated amount of visceral fat in the subject on a periodic basis after the subject begins consuming the calorie-restricted diet and after determining the first estimated amount of visceral fat; and (d) repeating steps (b) and (c) until the estimated amount of visceral fat is decreased in the subject by about 5% to about 56% with respect to the first estimated amount of visceral fat determined in the subject, thereby reducing hypertension in the subject by decreasing visceral fat in the subject, wherein determining the first and second estimated amount of visceral fat in the subject comprises obtaining or more of the following measurements from the subject:

(i) measuring a hip to waist ratio of the subject,
(ii) measuring a waist or hip circumference of the subject,
(iii) measuring a sagittal abdominal diameter of the subject,
(iv) measuring an intra-abdominal thickness of the subject by ultrasound,
(v) measuring visceral fat in the subject by magnetic resonance imaging (MRI), computerized tomography (CT), or dual-energy x-ray absorptiometry (DEXA),
(vi) measuring visceral fat in the subject by a class 2 bioelectric impedance instrument, and
(vii) measuring a body mass index (BMI) of the subject, wherein determining the first and second and all subsequent estimated amounts of visceral fat comprises correlating the one or more measurements to the estimated amount of visceral fat in the subject.

2. The method of claim 1, which further comprises administering the calorie-restricted diet on a daily basis to the subject until hypertension is reduced in the subject where the subject's blood pressure corresponds to a systolic reading of about 90 mm Hg to about 120 mm Hg and a diastolic reading of about 60 mm Hg to about 80 mm Hg, or wherein the subject is concurrently prescribed and administered one or more prescription medications for treatment of hypertension, and wherein the calorie-restricted diet is administered to the subject on a daily basis until the prescription medications prescribed to the subject are reduced, and wherein the one or more prescription medications for treatment of hypertension comprise one or more of thiazide diuretics, calcium channel blockers, angiotensin converting enzyme inhibitors, angiotensin II inhibitors, and beta blockers.

3. The method of claim 1, wherein the subject is between 12 and 90 years of age.

4. The method of claim 1, wherein the subject ingests food only within a prescribed constant daily time period of 5 hours to 10 hours, and wherein the subject ingests food only 4 to 6 hours after waking to 3 to 5 hours before sleep.

5. The method of claim 1, further comprising:
determining an activity level of the subject prior to administering the calorie-restricted diet, by measuring heart rate of the subject over the course of about one week;
wherein:
a) if the subject has low visceral fat and is sedentary, then the administered calorie-restricted diet is between 650 and 725 calories per day;
b) if the subject has low visceral fat and is acutely active, then the administered calorie-restricted diet consumed by the subject is between 650 and 800 calories per day;
c) if the subject has low visceral fat and is chronically active, then the administered calorie-restricted diet consumed by the subject is between 750 and 850 calories per day;
d) if the subject has high visceral fat and is sedentary, then the administered calorie-restricted diet consumed by the subject is between 500 and 550 calories per day;
e) if the subject has high visceral fat and is acutely active, then the administered calorie-restricted diet consumed by the subject is between 500 and 650 calories per day; or
f) if the subject has high visceral fat and is chronically active, then the administered calorie-restricted diet consumed by the subject is between 650 and 750 calories per day;

wherein the sedentary subject has an increased heart rate above resting level for less than 45 minutes per day,
wherein the acutely active subject has an increased heart rate above resting level for 45 minutes or more, one to two times per week,
wherein the chronically active subject has an increased heart rate above resting level for 45 minutes or more, three times or more per week, and,
wherein:
if the subject is male and the amount of visceral fat in the subject is determined by hip to waist ratio, then low visceral fat is a score of less than 0.85, and high visceral fat is a score greater than or equal to 0.85,
if the subject is female and the amount of visceral fat in the subject is determined by hip to waist ratio, then low visceral fat is a score of less than 0.90, and high visceral fat is a score greater than or equal to 0.90,
if the subject is male and the amount of visceral fat in the subject is determined by waist circumference, then low visceral fat is a score of less than 90 cm, and high visceral fat is a score greater than or equal to 90 cm,
if the subject is female and the amount of visceral fat in the subject is determined by waist circumference, then low visceral fat is a score of less than 80 cm, and high visceral fat is a score greater than or equal to 80 cm,
and/or
if the amount of visceral fat in the subject is determined by a class 2 bioelectric impedance instrument, then high visceral fat and low visceral fat is indicated by a score determined by the class 2 bioelectric impedance instrument corresponding to high visceral fat and low visceral fat, respectively.

6. The method of claim 1, wherein the diet is administered for at most 40 days from beginning step (b) or the diet is administered until visceral fat is decreased by at least about 17% to about 30% with respect to the first estimated amount of visceral fat in the subject, whichever occurs first.

7. The method of claim 1, wherein the calorie-restricted diet consists of:
(a1) no more than 1 gallon of non-caffeinated beverages per day,
(b1) two to three daily portions each of meat, vegetables, and fruit,
or
(a2) no more than 1 gallon of non-caffeinated beverages per day,
(b2) two to three daily portions each of meat, vegetables, and fruit, and
(c2) flavorants,
wherein the flavorants are selected from the group consisting of: spices, stevia, erythritol, monkfruit extract, pink Himalayan sea salt, and any combination thereof,
wherein the portion of meat is about 3 ounces, the portion of vegetables is about 1 cup, and the portion of fruit is about 1 cup,
wherein the non-caffeinated beverages are selected from the group consisting of: unsweetened iced tea, club soda, coffee, seltzer water, and water, and wherein the water optionally consists of one or more of stevia, lemon juice, lime juice, vitamin C, citric acid, monkfruit extract, erythritol, and xylitol.

8. The method of claim 7, wherein the meat is fresh or flash frozen.

9. The method of claim 7, wherein the meat is obtained only from cow, bison, elk, deer, or any combination thereof.

10. The method of claim 7, wherein the meat is obtained from at least fish and shellfish, and wherein the fish and the shellfish are selected from the group consisting of: cod, flounder, haddock, halibut, tilapia, sea bass, red snapper, wahoo, grouper, marlin, pollock, trout, sole, red fish, tuna, squid, octopus, mussels, lobster, shrimp, crab, scallops, oysters, clams, mussels, and any combination thereof.

11. The method of claim 7, wherein the meat is obtained from at least chicken and/or at least turkey, and wherein the chicken and the turkey do not comprise skin, fat, and deli cuts, and wherein no calories are added to the chicken and the turkey other than the flavorants.

12. The method of claim 7, wherein the vegetables and the fruit are organically grown, are fresh or flash frozen, are not dried, not canned, and/or not preserved.

13. The method of claim 7, wherein the vegetables are selected from the group consisting of: artichokes, asparagus, bamboo shoots, bean sprouts, broccoli, Brussels sprouts, cabbage, cauliflower, celery, cucumber, fennel, leafy greens, garlic, green beans, green peas, leeks, mushrooms, okra, onion, radishes, shallots, tomatoes, peppers, bell peppers, hot peppers, zucchini, and any combination thereof, and
    wherein the leafy greens are selected from the group consisting of: arugula, spinach, kale, cabbage, bok choy, swiss chard, collard greens, dandelion greens, lettuce, and any combination thereof.

14. The method of claim 7, wherein the fruit is selected from the group consisting of: citrus fruit, berries, cherries, apples, apricots, peaches, pears, plum, nectarines, and any combination thereof.

15. The method of claim 14, wherein the citrus fruit is selected from the group consisting of: lemon, lime, grapefruit, tangerine, mandarin oranges, ugly fruit, clementine, tangelo, and any combination thereof, and wherein the berries consist of raspberries, blackberries, blueberries, strawberries, and any combination thereof.

16. The method of claim 7, wherein about 45% to about 60% of caloric intake is derived from meat, about 15% to about 25% of daily caloric intake is derived from vegetables, and about 20% to about 30% of daily caloric intake is derived from fruit.

17. The method of claim 7, wherein the diet comprises:
    no added oil other than oil naturally existing in the diet,
    no added salt other than salt naturally existing in the diet except optionally Himalayan pink salt is added,
    no synthetic or natural sugars or artificial sweeteners other than natural sugars naturally existing in the diet, and
    no monosodium glutamate (MSG).

18. The method of claim 7, wherein the diet includes flavorants and, wherein the flavorants are spices, and wherein the spices are dried and crushed plant material selected from the group consisting of: nutmeg, allspice, pepper, chive, oregano, cilantro, cinnamon, basil, bay leaves, cloves, coriander, cumin, fennel, garlic, ginger, juniper, mace, marjoram, mint, onion, paprika, parsley, rosemary, saffron, caraway seed, celery seed, parsley, tarragon, thyme, mustard seed, anise seed, poppy seed, lemongrass, star anise, turmeric, peppercorn, savory, achiote seed, epazote, sage, vanilla bean, and any combination thereof.

19. The method of claim 7, wherein the meat is from organically grown and/or free-range raised animals, is less than 7% fat, and is obtained from the group consisting of: chicken, turkey, fish, shellfish, cow, egg whites, and any combination thereof.

20. A method of reducing hypertension in a subject in need thereof, which comprises:
    reducing visceral fat in the subject, wherein reducing visceral fat in the subject comprises:
    administering to the subject a calorie-restricted diet of 500 to 850 calories per day, and wherein the subject consumes the calorie-restricted diet daily,
    determining an activity level of the subject prior to administering the calorie-restricted diet, by measuring heart rate of the subject over the course of about one week,
    determining a first estimated amount of visceral fat in the subject prior to administering the calorie-restricted diet, and
    determining a second estimated amount of visceral fat in the subject on a periodic basis after the subject begins consuming the calorie-restricted diet
    wherein determining the first and second estimated amount of visceral fat in the subject comprises obtaining one or more of the following measurements from the subject:
    (i) a hip to waist ratio of the subject,
    (ii) a waist or hip circumference of the subject,
    (iii) visceral fat in the subject by a class 2 bioelectric impedance instrument, and wherein determining the first and second and all subsequent estimated amounts of visceral fat comprises correlating the one or more measurements to the estimated amount of visceral fat in the subject
    wherein:
    a) if the subject has low visceral fat and is sedentary, then the administered calorie-restricted diet is between 650 and 725 calories per day;
    b) if the subject has low visceral fat and is acutely active, then the administered calorie-restricted diet consumed by the subject is between 650 and 800 calories per day;
    c) if the subject has low visceral fat and is chronically active, then the administered calorie-restricted diet consumed by the subject is between 750 and 850 calories per day;
    d) if the subject has high visceral fat and is sedentary, then the administered calorie-restricted diet consumed by the subject is between 500 and 550 calories per day;
    e) if the subject has high visceral fat and is acutely active, then the administered calorie-restricted diet consumed by the subject is between 500 and 650 calories per day; or
    f) if the subject has high visceral fat and is chronically active, then the administered calorie-restricted diet consumed by the subject is between 650 and 750 calories per day;
    wherein the sedentary subject has an increased heart rate above resting level for less than 45 minutes per day,
    wherein the acutely active subject has an increased heart rate above resting level for 45 minutes or more, one to two times per week,
    wherein the chronically active subject has an increased heart rate above resting level for 45 minutes or more, three times or more per week, wherein:

if the subject is male and the amount of visceral fat in the subject is determined by hip to waist ratio, then low visceral fat is a score of less than 0.85, and high visceral fat is a score greater than or equal to 0.85, if the subject is female and the amount of visceral fat in the subject is determined by hip to waist ratio, then low visceral fat is a score of less than 0.90, and high visceral fat is a score greater than or equal to 0.90, if the subject is male and the amount of visceral fat in the subject is determined by waist circumference, then low visceral fat is a score of less than 90 cm, and high visceral fat is a score greater than or equal to 90 cm, if the subject is female and the amount of visceral fat in the subject is determined by waist circumference, then low visceral fat is a score of less than 80 cm, and high visceral fat is a score greater than or equal to 80 cm, and/or f the amount of visceral fat in the subject is determined by a class 2 bioelectric impedance instrument, then high visceral fat and low visceral fat is indicated by a score determined by the class 2 bioelectric impedance instrument corresponding to high visceral fat and low visceral fat, respectively.

\* \* \* \* \*